United States Patent
Thurairatnam et al.

(10) Patent No.: US 11,983,763 B1
(45) Date of Patent: May 14, 2024

(54) MODELING TO GENERATE DYNAMIC ELECTRONIC REPRESENTATIONS

(71) Applicant: Block, Inc., San Francisco, CA (US)

(72) Inventors: Ragavan Thurairatnam, San Francisco, CA (US); Marc Tyndel, San Francisco, CA (US); Louay Hazami, San Francisco, CA (US); Per Engstrom, San Francisco, CA (US); Jeremy Mawson, San Francisco, CA (US); Thomas Collier, San Francisco, CA (US); Rocky Medure, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/953,115

(22) Filed: Sep. 26, 2022

Related U.S. Application Data

(63) Continuation of application No. 17/855,677, filed on Jun. 30, 2022.

(51) Int. Cl.
   *G06Q 30/00* (2023.01)
   *G06Q 20/02* (2012.01)
   *G06Q 20/40* (2012.01)
   *G06Q 30/0601* (2023.01)

(52) U.S. Cl.
   CPC ......... *G06Q 30/0643* (2013.01); *G06Q 20/02* (2013.01); *G06Q 20/40* (2013.01)

(58) Field of Classification Search
   CPC ..... G06Q 30/0643; G06Q 20/02; G06Q 20/40
   See application file for complete search history.

(56) References Cited

U.S. PATENT DOCUMENTS

| | | | | |
|---|---|---|---|---|
| 8,522,358 B2* | 8/2013 | Donfried | ............ | G16H 70/60 |
| | | | | 707/769 |
| 8,666,817 B2* | 3/2014 | DeRoller | ............ | G06Q 30/0251 |
| | | | | 270/52.02 |
| 9,176,579 B2* | 11/2015 | Hyndman | ............ | A63F 13/537 |
| 10,203,838 B2* | 2/2019 | Makofsky | ............ | G06T 13/40 |
| 10,406,441 B2* | 9/2019 | Nathan | ............ | A63F 13/30 |
| 10,444,938 B1* | 10/2019 | Bhalerao | ............ | G06F 3/04845 |
| 10,963,544 B2* | 3/2021 | Zhu | ............ | G06T 19/006 |

(Continued)

OTHER PUBLICATIONS

"Media Release: What's the Next Big Blockchain Craze?" MediaNet Press Release Wire [Sydney], Feb. 23, 2022 (Year: 2022).*

(Continued)

*Primary Examiner* — Anne M Georgalas
(74) *Attorney, Agent, or Firm* — Lee & Hayes P.C.

(57) ABSTRACT

Generation of dynamic electronic representations using modeling is described. Interaction data comprising attributes of one or more interactions between a user and the service provider or one or more third-party services integrated with the service provider is received. A model is executed to dynamically generate an electronic representation for a user profile based upon the interaction data, wherein the model is trained using attributes associated with a set of existing user profiles associated with the service provider and corresponding interaction data indicative of interaction data of the set of existing user profiles, and wherein the electronic representation is generated without input from the user. The electronic representation can be presented on an electronic device.

20 Claims, 17 Drawing Sheets

(56) References Cited

U.S. PATENT DOCUMENTS

| | | | |
|---|---|---|---|
| 10,970,707 B1 | 4/2021 | Techel et al. | |
| 11,348,099 B2* | 5/2022 | Vijayan | H04L 63/08 |
| 11,455,751 B2* | 9/2022 | Lu | G06N 20/00 |
| 11,556,727 B1* | 1/2023 | Geisler | G06K 7/1417 |
| 11,574,313 B2* | 2/2023 | Farivar | G06V 20/63 |
| 11,727,402 B2* | 8/2023 | Mossoba | G06Q 20/3674 |
| | | | 705/44 |
| 2009/0319456 A1* | 12/2009 | Consul | H04L 51/212 |
| | | | 706/21 |
| 2010/0030660 A1* | 2/2010 | Edwards | G06Q 30/00 |
| | | | 705/26.1 |
| 2010/0053187 A1* | 3/2010 | Arrasvuori | A63F 13/30 |
| | | | 345/581 |
| 2010/0088151 A1* | 4/2010 | Kim | G06Q 30/0201 |
| | | | 705/7.29 |
| 2010/0162403 A1* | 6/2010 | Dawson | G06Q 10/107 |
| | | | 726/26 |
| 2013/0152183 A1* | 6/2013 | Plewnia | H04L 63/08 |
| | | | 726/7 |
| 2014/0006274 A1 | 1/2014 | Grigg et al. | |
| 2015/0206222 A1* | 7/2015 | Bart | G06Q 30/0631 |
| | | | 705/26.7 |
| 2019/0340419 A1* | 11/2019 | Milman | G06T 13/80 |
| 2021/0211495 A1* | 7/2021 | Lee | G06Q 20/123 |
| 2021/0398135 A1* | 12/2021 | Huber, Jr. | G06N 20/00 |
| 2022/0005043 A1* | 1/2022 | Cao | G06T 7/97 |
| 2022/0069996 A1* | 3/2022 | Xue | H04L 9/3239 |
| 2022/0258059 A1* | 8/2022 | Murcin | A63F 13/79 |
| 2023/0144857 A1 | 5/2023 | Khan et al. | |

OTHER PUBLICATIONS

"Cantech Letter: Liquid Avatar Launches Metaverse Payments Program," by Jayson MacLean, Newstex Finance and Accounting Blogs, Mar. 23, 2022 (Year: 2022).*

"FAQ—CryptoTrunks", Crypto Trunks, retrieved Mar. 23, 2022 from URL: https://cryptotrunks.co/faq (5 pages).

* cited by examiner

MODELING TO GENERATE DYNAMIC ELECTRONIC REPRESENTATIONS

CROSS-REFERENCE TO RELATED APPLICATIONS

This application is a continuation application of U.S. application Ser. No. 17/855,677, filed, Jun. 30, 2022, which is incorporated by reference in its entirety for all purposes.

TECHNICAL FIELD

A user profile is a collection of settings and information associated with a particular user. User profiles are useable to differentiate between users of a service or platform. Users often upload photos for association with user profiles for verification or authentication purposes.

BRIEF DESCRIPTION OF THE DRAWINGS

The accompanying drawings constitute a part of this specification and illustrate examples of the subject matter disclosed herein.

DETAILED DESCRIPTION

Figure 1:
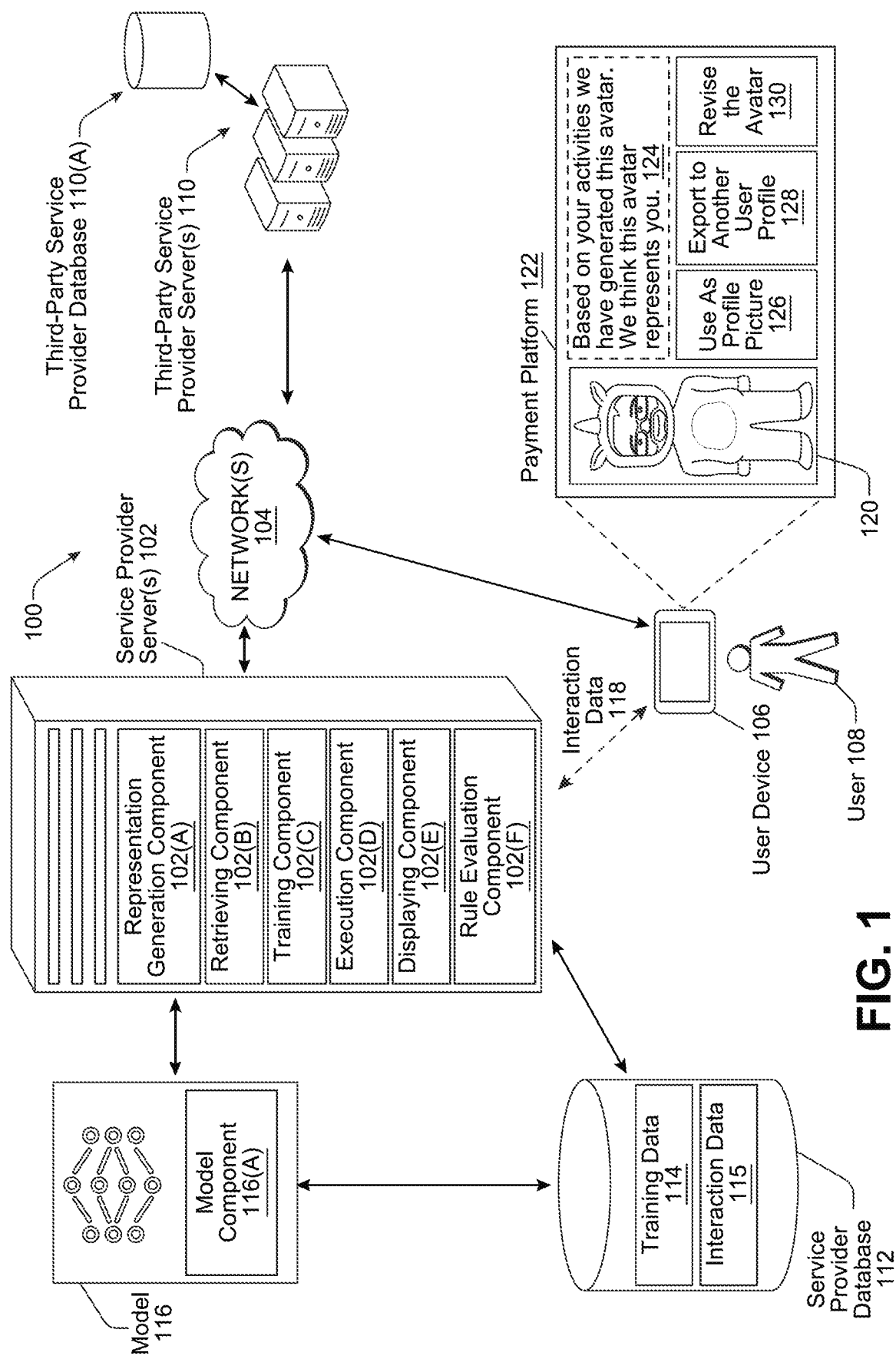
FIG. 1 illustrates an environment for an electronic representation generation system, according to an example described herein.

Generating, updating, managing, and/or presenting electronic representations using modeling is described herein. In one example, one or more computing devices associated with an electronic representation system may train one or more models to ingest interaction data associated with users and dynamically and/or intelligently generate one or more electronic representations. An electronic representation, which can be one or more of a graphical element, textual element, video element, and/or auditory element, can be representative of a user and/or their activity and/or can otherwise be used to customize and/or personalize user experiences for the user. In some examples, such electronic representations can be "dynamic" in that they can be generated or updated in real-time or near-real-time in response to new user activity. In some examples, such generation can be "intelligent" in that the computing device(s) utilize model(s), trained using machine learning techniques, to generate and/or update electronic representations without input from users. After generating an electronic representation for a user, the computing devices(s) may instruct a user device to output the electronic representation via a user interface, for example, by displaying an avatar for the user, outputting a song that is generated for the user, customizing a user experience for the user, or the like.

As used herein, an electronic representation may refer to any electronic content that is associated with a user, which may be used to represent the user and/or otherwise customize or personalize a user experience for the user. In some examples, the electronic representation may include and/or comprise a graphical element, textual element, video element, auditory element and/or any other element or combination of elements that can be presented in a two-dimensional, three-dimensional, or n-dimensional environment. That is, electronic representations can be single- or multi-dimensional. In some examples, the electronic representation can be presented in a virtual reality (VR) environment, an augmented reality (AR) environment, a mixed reality environment, or the like. Electronic representations can be static or dynamic. In some examples, an electronic representation can be associated with one or more attributes such as design attributes (e.g., color, shapes, shading, tinting, style, etc.), sound attributes (e.g., loudness, pitch, timbre, tonality, etc.), or the like. While techniques described herein relate to "generating" an electronic representation, "generating" can refer to generation of an entirely new electronic representation, generation of a portion of an existing electronic representation, generation of an attribute or overlay of an existing electronic representation, generation of an update or modification to a portion of an electronic representation, generation of a user experience based on or using the electronic representation, or the like.

In some examples, the electronic representation may be unique to a user. For instance, the electronic representation may include features that are not replicated for other users in the electronic representations for their user profiles. Such uniqueness can be used for uniquely identifying a user from other users associated with a service provider with which the electronic generation system described herein is associated.

In some examples, the electronic representation may not be unique to a user. In one example, the electronic representation may be associated with a user profile of a user. For example, an electronic representation may be associated with a user profile of a user of the service provider, which can indicate the user's activity using the service provider. The electronic representation can have attributes representative of the user's activity. The electronic representation can be used for verification, authentication, or the like. For example, the user profile having the electronic representation may be used for verifying identity. That is, an electronic representation may additionally or alternatively include attributes that are customized for the user that can be used for verification that the user is who they say they are and, in some examples, has attributes known by a select entity or entities for security purposes. Further, in some examples, the electronic representation can be used as a payment mechanism in lieu of payment card data. For example, when the user desires to make a payment, the electronic representation may be used as an identifier of the user and may be associated with a payment card number or other payment data. In some examples, the electronic representation can be used for customizing a payment instrument, such as a debit card, and/or a user experience associated with the service provider (e.g., onboarding, asset purchases, etc.). For example, as interaction data is generated for a user, for example, in association with designing or activating a payment instrument, one or more electronic representations can be presented that customize the experience for the user.

In some examples, the electronic representation can be configurable for use on social networking platforms, professional networking platforms, content streaming platforms, online marketplaces, gaming platforms, VR and/or AR platforms, or the like. In some examples, computing device(s) associated with the electronic representation system can modify aspects or attributes of the electronic representation to ensure interoperability across various platforms. In some examples, electronic representations can be minted on a blockchain as a non-fungible token (NFT). That is, the electronic representation can be a cryptographic asset on a blockchain that is associated with a unique identification code and metadata to distinguish it from other electronic representations or NFTs.

In an example, one or more computing devices associated with the electronic representation system can train one or more models using electronic content. Non-limiting examples of electronic content may include album covers, music videos, songs or albums (e.g., downloaded or streamed), podcasts (e.g., downloaded or streamed), electronic books (e.g., downloaded or streamed), movies and television shows (e.g., downloaded or streamed), social media posts, advertisements, communications, item characteristics as represented in online stores, merchant inventory, or catalogs, images of items as represented in online stores, merchant inventory, catalogs, fan art, websites, user-provided images, videos, audio files, and/or the like. In an example, the model(s) may be trained to generate electronic representations for users that are representative of interactions of the users. As a result, in some examples, the electronic representation system may dynamically generate, using the model(s), an electronic representation for a user based upon the user's interaction data without requiring the user to manually select attributes and configure an electronic representation (i.e., "automatically").

In various examples, a model, as described herein, may be a generative model, which, in some examples, can use artificial intelligence (AI). That is, in at least one example, an electronic representation can be generated using "generative AI." For example, the generative model may generate new electronic content (e.g., electronic representations), such as graphical elements, text elements, visual elements, and/or auditory elements, based at least in part on electronic content that corresponds to the user's interaction data. In at least one example, using generative models, the computing device(s) associated with the electronic generation system may be configured to learn enough of the physical world to adjust the appearance and behavior of an electronic representation such that it becomes indistinguishable from other humans in the real world, in one example without haptic feedback (in other examples, various haptics may be presented, such as through hand-held device components).

In some examples, as users interact with service providers (e.g., the service provider and/or third-party service providers), behavior and interactions with such service providers may be reflected in interaction data. With consent from a user, the electronic representation system can monitor interaction data, which can be representative of the user's interactions with the service provider and/or third-party service providers (e.g., what the user is buying or what the user is listening to), in real-time or near-real-time. In some examples, the model(s) (e.g., generative or other) may receive the interaction data, analyze the interaction data, and generate new electronic representations for the user and/or generate updates to the user's electronic representation. Such generating and/or updating can be performed automatically by the electronic representation system (e.g., without input from the user), for example in real-time or near-real-time, or upon receiving authorization from the user. That is, the electronic representation system can generate and/or update electronic representations based at least in part on real-time or near real-time monitoring of interaction data representative of the user's behavior.

Conventional techniques for generating electronic representations suffer from various technical challenges. For instance, such techniques use purely rule-based approaches or rely on user inputs to generate an electronic representation for users. Conventional techniques are therefore computationally inefficient due to the amount of user input required to generate electronic representations. Further such conventional techniques are generic, lacking personalization, which as described above, limits any sort of utility (e.g., use as a payment instrument, security, identity verification, etc.) associated with electronic representations. Some embodiments described herein may use an artificial intelligence model configured for automatically and intelligently generating an electronic representation using interaction data from different sources. As such, as described below, techniques described herein provide benefits over conventional techniques.

The methods and systems described herein provide specific and customized artificial intelligence training methods to train a model using specifically tailored training data to generate new digital content (e.g., electronic representation). The trained model may be specifically trained to generate digital content, which is a concept not possible using conventional human-implemented and/or computer-implemented methods. The trained model may be specifically designed to receive and/or create machine-ingestible signals using raw data and transpose the signals into digital images, videos, audio, text elements, visual elements, auditory elements, and/or the like. Such transformation of data into digital content is not possible using conventional computer-implemented methods or via generic (one-size-fits-all) modeling techniques. The methods and systems described herein are directed towards a specific manner with which training data can be generated and tailored, such that a model can be trained to achieve the abovementioned results. Therefore, the concepts discussed herein improve conventional methods by providing a customized and specially trained model.

Many conventional techniques for generating electronic representations may provide static electronic representations that do not change corresponding to how user behavior changes over time. This can be problematic in that static representations may become outdated and, in some examples, easily replicated or falsified. Further, static electronic representations may not be personalized or customized to individual users. Electronic representations discussed herein are dynamically generated and can be updated in real-time or near real-time in accordance with each user's unique interaction data. As the computing device(s) monitor transactions and/or other interactions, the computing device(s) can cause previously generated electronic representations to be updated or replaced to reflect updated transactions and/or interactions. This can ensure that such electronic representations are personalized and/or customized for individual users and accurately represent current or recent interaction trends, patterns, or behaviors. That is, as computing device(s) associated with the service provider monitor transactions and/or other interactions in real-time or near real-time, the computing device(s) can generate dynamic representations that are not easily replicated or falsified.

In an example, the computing device(s) can personalize and/or customize the electronic representations for individual users. In some examples, the electronic representations can have features embedded therein that are or represent personal data (e.g., such as personally identifying information or information usable for verifying or authenticating an identity of users) and/or payment data. This personal and/or payment data, or data that is particular to individual interactions, is so personal to the user that other users may not be able to replicate. This embedding of features can be known to the service provider but not to other users, which can make replicating or falsifying such electronic representations more difficult for fraudsters. Further, this can therefore enable use of electronic representations for real-time or near real-time verification or authentication. That is, stored electronic representations and/or the ability to generate duplicate electronic representations in real-time or near-real-time using the same data can enable the payment service to compare an electronic representation provided for verification or authentication at the time such is provided. In some examples, aspects of the electronic representations can be verifiable by the service provider by comparing attributes of the electronic representations with interaction data (known only to the service provider and user). Moreover, due to personalization and/or customization, such electronic representations can be used for uniquely identifying individual users, for example, for payments, as described above. In some examples, embedded personal data and/or payment data can be updated based on interaction data (e.g., based on payment types, locations of purchases, etc.) such that the electronic representations are dynamic and can be used for creating network connections with payment entities. Therefore, techniques described herein offer improvements to conventional techniques, such as electronic authentication techniques, by making them more secure and mitigating fraud, as described above.

Many conventional techniques use a one-size-fits-all approach to displaying graphical user interfaces or series of graphical user interfaces, for example, for workflows (e.g., onboarding, transactions, etc.). For instance, conventional techniques may use the same workflow for user onboarding or device activation of all users. As a result, conventional techniques may be more time-consuming because various steps of the workflow may not necessarily apply to a particular user. This can waste computing resources and bandwidth by presenting steps of a workflow that are not relevant to a particular user. Further, this can cause unnecessary friction, resulting in a poor user experience for users. In contrast, using the methods and systems described herein, a trained model may be used to customize workflows for individual users. Additionally, individual graphical user interfaces may be customized for different users. Therefore, the methods and systems discussed herein improve conventional user interfaces by providing dynamic and customized user interfaces. This can save computing resources and bandwidth by presenting steps in a workflow that are determined to be relevant to a particular user and can improve user experiences.

As speeds of communication among devices increases, many users use electronic representations (e.g., images, such as quick response (QR) codes) to facilitate payments (e.g., pay other users or purchase a product in a point-of-sale transaction). However, conventional electronic representations typically include encrypted visual elements that are not easily verifiable for most (if not all) users. This inability to verify the electronic representation has created security concerns. For instance, a user may use an image of a QR code to pay another user. However, the user may not be able to identify whether the QR code image itself has been tampered with. In another example, the payor cannot visually determine whether the QR code belongs to the correct payee. In contrast, the electronic representations described herein provide a uniquely customized electronic representation that is easily identifiable and verifiable by users, such that any tampering or interference with the electronic representation itself may be easily identified by the users. That is, because the electronic representations generated herein are personalized or customized for individual users—sometimes having information embedded therein particular to individual users—such electronic representations are more easily verifiable and secure. In some examples, aspects of the electronic representations can be verifiable by the service provider by comparing attributes of the electronic representations with interaction data (known only to the service provider and user). As a result, the dynamically generated electronic representations having personal data and/or payment data embedded therein improve an existing technology by increasing the security of electronic transactions and allowing for more efficient identity verification.

Using the methods and systems described herein, one or more computing devices of a service provider that may be integrated with other service providers (also referred to herein as third-party service providers) can generate an electronic representation using modeling technology. FIG. 1 illustrates an example environment for providing an electronic representation system 100 in which computing device(s) associated with a service provider can generate, update, manage, and/or present electronic representations. An electronic representation, as described herein, can be generated and/or updated based on a user's interaction data with the service provider and/or the third-party service providers integrated with the service provider. In the example illustrated in FIG. 1, the computing device(s) may generate the electronic representation for the user where the electronic representation is a profile image or avatar, but the disclosure is not intended to be limited to this particular example.

Features depicted and described in relation to FIG. 1 are similar to features depicted and described in relation to FIGS. 12-16. The electronic representation system 100 includes service provider server(s) 102 that can communicate over a network 104 with a user device 106 and/or server(s) 110 associated with one or more third-party service provider(s). Even though a single service provider server is shown for the service provider server(s) 102, it is understood that some examples may include more than one service provider server. The service provider server(s) 102 can be associated with a service provider that can provide one or more services for the benefit of user 108. Various actions attributed to the service provider can be performed by the service provider server(s) 102. As used herein, a service provider may be any institution or entity that provides services to users. In some examples, the service provider may provide payment services, payment processing services, music streaming services, and/or the like. In some examples, the service provider may be integrated with one or more third-party platforms provided by the third-party service provider server(s) 110.

A platform, as used herein, refers to a user-facing (or consumer-facing) set of user interfaces that allow a user to interact with the service provider server(s) 102 and/or the third-party service provider server(s) 110. Non-limiting examples of platforms may include a payment platform (e.g., making payments, processing payments, etc.), a music streaming platform or any other streaming platform (e.g., music, podcasts, video, entertainment (such as movies or television shows), AR presentation, VR presentation, etc.), an online gaming platform, an online shopping platform, a professional networking platform, a customer relationship management (CRM) platform, an online investment platform, an online banking platform, a cryptocurrency exchange platform, a retirement planning platform, a health and fitness related platform, a social networking platform, etc. provided by the service provider server(s) 102 and/or third-party service provider server(s) 110. In an example, the third-party service provider server(s) 110 may provide a website that allows users to post comments (e.g., an online forum). In that example, the website is a platform provided by the third-party service provider server(s) 110. In another example, a platform may be a payment platform provided by the service provider server(s) 102 in form of a payment application. Therefore, "platform" as used herein can be implemented as any user-facing user interface, such as a mobile application, a website, and the like. A "platform," therefore can be provided by a service provider and can provide user interfaces for enabling a user to interact with services of the service provider via one or more network-connected computing devices.

The service provider server(s) 102 can communicate with a user device 106 over the network(s) 104. As used herein, the user device 106 may refer to any electronic device (operated by a user or a merchant) that can transmit interaction data and/or requests to the service provider server(s) 102. Non-limiting examples of the electronic device may include a mobile device or a personal computer associated with the user 108, a merchant's computer, and/or a point of sale terminal. The user device 106 may have the capability of presenting (e.g., displaying, playing, or otherwise outputting) the electronic representation 120. Additionally, the user device 106 may have the capability of scanning or otherwise ingesting the electronic representation 120 (e.g., as described in the context of FIG. 10).

In some examples, the service provider server(s) 102 can communicate with the user device 106 via a platform, such as a payment platform 122 that can be provided by the service provider. The payment platform 122 can enable the user 108 to access the services of the service provider. The user 108, as used herein, may refer to a customer, a buyer, a merchant, a seller, a borrower, an employee, an employer, a payor, a payee, a courier, or any person or entity associated with the service provider server(s) 102. Therefore, a user profile refers to an account that has been created (e.g., by the service provider server(s) 102) for the user to interact with one or more services provided. For instance, the user 108 may create a user profile to use the payment platform 122.

A user profile can be associated with data representative of the user 108. Such data (e.g., user profile data) can include demographic data (e.g., age, birthdate, geographic location, contact information, etc.), payment data (e.g., payment identifiers, linked bank accounts, etc.), interaction data (e.g., how a user has interacted with various platforms), etc., as discussed herein. Therefore, a user profile can include a collection of data associated with a particular user's interactions (e.g., interaction data) with one or more service providers. For instance, a user may have a user profile that corresponds to a payment platform (e.g., accessible via a mobile application or web page) associated with the service provider server(s) 102 and another user profile for a music streaming platform that is integrated with the service provider server(s) 102. In such examples, as the user 108 interacts with the payment platform (e.g., payment platform 122) and the music streaming platform, the user's interaction data can be monitored in association with their user profile. In additional or alternative examples, as the user 108 interacts with other platforms and/or service providers, the user's interaction data can be monitored in association with their user profile. As illustrated in FIG. 1, as the user 108 interacts with the service provider via the payment platform 122, interaction data 118 can be generated and/or received, which as described below, can be used for generating an electronic representation for the user 108.

In an example, the service provider server(s) 102 may be in communication with the service provider database 112. The service provider database 112 may be a database internal or external to the service provider server(s) 102. Non-limiting examples of data included within the service provider database 112 may include training data 114 that can be used to train the model 116 and interaction data 115 that represents interactions of one or more users using the payment platform and/or integrated third-party platforms. Additional or alternative data can be stored in the service provider database 112.

The training data 114 may include electronic content that is associated with how various concepts are electronically represented. For instance, the training data 114 may include, but is not limited to, album covers, music videos, songs or albums (e.g., downloaded or streamed), podcasts (e.g., downloaded or streamed), electronic books (e.g., downloaded or streamed), movies and television shows (e.g., downloaded or streamed), social media posts, advertisements, communications, item characteristics as represented in online stores, merchant inventory, or catalogs, images of items as represented in online stores, merchant inventory, catalogs, fan art, websites, user-provided images, videos, audio files, and/or the like.

The interaction data 115 may include data that is associated with one or more users. Interaction data 115 may include transaction data, merchant data, content data, social networking data, etc. Additional details associated with different types of interaction data are provided below with reference to FIG. 2A. In some examples, the interaction data 115 can be "direct" interaction data, indicative of actions taken by the users using their user accounts. In some examples, the interaction data 115 can be indirect data, which can be inferred or otherwise determined based on actions taken by the users using their user accounts. The interaction data 115 may be periodically updated via monitoring users interactions with various platforms. For instance, the interaction data 118 may be periodically added to the interaction data 115, such that the interaction data 115 includes historical interactions of the user 108 throughout a defined time. In some examples, the interaction data 115 can store user profile data and/or user profiles can store portions of interaction data.

In some examples, data stored in the service provider database 112 can be "first-party data" or data generated by the service provider server(s) 102. In some examples, data stored in the service provider database 112 can be "third-party data" or data received from third-party service provider server(s) 110, for example, via one or more application programming interface(s) (API(s)) or the like. Additional or alternative data can be stored in the service provider database 112.

The electronic representation system 100 may also include one or more models, such as model 116 that is trained using the training data 114 and is configured to generate electronic representations for users. While the model 116 is shown as a single model, in some examples, the electronic representation system 100 may include multiple models. A model component 116(A) can access the model 116 for use as described below.

The service provider server(s) 102 can comprise one or more functional components, such as the representation generation component 102(A), retrieving component 102(B), training component 102(C), execution component 102(D), displaying component 102(E), and rules evaluation component 102(F). Each functional component can store instructions that when executed, perform operations as described herein. The representation generation component 102(A) generates electronic representations or updates thereto, as described herein. Additional details are provided below with reference to FIG. 2A. The retrieving component 102(B) retrieves data, for example, from the service provider database 112. The training component 102(C) trains one or more models, as described below with reference to FIG. 2B. In some examples, the representation generation component 102(A) can use the execution component 102(D) to execute model(s) to analyze data. For instance, the execution component 102(D) may execute one or more models (e.g., model 116) that are trained by the training component 102(C) to generate electronic representations. In some examples, the representation generation component 102(A) can use the rules evaluation component 102(F) for generating an electronic representation using one or more rules. The displaying component 102(E) can cause electronic representations to be presented. Additional details associated with each component are described below with reference to FIGS. 2A and 2B.

In an example, the user 108 may interact with the payment services associated with the service provider server(s) 102. For instance, the user 108 may interact with one or more features of the payment platform 122 to send money to a friend, add money to their account, and/or purchase cryptocurrencies. Such interactions (e.g., represented by interaction data 118) can be monitored and analyzed by the service provider server(s) 102. In some examples, the interaction data 118 can be stored in the service provider database 112. That is, a portion of the interaction data 115 can comprise interaction data 118. In some examples, interaction data 118 can be additionally or alternatively stored in a user profile of the user 108. Examples of interaction data 118 are provided below.

In some examples, the retrieving component 102(B) can access stored interaction data using an identifier associated with the user 108. For instance, in an example, the user 108 may be an existing customer of a payment service associated with the service provider server(s) 102 and may use an identifier for authentication. The service provider server(s) 102 may identify an identifier associated with the user 108, such as login credentials, username, a device identifier, or the like. Using the identifier, the service provider server(s) 102 may query the service provider database 112 and/or other data sources (third-party service provider server(s) 110) to gather interaction data associated with the user 108. The third-party service provider server(s) 110 may additionally or alternatively store the data associated with the user 108 in a data repository, such as third-party service provider database 110(A).

Using the retrieved interaction data, the service provider server(s) 102 (e.g., via the representation generation component 102(A)) can generate an electronic representation or an update thereto. In some examples, the representation generation component can generate the electronic representation 120 in response to a request (e.g., input from the user 108) to generate and/or update an electronic representation 120. In some examples, the generation of the electronic representation 120 may be entirely automatic and may not require input from the user 108.

In some examples, the representation generation component 102(A) can utilize the execution component 102(D)) to execute the model 116 to generate an electronic representation 120 or a update thereto. That is, the execution component 102(D) may use the model 116 to generate an electronic representation 120 or an update thereto, based on the retrieved interaction data. In addition to (or instead of) using the model 116, the representation generation component 102(A) can utilize the rules evaluation component 102(F) to analyze the interaction data 118 and generate the electronic representation 120 or update thereto. That is, in some examples, the representation generation component 102(A) may use a rule-based approach to generate and/or revise the electronic representation 120. For instance, the service provider database 112 may store one or more rules, which can be associated with thresholds, events, conditions, or the like, that can be analyzed in view of the received interaction data 118 (e.g., by the rules evaluation component 102(F)) to determine whether a particular rule applies to the received interaction data 118. If a rule applies, the representation generation component 102(A) can generate an electronic representation or update thereto. As a non-limiting example, a rule may indicate that if the user 108 has purchased more than $1000 in cryptocurrency, their electronic representation may include a gold chain. If the user's interaction data 118 indicates the user has purchased more than $1000, the representation generation component 102(A) may generate an electronic representation with a gold chain or cause a gold chain to be added to an existing electronic representation.

In the depicted example, the electronic representation 120 may be a graphical representation of the user's interaction data 118. That is, the graphical representation can have attributes that are associated with the user's interaction data. In some examples, the representation generation component 102(A) can generate the graphical representation and/or attributes associated therewith based at least in part on the user's interaction data 118. As illustrated in FIG. 1, the graphical representation is an avatar customized for the user 108. In this particular example, the clothing of the electronic representation (e.g., a unicorn outfit) may correspond to the user's interest in electronic dance music (as determined by the interaction data 118), and an object (e.g., the glasses) may correspond to the user's recent purchase of glasses from a merchant (as determined by the interaction data 118). In some examples, the electronic representation 120 can be output by the model 116 (e.g., via the execution component 102(D)). In some examples, the unicorn outfit may be earned, and thus associated with the avatar of the user, upon a determination, using the interaction data 118, that the user 108 spent an amount above a threshold or obtained a particular status. That is, a rule applicable to amount spent or status can be applied by the rule evaluation component 102(F) to generate the resulting electronic representation 120.

Although depicted as being a graphical representation, the electronic representation 120 may include additional or alternative electronic content, such as text representation, haptic representation, and/or an auditory representation. In some examples, a portion of an electronic representation can be updated or generated using techniques described herein. Further, in additional or alternative examples, the electronic representation can be used to customize or personalize a user experience of the user within the payment platform 122.

The service provider server(s) 102 may instruct the user device 106 to display the electronic representation 120, for example, on a user interface of the payment platform 122. For instance, via the displaying component 102(E), the service provider server(s) 102 may cause the electronic representation 120 to be displayed. In some examples, the service provider server(s) 102 may also display the text 124 describing that the electronic representation 120 (e.g., avatar) represents the user 108 based on the user's activities (as determined by the interaction data). In this example, the user interface may also display a user interface element 126 allowing the user 108 to use the electronic representation 120 as a profile picture for payment platform 122, user interface element 128 allowing the user 108 to export the electronic representation 120 to other platforms/user profiles (e.g., third-party social networking user profiles), and the user interface element 130 allowing the user to revise one or more attributes of the electronic representation 120. 122. As used herein, a user interface element may refer to any element of the user interface that is configured to receive an input from a user operating/viewing the user interface. Non-limiting examples of user interface elements may include radio buttons, input boxes, drop-down menus, interactive buttons, and the like.

In the depicted example, the service provider server(s) 102 may receive a request (from the user 108 operating the user device 106) to generate the electronic representation 120. As a result, the service provider server(s) 102 generates the electronic representation 120 and displays the electronic representation 120 on the user device 106. In some examples, in response to receiving an instruction (e.g., via user interface element 126), the service provider server(s) 102 may assign the electronic representation 102 as a profile picture representing the user 108. As such, when an input is received to view the user's profile, the electronic representation 102 can be displayed. In some examples, the electronic representation 120 may be displayed when other users view the user's profile. In some examples, as will be described in FIG. 10, the user 108 may use the electronic representation 120 to pay or request payments. In this way, the user 108 may facilitate a transaction using the electronic representation 102 that is unique to the user 108. In some examples, the electronic representation 102 can be used for authenticating or verifying the user 108. For example, as described above, the electronic representation 102 can be embedded with personal data and/or payment data that can be updated in real-time or near-real-time based on the transaction data. In some examples, the service provider server(s) 102 can analyze the electronic representation 102 in real-time or near-real-time in view of stored interaction data to determine whether the electronic representation 102 has attributes representative of the interaction data. In some examples, the service provider server(s) 102 can generate a new electronic representation at a time of authentication or verification to determine if the generated electronic representation is similar (as represented by a similarity metric) to or otherwise corresponds to the electronic representation 102 submitted. If the electronic representations are sufficiently similar (e.g., satisfy a similarity metric), the service provider server(s) 102 can authenticate or verify the user.

As described above, the electronic representation 120 may be a dynamic representation where one or more attributes of the electronic representation 120 is periodically updated/revised. For instance, the service provider server(s) 102 may continuously monitor interactions of the user 108 and may update the electronic representation 120 in accordance with new data retrieved, as described in FIG. 2A (e.g., steps 260-266). In this way, the electronic representation 120 may evolve with the user 108 and may change as the user 108 continues interacting with various platforms and generates new/updated interaction data. Accordingly, this automatic updating eliminates the need for the user 108 to manually change their electronic representation. The ability of representation generation component 102(A) to dynamically generate and/or update electronic representations enables the electronic representations to be used for authorization, verification, or the like. Further, such dynamic updates can improve the security associated with transactions and profiles and can reduce fraud, as described above.

Figure 2A:
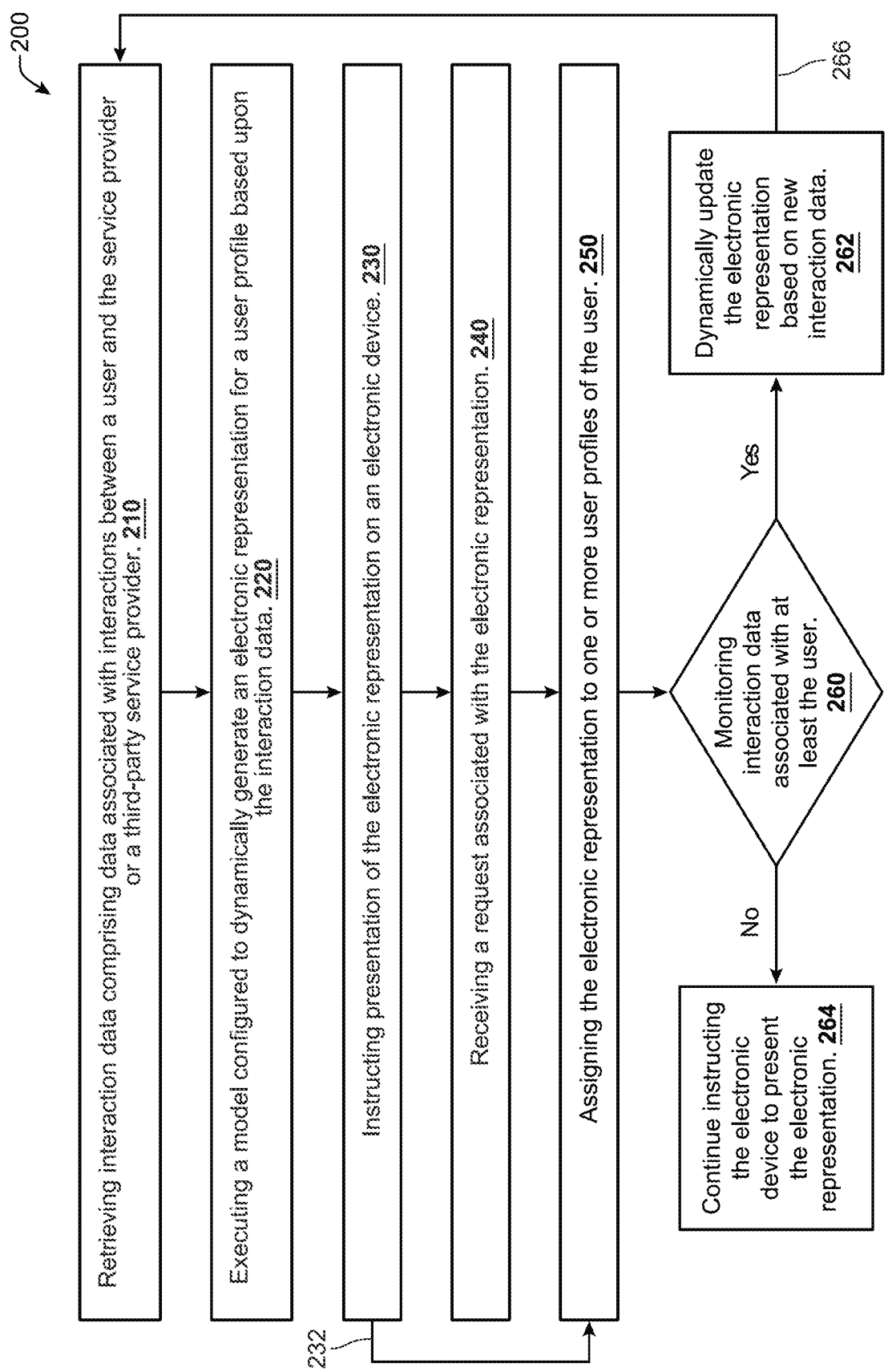
FIG. 2A illustrates a flowchart depicting operational steps for an electronic representation generation system to generate an electronic representation, according to an example described herein.

FIG. 2A illustrates a flowchart depicting operational steps for an electronic representation generation system to generate an electronic representation, according to an example described herein. For instance, the method 200 may be applied using the features discussed in the electronic representation system 100 (depicted in FIG. 1) to generate one or more electronic representations, such as the electronic representation 120 depicted in FIG. 1.

The method 200, and other methods described herein, are illustrated as collections of steps (depicted as blocks) in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the method, or alternative methods, and not all of the blocks need be executed. For discussion purposes, the methods are described with reference to the environments, architectures and systems described in the examples herein, although the methods may be implemented in a wide variety of other environments, architectures and systems.

The method 200 includes steps 210-244. However, other examples may include additional or alternative steps or may omit one or more steps altogether. The method 200 is described as being executed by one or more service provider server(s) (e.g., the service provider server(s) 102 depicted in FIG. 1 and/or servers 1202, 1302 depicted in FIGS. 12-13). However, one or more steps of method 200 may also be executed by any number of computing devices operating in the distributed computing system described herein. For instance, one or more computing devices (e.g., user devices) may locally perform part or all the steps of the method 200. For instance, a platform associated with the service provider (e.g., the payment service) may be executing on the user device and may perform the method 200.

The method 200 may be performed by one or more service provider server(s) 102, or specially configured components associated therewith, to generate an electronic representation, for example, for association with a user profile. In some examples, the method 200 can be performed in association with the generation of a new user profile. When generating a new user profile, the user may be requested to answer various questions and input various information to complete an onboarding method. During this onboarding method, the user may have an option to request the generation of an electronic representation to associate with the user profile. In such examples, electronic representation generation can be an aspect of the onboarding method that occurs automatically without a request. In some examples, the onboarding method can be customized with electronic representation(s) generated in real-time or near-real-time based on the user's answers to the questions and/or information inputted during the onboarding method. In some examples, such customization can be done without having received a request or input from the user.

In some examples, the method 200 may be performed automatically or periodically to generate a new electronic representation or update the electronic representation. For example, in some instances, the method 200 can be performed after expiration of a predefined period of time (e.g., every day, week, month, quarter), upon request from a user, upon a certain action taken by the user (e.g., certain spending amount, certain number of downloads), or the like. For example, the service provider server(s) 102 may actively monitor the user's interactions and other data pertinent to their user profile, via interaction data and/or other data stored in a database, and may generate a new electronic representation or update the electronic representation based on monitoring the user's interactions. That is, the service provider server(s) 102 can monitor interaction data associated with user profiles in real-time or near real-time and can generate or update electronic representations based on such real-time or near real-time monitoring.

As such, the method 200 can be used to dynamically generate and/or update electronic representations, as described herein. In some examples, the service provider server(s) 102 may update the electronic representation automatically or prompt the user to authorize the update to the electronic representation. Additional details are provided below with reference to the method 200.

At step 210, the service provider server(s) 102 (e.g., via the retrieving component 102(B)) may retrieve interaction data associated with a user for generation of an electronic representation. The service provider server(s) 102 may query various databases (e.g., internal databases monitoring a user's interactions, transactions, and/or purchases) and/or external databases associated with third-party service providers recording users' interaction data and identify interaction data associated with the user.

Interaction data, in some examples, may refer to any data associated with actions performed (directly or indirectly) by a user, a service provider, and/or one or more third-party service providers. Interaction data may include any data that is generated as a result of the user receiving services or otherwise interacting with the service provider and/or a third-party service provider.

Interactions, in some examples, may refer to any electronic interaction that can create an electronic record associated with the user. As described above, an interaction may be a "direct interaction," whereby the user has directly interacted with the service provider and/or a third-party service provider. In an example where the service provider provides payment services, a direct interaction may be requesting or facilitating a transaction using a platform, such as a website or a mobile application, provided by the payment service provider. Another example of a direct interaction may be downloading or streaming music from a music service provider that is integrated with the payment service provider. Interaction data may include a number of downloads, number of streams, artist information, album information, song information, and the like.

In an example, a user's interaction data may include data associated with the user's accounts, even though the user has not directly created or controlled that account. This data is sometimes referred to as inferential, implicit, or indirect data associated with the user. For instance, the user may use the service provider server(s) 102 or a third-party service provider to purchase assets for investment purposes (e.g., stocks, bonds, cryptocurrency, etc.) that is controlled by another person (e.g., an investment agent or an automated investment algorithm). Even though the user does not directly select investment options and strategy, the user's investment may increase or decrease in accordance with market movements or actions performed by the service provider server(s) 102, third-party service provider, or the investment agent. Therefore, the user's new investment data (e.g., amount of cryptocurrency owned and the respective value of the account in a fiat currency) may be included within the definition of the interaction data. In another example, the user may listen to a specific artist on a music streaming platform. As a result, the music listened to by the user may be considered a "direct" interaction of the user. However, in some other examples, the user may listen to pre-generated playlists or music that is predicted/inferred (by the music streaming platform) to be interesting to the user. This data can also be analyzed by the service provider server(s) 102. Therefore, the digital footprint of the user (user's interaction data) may include more than the electronic content that the user has directly or explicitly selected to consume.

In at least one example, interaction data may include transaction data including any data that is associated with peer-to-peer transactions, point-of-sale transactions, investments, and/or the like. For instance, when a user, who is logged into a user profile, purchases an item, the service provider server(s) 102 may retrieve data associated with the item purchased (e.g., metadata associated with attributes of the item purchased such as their category, color, weight, price, whether the item was on sale, and the like), the amount paid, method of payment, user devices used to access the user profile, location of the transaction, a timestamp of the transaction, currency (e.g., whether the user used fiat money, credit, debit, or cryptocurrency), any information associated with the recipient or merchant, and any other information associated with the purchase. The transaction data may be different depending on the type of the user interaction or transaction. For instance, if the transaction is a peer-to-peer transaction, the contextual data may include payment platform data (e.g., usage, location of the user, location of the sender/recipient) in addition to the amount paid/received. In another example, if the interaction data is associated with an investment, the contextual data may indicate the type of investment, whether the investment was profitable, investment data, and the like. In another example, if the interaction data is associated with lending (e.g., a transaction in which the user initiated an installment loan, used credit offered by the service provider, or the like), the contextual data may include data associated with the property itself, such as location of the property, property value, and the like. The transaction data is not limited to a particular currency. For instance, transaction data may include transactions facilitated via cryptocurrency as well as government-issued currency. In those examples, the transaction data may include data associated with the user's cryptocurrency account, such as amount owned, type of cryptocurrency, metadata associated with how the cryptocurrency was purchased, and the like.

In some examples, interaction data may include data received from one or more merchants. In some examples, merchant data can indicate a merchant category class (MCC), a location, contact information, images, videos, advertisements, communications, inventory, catalogs, available rewards, incentives, discounts, coupons, etc. associated with individual merchants. In some examples, merchant data can include links to merchant websites, online stores, social media pages, etc. Merchant data can include electronic content associated with merchants, such as the electronic content associated with images, videos, advertisements, communications, inventory, catalogs, websites, online stores, social media pages, etc.

In some examples, the interaction data may also include content data consumed or otherwise accessed by the user, for example, via one or more streaming service providers. For instance, if the user uses the service provider and/or third-party service provider(s) to access audio or video files, such as streaming music or watching movies, the service provider server(s) 102 may retrieve content data associated with the electronic content accessed and consumed by the user. For instance, content data may include a list of recording artists whose music has been streamed by the user, the duration of each streaming, frequency of the consumption, songs liked and disliked by the user, and the like. The content data may also include data associated with the artists themselves. For instance, if a user streams music from a particular artist, the content data may include data associated with that artist, such as attributes of their music (e.g., category of the music, such as pop music, rap music, or classical music). The content data may also include electronic content associated with the artists, such as album cover images, music videos, artist profiles, posters, and social networking posts, etc. In another example, content data can indicate podcasts listened to, guests of the podcast, the podcast host, etc.

The interaction data may also include social networking data associated with the user and/or any of the content accessed by the user. For instance, upon receiving consent from the third-party social networking platform and the user, the service provider server(s) 102 may retrieve social networking data associated with the user's social network profile activities via the social networking platform. Accordingly, the social networking data can include demographic data provided by the user to generate the social networking user profile, a profile image, video, representation and/or other images, videos, representations posted to a social networking platform, social networking posts, social networking interactions (e.g., likes, shares, comments, etc.), social networking activity while interacting with the service provider (e.g., social network activity while conducting a transaction using a payment service), and the like.

Additional or alternative data representative of user interactions can be associated with the interaction data. As described herein, the model may also consider contextual data associated with the electronic representation when generating the electronic representation. For instance, the electronic representation may correspond to the platform with which it is presented. In a non-limiting example, an electronic representation generated for a social networking website may be different than another electronic representation generated (using the same data for the same user) for a music streaming platform. Accordingly, the context data may also be inputted by the user or retrieved by the service provider server(s) 102.

In an example, service provider server(s) 102 (e.g., via the representation generation component 102(A)) may dynamically generate an electronic representation for the user based at least in part on the interaction data collected in step 210. In some examples, the representation generation component 102(A) can utilize the execution component 102(D), which can execute the model 116, to generate the electronic representation. That is, as shown at step 220, the execution component 102(D) can execute a model configured to dynamically generate an electronic representation for a user profile based on the interaction data. In some examples, the model 116 may have been previously trained to generate electronic representations, as described in FIG. 2B, below. In some examples, as described above, the representation generation component 102(A) can utilize the rule evaluation component 102(F) to generate an electronic representation based at least in part on one or more rules. In some examples, the representation generation component 102(A) may use outputs from the execution component 102(D) and/or the rule evaluation component 102(F) to generate the electronic representation. Additional details are provided below.

Figure 2B:
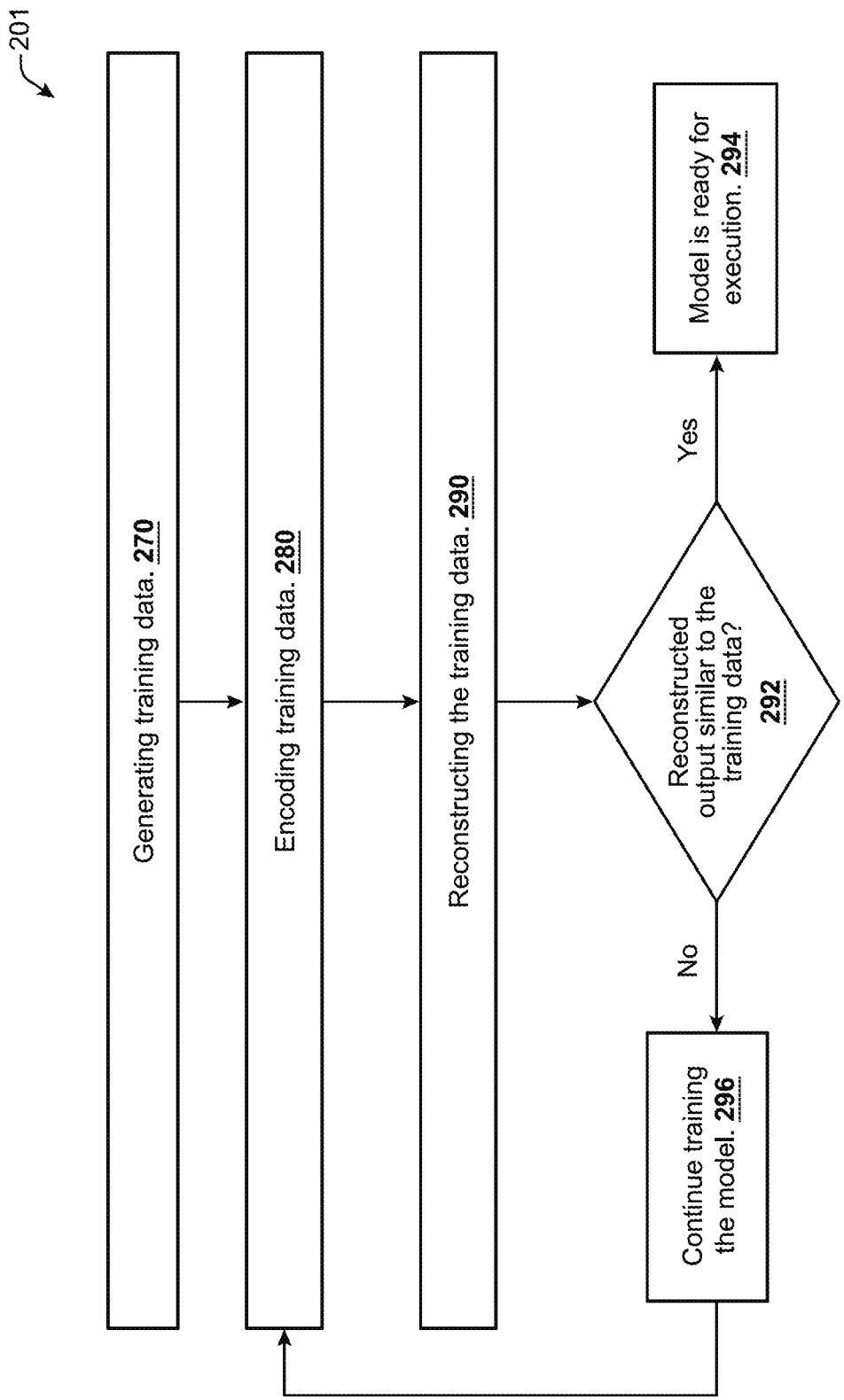
FIG. 2B illustrates a flowchart depicting operational steps for an electronic representation generation system to train a model, according to an example described herein.

FIG. 2B illustrates a flowchart depicting operational steps (e.g., method 201) for an electronic representation generation system to train a model, according to an example described herein. The resulting model can correspond to the model 116 described above with reference to FIG. 1.

The method 201, and other methods described herein, are illustrated as collections of steps (depicted as blocks) in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the method, or alternative methods, and not all of the blocks need be executed. For discussion purposes, the methods are described with reference to the environments, architectures and systems described in the examples herein, although the methods may be implemented in a wide variety of other environments, architectures and systems.

At step 270, the service provider server(s) 102 (e.g., via the training component 102(C)) may generate training data used to train the model. In this step, the service provider server(s) 102 may gather training data, as described above with reference to FIG. 1. As described above, the training data can include electronic content including, but not limited to, album covers, music videos, social media posts, advertisements, communications, item characteristics as represented in online stores, catalogs (e.g., electronic or otherwise associated with electronic media elements), fan art, social media posts, or advertisements. The training data can represent things, behaviors, or the like. The training data may or may not be labeled or otherwise have an explicit association with a thing or behavior. For instance, some images may also include data (e.g., metadata) indicating their content. However, this might not be the case for some other images within the training data. In some examples, the training data can also include context data, as described herein.

The training data may also include data associated with existing users. For instance, the training data may include existing user profiles, demographic data associated with the set of existing user profiles, content corresponding to one or more music media accessed by the set of existing user profiles, social media activity associated with the set of existing users, and/or advertisements associated with merchants associated with the interaction data.

In some examples, optionally, the service provider server(s) 102 may perform various clean-up protocols to achieve better model training. The service provider server(s) 102 may refine the data retrieved to improve the quality of the training data. For instance, the service provider server(s) 102 may de-duplicate various data points. In another example, the service provider server(s) 102 may change various frequencies to achieve more uniform data distribution. For instance, if interaction data is recorded more frequently, the data collected may be voluminous. In an effort to reduce the number of data points, the service provider server(s) 102 may increase the window of time and thereby decrease the frequency of data collection.

At step 280, the service provider server(s) 102 (e.g., via the training component 102(C)) may encode the training data. For instance, the training component 102(C) may use a model, such as an auto-encoder (e.g., variational auto-encoder or VAE), to analyze the training data and to compress various data within the training data into a latent space (e.g., a region in the latent space that represents similar data). In some examples, this can be referred to as "deconstruction" of the training data. In some examples, the model may use a dimensionality reduction protocol in which each electronic content (within the training data) is transformed into a latent space. For instance, images, videos, songs, and text relating to a particular attribute (e.g., images, videos, and text elements related to cats) may all be compressed into a same region of the latent space. The latent space may refer to a mathematical representation of the electronic content (e.g., a mathematical space that maps back to the electronic content within the training data ingested by the model). For instance, a latent space representation of an album cover may be a mathematical representation of that album cover. In another example, a latent space representation of a song may include numbers that are not readily identifiable by a human but represent the song itself when analyzed by model. Representing the training data in the latent space allows the model to analyze different mediums of data. For instance, the training data may include different types of data (e.g., digital images, sound files, video files, and text files). By representing different types of data in the latent space, the model may analyze and compare different types of data, as opposed to comparing them in their original form (e.g., comparing a song to a video). Therefore, training the model using the method 201 creates efficiencies not present in generically trained models.

The model may first transpose the training data into the respective representations within the latent space and may analyze the data within the latent space (e.g., by using clustering protocols). For instance, when ingesting images and transferring them into the latent space, the images' representations can be clustered, and the clustered data may represent a commonality among the images. In a non-limiting example, the model may ingest training data that includes several album covers. Instead of analyzing the album covers themselves, the model may analyze each album cover's representation within the latent space. In some embodiments, the model may utilize an unsupervised or semi-supervised method where the ingested electronic content is randomly assigned to clusters and, after one or more iterations, the data converges upon a meaningful attribute. As a result, while the album covers may not necessarily resemble each other in their original form, their latent space representation may allow the model to cluster the album covers and, after one or more iterations, identify clusters of album covers that correlate to each other or have commonalities that could indicate how different genres of music can be visualized. For instance, a cluster of album covers may indicate that reggae music is usually visualized via black and yellow colors.

At step 290, the service provider server(s) 102 (e.g., via the training component 102(C)) may reconstruct the encoded data using a model, such as a neural network. In some examples, the training component 102(C) can utilize generative adversarial networks (GANs) for reconstructing the encoded training data. The GANs model may include an objective function, wherein a generator minimizes the objective function against an adversarial network (discriminator) that tries to maximize the objective function. When using GANs, the model may use the generative network that generates electronic representation candidates and a discriminative network that evaluates the candidates. GANs may utilize unsupervised machine learning based on indirect training through the discriminator. Using GANs, the model can be trained to generate new electronic representations. In an example, the model may repeat encoding the data and reconstructing the data as many times as necessary to train itself.

In an example, by implementing step 280 and 290, the training component 102(C) can use an auto-encoder to encode the training data. Using an auto-encoder or a VAE may entail learning data representations in an unsupervised manner. In performing this encoding, the model may be self-supervised because it may generate its labels from the training data. In such an example, an encoder can learn the compact representation of data included within the training data and a decoder can decompresses it to reconstruct the data (e.g., step 290). Using auto-encoders (and decoders), the training data ingested by the model may be compressed and taken into a different space, analyzed, and then decompressed back into its original form.

Because of the dimensionality reduction, the model may analyze the ingested training data more efficiently than conventional approaches (e.g., because the size of the representation of an image of a store logo or a song may be less than a corresponding image or sound file). For instance, two images of the same object taken with different lighting conditions may differ when analyzed at a pixel level. However, when analyzed with respect to their latent representations, content may be easier to identify as similar (e.g., the model may recognize that the objects depicted are the same).

At step 292, the service provider server(s) 102 (e.g., via the training component 102(C)) may determine whether a reconstructed output is similar to the training data. That is, the training component 102(C) may evaluate the accuracy of the model by comparing reconstructed outputs (e.g., reconstructed images or the like) with the training data (e.g., a training image) to determine a similarity between the two. When the similarity satisfies a threshold, the method 201 moves to the step 294 in which the model is identified as ready to be implemented and executed to generate electronic representations of users. However, if the similarity does not satisfy the threshold, the method 201 moves to the step 296 and continues training the model until the threshold is met. The model may repeat encoding and reconstructing the data within the training data and continuously and iteratively train itself.

In one example, the model may ingest training data that includes fan art, album covers, advertisements, and the like associated with electronic dance music. As a result, the model may cluster fan art, album covers, advertisements, and the like based on their respective commonalities and learn patterns and correlations among the clusters. As a result, when generating an electronic representation for a user that listens to electronic dance music (as indicated from interaction data representative of the behavior), the model may use the learned correlations to generate textual, visual, and/or auditory elements that are representative of the fan art, album covers, advertisements, and the like. For instance, the model may determine that electronic dance music can be visualized using predominately purple color schemes (as indicated from commonalities among the fan art, album covers, advertisements, and the like). In another example, the model may learn that classic rock music can be visualized using darker colors (as indicated from commonalities among the fan art, album covers, advertisements, and the like). Of course, different things or behaviors can be represented by different attributes other than color. As described above, electronic representations can have different design attributes (e.g., color, shapes, shading, tinting, style, etc.), sound attributes (e.g., loudness, pitch, timbre, tonality, etc.), or the like. The model, through encoding and reconstruction, can learn how to represent these attributes based on things or behaviors identified in interaction data.

In another example, the model may ingest training data that includes merchant logo images or representations. As a result, the model may cluster the images based on their respective commonalities and learn patterns and correlations among the clusters. As a result, when generating an electronic representation that is related to a merchant (e.g., if a user's interaction data indicates the user has recently shopped at the store), the model may use the learned correlations to generate textual, visual, and/or auditory elements that are representative of the merchant logo images or representations. In a non-limiting example, the model may learn that text used in merchant logos are presented using a specific range of fonts and sizes. Therefore, if a user is identified to have an affinity towards the merchant (e.g., the user regularly purchases products from the store), the user's electronic representation may include a text element that corresponds to the learned range of fonts and sizes.

After training has ended, the model may identify how to electronically represent various things or behaviors, as identified from the interaction data of a user and as described with reference to FIG. 2A. While FIG. 2B refers to a specific training method using encoding and construction, additional or alternative machine learning techniques can be used to train the model(s) described herein.

Returning back to FIG. 2A, in at least one example, the step 220 describes executing the model to dynamically generate the electronic representation for the user profile based on the interaction data (from step 210).

As described above, in at least one example, the service provider server(s) 102 (e.g., via the representation generation component 102(A)) may execute the trained model to generate an electronic representation for the user in accordance with the user's interactions. In at least one example, the model may ingest the interaction data and then encode the ingested interaction data. In some examples, the model, as described above, can be an autoencoder (e.g., a VAE) that can compress the interaction data into a latent space. The model may then use various techniques discussed herein (e.g., GANs) to reconstruct the encoded data and to generate the electronic representations. That is, the model can leverage what it has learned (e.g., as described in FIG. 2B) to generate an electronic representation based on the interaction data of the user. Thus, in some examples, the service provider server(s) 102 can utilize generative AI to generate the electronic representation.

In some examples, and optionally, in generating the electronic representation, the model may prioritize various attributes of the interaction data. In some examples, the prioritization may be implemented using various attributes, such as frequency, recency of use, number of interactions, and the like. That is, in an example, attributes representative of a song frequently listened to by the user may be weighted or otherwise prioritized over other songs the user listens to less frequently. As such, attributes representative of the frequently listened to song may be more prominent in the electronic representation. As another example, if a user visits a merchant website more than a defined threshold amount, the electronic representation may reflect this affinity and prioritize it over other data. As such, the electronic representation may have attributes representative of such affinity that are more prominent than other attributes.

In some examples, and optionally, the electronic representation may be generated and/or revised in accordance with context of the electronic representation and/or a platform with which the electronic representation is presented. For example, if the context is the platform where the representation is generated/presented, the electronic representation can take attributes of the platform, including interaction data of the user with the platform, to include (e.g., overlay platform information on the avatar, or modify the avatar). In another example, if the context is attributes of a specific transaction, the electronic representation can take attributes of the transaction, including transaction information, to include (e.g., show discounts, or details of a dress purchased via an e-commerce or payment platform). In yet another example, if the context is attributes of the user (buyer, merchant, etc.), the electronic representation can take attributes of the user (voice, mood, stress, etc.) to reflect in the electronic representation.

As an example, in the field of reporting health, where the platform can take explicit user consent to leverage or integrate data, such as voice samples, health information, heart rate, blood sugar, exercise data, etc., to modify the electronic representation in real-time or near-real-time. In another example, if the context is environmental data, such as weather, location, or time, the electronic representation can be modified based on changing environmental attributes, e.g., to inform time zones and for targeted advertising (e.g., for all avatars reflecting "rain" features, the payment platform may recommend nearest umbrella merchants). Therefore, because the electronic representations reflect the context of the data, the electronic representations themselves can be used to segment users. For instance, to identify users who are healthy, the service provider server(s) 102 may identify users whose electronic representations include at least one attribute that corresponds to healthy activities (e.g., a user with an avatar that includes workout gears). In this way, the service provider server(s) 102 may cluster users in a faster and more efficient manner for example, for sending targeted advertising, identifying groups of similar users, generating search results, or the like.

In a non-limiting example, the model may generate an auditory file that represents the user's interaction data. For instance, the model may identify three most frequently streamed songs by a user and generate the auditory file accordingly. For instance, the auditory file generated by the model may include original auditory elements (e.g., original sound) that has been generated by the model but is based upon the inputted media (e.g., three frequently streamed songs). In another example, the auditory file may include one or more portions (e.g., clips) of the songs. Further, the auditory file may transition through different portions or may merge one or more portions of the songs.

As described herein, the electronic representation generated by the model may not be limited to the medium of the interaction data. That is, if the user's interaction data is auditory (e.g., the user's interaction data consists of music streamed by the user), the model may generate an auditory representation (e.g., matches the same medium as the user's interaction data). However, the model can also generate an electronic representation that is in a different medium than the interaction data. For instance, the model may generate a graphical representation that corresponds to music listened to by the user.

In a non-limiting example, the model may receive an indication that a user frequently listens to three songs. That is, the interaction data associated with the user can indicate that the user has listened to three songs at a particular frequency. As a result, the model may analyze the songs (and their corresponding attributes), the artists (and their corresponding attributes), album covers (and their corresponding attributes), and other data associated with the three songs. The model may determine that each song corresponds to three different album covers having three respective color palettes. As a result, the visual elements of the electronic representation may include a color palette that is common among all three color palettes. In another example, the electronic representation may have a combination of the color palettes. The electronic representation generated by the model may also include visual elements (e.g., objects, such as faces) that appear in the album cover images or resemble visual elements that appear in the album cover images. In another example, when the electronic representation is an avatar, the avatar generated for the user may include visual elements that correspond to images included within the album covers. For instance, if the album covers depict a person having blond hair, the avatar may also have blond hair. In another example, the avatar may also include an object that is depicted within the album covers. For instance, if the album covers include a star depicted in the background, the avatar may also include a star in the background. In some examples, the electronic representation can have stylistic elements based on the album covers.

In another example, the electronic representation may be a video file or a GIF that consists of portions of the user's most watched movies or other video media (e.g., video games played or purchased, television shows watched, music videos corresponding to streamed music, commercials corresponding to purchased items).

In some examples, generation of the electronic representation may optionally include inputs from the user. For instance, the service provider server(s) 102 may, in some examples, receive one or more inputs from the user indicating one or more attributes of the electronic representation. In a non-limiting example, the service provider server(s) 102 may display one or more input elements allowing the user to input their preferences associated with the electronic profile, such as color schemes, category of the electronic representation (e.g., whether the electronic representation should include text, a picture of the user, or a background), pitch, a song, font, size, or any other attribute (visual attributes for graphical representation and other attributes for non-graphical representations). The service provider server(s) 102 may use the inputs to generate a suitable electronic representation.

In some examples, the user may input electronic content to be used as a basis (e.g., starting point) for the electronic representation and/or the service provider service provider server(s) 102 can access electronic content to be used as a basis from one or more social networking platforms (e.g., social networking profiles), purchasing behaviors, communications, and/or the like. For instance, a user may input a picture of their dog indicating that the user is interested in including the picture of the dog within the electronic representation (e.g., user profile picture). In another non-limiting example, the user may input text to be included in the electronic representation. In another non-limiting example, the user may input or otherwise indicate music or a particular song to be used as a basis of the electronic representation. In another example, the user may input a selfie and request the service provider server(s) 102 to revise the selfie and generate a graphical representation based on the selfie. In examples where electronic content is provided by the user, "generating" an electronic representation can include generating elements to be associated with the electronic content as provided and/or modifications to the electronic content as provided.

In some examples, the model can be executed in response to a request by a user to generate or update an electronic representation. In some examples, a user request is not necessary to execute the model. In some examples, the model can execute in real-time or near-real-time, for example, in response to receiving new interaction data. Accordingly, the service provider server(s) 102 may automatically analyze interaction data associated with a user and execute the model to generate a new electronic representation or update an electronic representation.

If the model generates more than one electronic representation, the service provider server(s) 102 may instruct the user device to output multiple electronic representations allowing the user to select an electronic representation. In some examples, the service provider server(s) 102 can select one of the electronic representations automatically (e.g., without input from the user). Such a selection can be based on recency of interaction, frequency of interaction, user preferences, or the like.

As described above, in some examples, the service provider server(s) 102 may use other techniques to evaluate the interaction data and/or to generate (or revise) the electronic representation. In some examples, instead of or in addition to executing the model, the service provider server(s) 102 (e.g., via the rules evaluation component 102(F)) may use a set of pre-defined rules to determine one or more attributes of an electronic representation. In some examples, the rules can be associated with thresholds, events, conditions, or the like. In some examples, individual rules may include a threshold regarding the interaction data and an attribute to be associated with the electronic representation. The rules may be defined by a system administrator and/or specific to a particular platform. When the service provider server(s) 102 determine, from analyzing the interaction data, that a rule has been satisfied, the service provider server(s) 102 can determine which attribute(s) to associate with an electronic representation.

For example, the service provider server(s) 102 may analyze a user's transactions and may determine that the user's electronic representation should include a particular text element, visual element, and/or a sound element because the user's interactions satisfy one or more thresholds defined within the pre-defined rules. As an example, a rule can indicate that a particular visual element (e.g., specially designed earphones) is to be associated with electronic representations of users who stream more than 250 songs per month (e.g., threshold). As another example, if the user has spent more than a predetermined threshold on a particular item or a category of items (e.g., spent more than $2000 on dining in a month), the service provider server(s) 102 may determine to include a text element (e.g., a particular word), a visual element (e.g., a gold chain included within the user's avatar), or a sound element (e.g., a particular sound in the customized auditory electronic representation of the user). For instance, the service provider server(s) 102 may receive an audio file, image, and/or instructions for haptic output that represents the user, as determined from the user's interaction data. In some examples, the service provider server(s) 102 may receive multiple electronic representations, as the model may generate different electronic representations for the user.

In at least one example, the electronic representation may have data encoded therein that comprises personal data and/or payment data, as described above. In some examples, the personal data and/or payment data can be obtained from interaction data (with permission of the user). By encoding personal data and/or payment data in the electronic representation, the electronic representation can be particular to the user and therefore used for authenticating and/or verifying an identity of the user, as a payment instrument, and/or the like. As such, the electronic representation can provide increased security and decrease fraud, as described above, offering improvements over existing techniques.

At step 230, the service provider server(s) 102 (e.g., via the displaying component 102(E)) may instruct the presentation of the electronic representation on a user device. As used herein, the user device may be any computing device configured to present the electronic representation generated by the model, such as user device 106. For instance, the user device may be a user device, a payment instrument, a point-of-sale device, an automated teller machine, or the like configured to display data. In at least one example, the electronic representation can be "presented" by, for example, being added to an existing profile, overlaid on an existing profile, presented in AR/VR, presented conditionally (e.g., when something happens/doesn't happen), or the like. In some examples, as described above, "presented" can cause a modification of an existing profile or electronic representation, such as via an update or the like. "Displaying" the electronic representation may cause the electronic representation to be presented in a format that corresponds to the electronic representation itself. For instance, if the electronic representation is a graphical representation, the service provider server(s) 102 may instruct the user device to display the electronic representation via a graphical user interface. However, if the electronic representation is auditory, the service provider server(s) 102 may instruct the user device to output (e.g., play) a sound file.

In some examples, an electronic representation can be formatted based on the attributes of the platform with which the electronic representation is being outputted/presented. For instance, if the electronic representation is being used to represent a user profile on a platform (e.g., music streaming platform), the platform may require the electronic representation to be limited to a certain duration (e.g., 15 seconds only). In that example, the service provider server(s) 102 may generate and output a 15 second sound file. In this way, the user does not need to customize or revise the electronic representation because the electronic representation is already customized for the platform with which it is to be presented.

In some examples, the service provider server(s) 102 may instruct presentation of the electronic representation upon receiving a request from the user. For instance, the user may instruct the service provider server(s) 102 that the user is interested in viewing the electronic representation, such that the user is able to revise or customize the electronic representation.

In at least one example, the service provider server(s) 102 may allow the user to modify an electronic representation, for example, by modifying one or more attributes associated therewith. For instance, the user may change any visual attribute associated with a graphical representation, such as color, size, or layout of an electronic representation generated by the model. In another example, the user may change a portion of an auditory representation generated by the model. For example, if the auditory representation is associated with a song, the user may change the song. Or, if the auditory representation is associated with a set of songs or portions thereof, the user can add a new song or portion thereof to the set, remove a song or portion thereof from the set, or reorder the songs or portions thereof. The user may also change other attributes of an auditory representation, such as a pitch or tempo of the auditory representation.

Various examples of outputting the electronic representation generated by the model are depicted in FIGS. 3-9.

Figure 3:
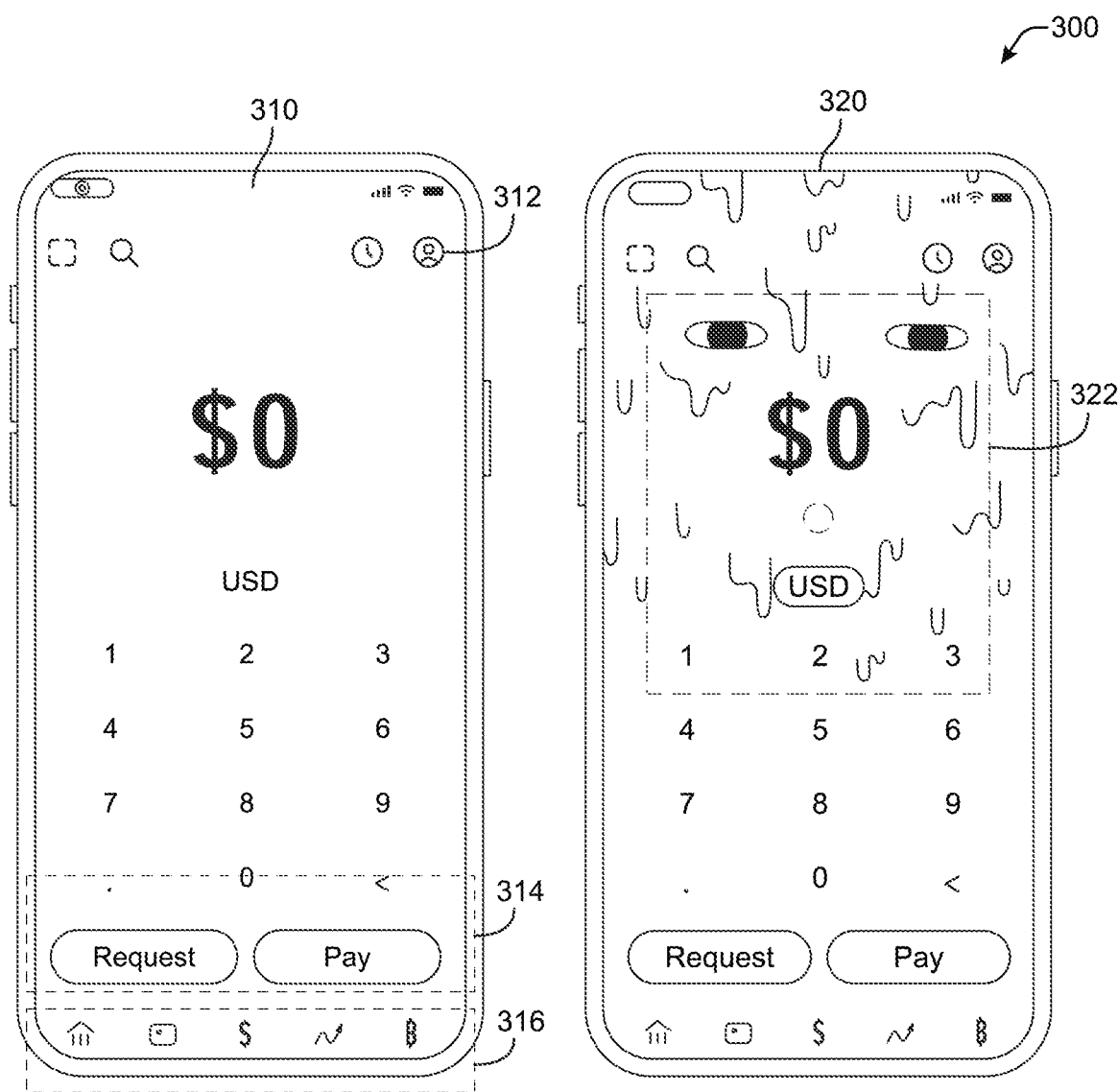
FIG. 3 illustrates customization of a graphical user interface, according to an example described herein.

FIG. 3 illustrates customization of a graphical user interface, according to an example described herein. The example 300 illustrates how a user interface of a platform can be customized for a particular user, for example, based on one or more outputs of the model, one or more rules, one or more thresholds, or the like. This particular example 300 illustrates user interfaces of a payment application. However, the same concepts can apply to other platforms or user interfaces, regardless of their functionality or services provided. For instance, the same concepts can be applied to other forms of platforms accessible to users, such as websites.

In the example 300, a payment application may have a default user interface, as depicted in the GUI 310. As illustrated, the GUI 310 has a default background, with little to no customization. In some examples, the GUI 310 can include one or more user interface elements 314, 316, which can be selectable or otherwise interactable, to perform operations within an instance of a payment application executing on the user device. For example, the user interface elements 314 can be used to send or request funds from another user and the user interface element 316 can be used to navigate to different user interfaces of the payment application.

Using the methods and systems discussed herein, the GUI 310 can be customized, for example, based at least in part on the results of the execution of the model, one or more rules, and/or one or more thresholds. For instance, the model may determine, based at least in part on interaction data associated with the user, to customize the GUI 310, as illustrated in the GUI 320. In some examples, the customization can be representative of user activity or interactions (e.g., as represented by interaction data). In some examples, such customization may be based at least in part on an interaction with a feature of the payment application. For instance, if a user orders a payment instrument having a particular design, the service provider server(s) 102 can cause the GUI 320 to be updated to have a same design as the payment instrument. Or, if user interaction data indicates that a user achieves a particular status or engages in a particular behavior, the service provider server(s) 102 can cause the GUI 320 to be updated to reflect the particular status or particular behavior. For example, attributes of the electronic representation associated with GUI 320 may represent the particular status or particular behavior.

As discussed herein, the electronic representation may correspond to contextual data. Specifically, the electronic representation may be generated, such that is suitable for the platform with which it is presented. In the example depicted in FIG. 3, the electronic representation is generated and presented as a form of revised user interface and not a profile picture because the GUIs 310 and 320 do not include/display a profile picture.

Figure 4:
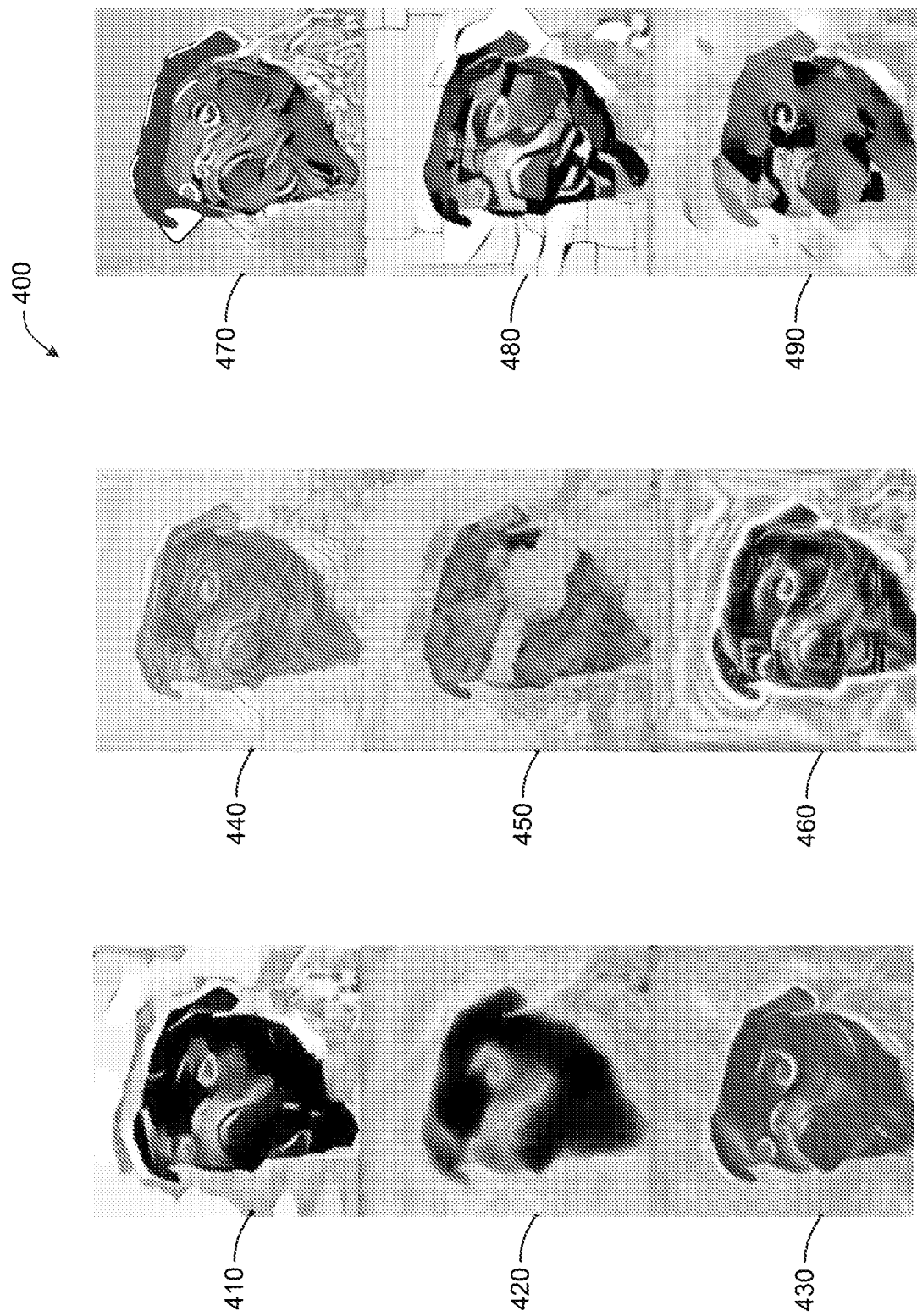
FIG. 4 illustrates various electronic representations generated in an electronic representation system, according to different examples described herein.

FIG. 4 illustrates various electronic representations generated in an electronic representation system, according to different examples described herein. In an example 400, a user may upload or capture electronic content, such as a picture of their dog. Alternatively, the electronic content may be retrieved from another data source. For instance, the service provider server(s) 102 can access the user's profile picture used for a particular social networking platform. In such an example, the user may provide the appropriate user credentials (e.g., username and password) and the service provider server(s) 102 (e.g., via the retrieving component 102(B)) may retrieve the user's social media profile picture. In some examples, the service provider server(s) 102 may retrieve the electronic content from item details associated with an item purchased by the user, communications of the user (e.g., text communications, emails, in-application messages, etc.), etc.

In at least one example, the user may set input parameters and preferences that can be used as signals ingested by the model to generate the electronic representation. For instance, the user may capture or input particular electronic content and set parameters that can be used by the service provider server(s) 102 when generating the electronic representation. In such an example, the model can utilize the user-provided content and/or parameters in generating the electronic representation.

In some examples, the picture of the dog may be generated using the methods and systems discussed herein and in accordance with the user's interaction data. For instance, the picture of the dog may be outputted by the model or generated using one or more models, rules, and/or thresholds, as discussed herein.

As illustrated in FIG. 4, in an example, the model can generate one or more instances of electronic representations 410-490. In at least one example, each instance of the electronic content can be associated with different attributes. The attributes can differ based on different datasets ingested into the model, filters applied, user preferences, or the like. In some examples, the one or more instances can be ranked when presented to a user, for example based on recent interactions, frequent interactions, user preferences, or the like. For instance, as illustrated in FIG. 4, the model can generate instances of an electronic representation (e.g., the picture of the dog), wherein each instance is associated with different attributes. The variations in attributes may be based on interactions of the user, such that each electronic representation 410-490 represents a different album cover of music downloaded by the user, different genres of music streamed by the user, color schemes of clothing purchased by the user, color schemes of store logos where the user has purchased products, or the like.

Different variations are generated because each variation may appeal to different attribute of the user. For instance, the model may generate the electronic representation 460, which has a different sharpness factor than the electronic representation 430. This may be because the user's interaction data may indicate that the user is interested in images that seem to have higher sharpness factors. In another example, the user may have purchased painting from an artist known for their cubist paintings. As a result, the model may generate the electronic representation 480, which resembles the picture of the dog as a cubist-style painting.

The electronic representations 410-490 may not necessarily all be displayed for the user. For instance, the service provider server(s) 102 (e.g., via the representation generation component 102(A)) may generate multiple electronic representations (e.g., instances of the same electronic representation) but display a subset of the electronic representations to the user. If the user is unsatisfied with the displayed electronic representation, the service provider server(s) 102 may display another instance having different attributes.

Figure 5:
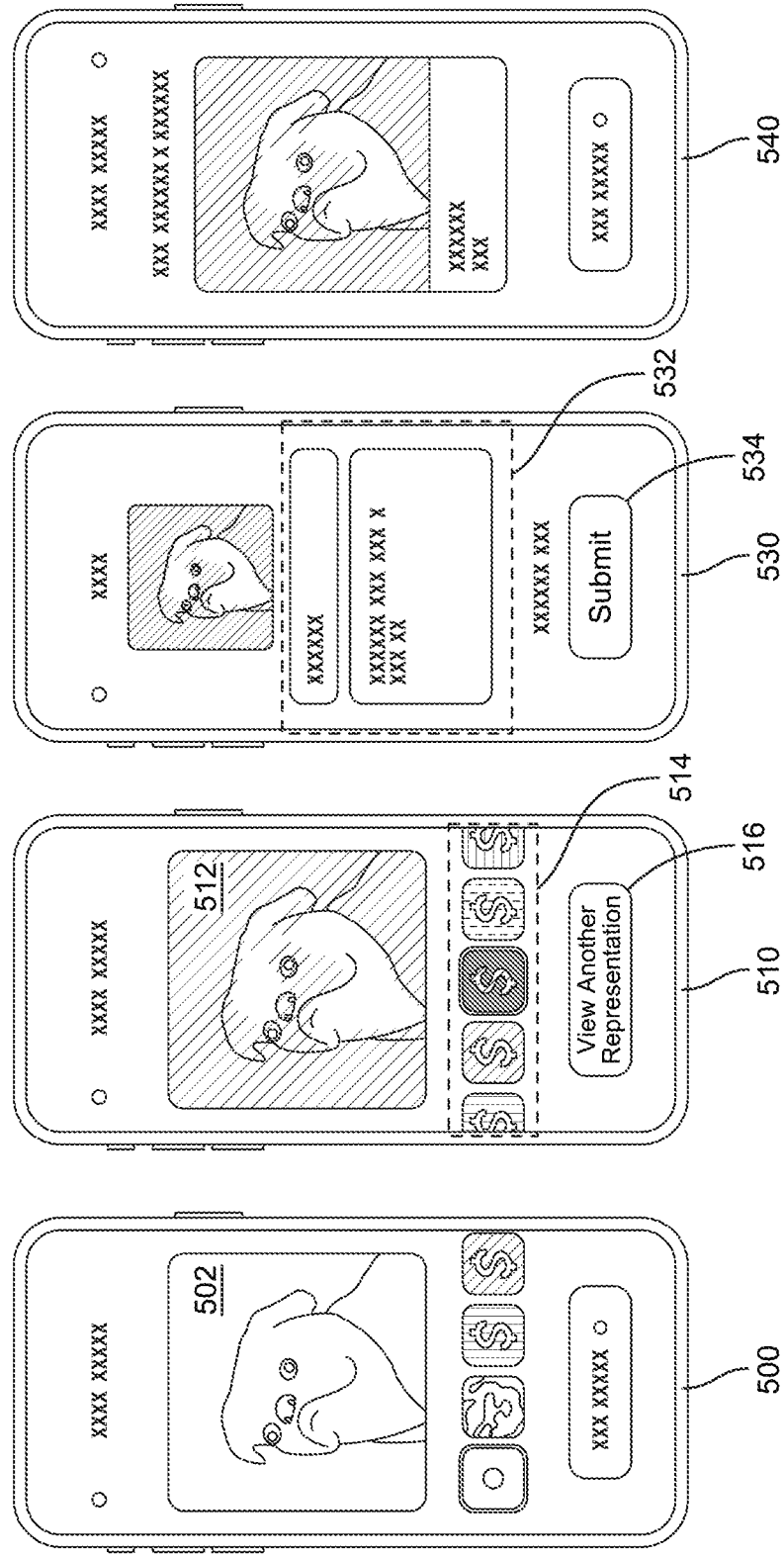
FIG. 5 illustrates various graphical user interfaces and electronic representations generated in an electronic representation system, according to an example described herein.

FIG. 5 illustrates various graphical user interfaces and electronic representations generated in an electronic representation system, according to an example described herein. As depicted in FIG. 5, the user may upload electronic content (image 502 depicted in the GUI 500) to be used as an electronic representation for a user profile. Using the model discussed herein, the service provider server(s) 102 (e.g., via the representation generation component 102(A)) may "generate" an electronic representation by generating an electronic representation based on the electronic content or generating updates for modifying the electronic content. In some examples, the service provider server(s) 102 can present one or more options for customizing or otherwise modifying the electronic representation that is created based on the uploaded electronic content, as depicted in the GUI 510. The option(s) can be determined and/or configured based on interaction data associated with the user, for example, using a model, rule(s), and/or the like. In some examples, the option(s) can be arranged based on relevancy, recent interactions, frequent interactions, preferences, etc. In such examples, the user can interact with one of the user interface elements 514 to select an option and the service provider server(s) 102 can update the image 502 with attributes associated with the selection. The resulting electronic representation 512 can reflect the selection. In some examples, each option can be a different filter, such that when selected the original image is updated with the filter.

In some examples, the user may use user interface element 516 to view a different iteration of the electronic representation 512. As a result, the electronic representation 512 may be modified to include attributes depicted in FIG. 4 (electronic representations 410-490) or any other electronic representations that are associated with the uploaded electronic content. The user may interact with the various user interface elements 514 as each option may cause the image 502 to be updated with different attributes. For instance, one option may allow the user to change the color of the image 502. Another option may allow the user to change the layout of the image 502. When the user is satisfied with the electronic representation 512, the user may add customized text to be included in the user's profile, as depicted within the user interface elements 532 of the GUI 530. The user may submit the finalized image and, in some examples additional text or other information, by interacting with a user interface element 534. The finalized electronic representation of the user's profile may be displayed in the GUI 540.

In some examples, the user may be able to share the electronic representation with others (e.g., transmit the image 502 or the electronic representation 512 to others). For instance, the GUI 540 may include an interactive user interface element allowing the user to share the electronic representation 512. Upon receiving an indication that the user has interacted with the interactive user interface element, the service provider server(s) 102 may invoke an electronic messaging application (e.g., text messaging application, email application, and the like) and may prepopulate an electronic message, thereby allowing the user to share the electronic representation 512 with others.

Additionally or alternatively, the GUI 540 may include an interactive user interface element to allow the user to generate an NFT based on the electronic representation 512. Additionally or alternatively, the electronic representation 512 may be used to facilitate secure payments (e.g., pay other users and/or purchase products). For instance, upon receiving a request from the user, the service provider server(s) 102 may display the electronic representation 512, such that it can be used to facilitate transactions/payments with more efficient identify verification, as depicted and described with regards to FIG. 10.

Additionally or alternatively, the GUI 540 may include an interactive user interface element allowing the user to use the electronic representation 512 for a third-party user profile. For instance, the user may use the electronic representation 512 for as a social networking profile picture. The electronic representation may not always include a representation of the user or an image provided by the user. In some configurations, the electronic representation for a user may include an image that includes text elements and/or visual elements that do not resemble the user. In some examples, the electronic representation for a user may depict an image that corresponds to the user's interaction data while not including any item, person, or animal that resembles or identifies the user.

Figure 6:
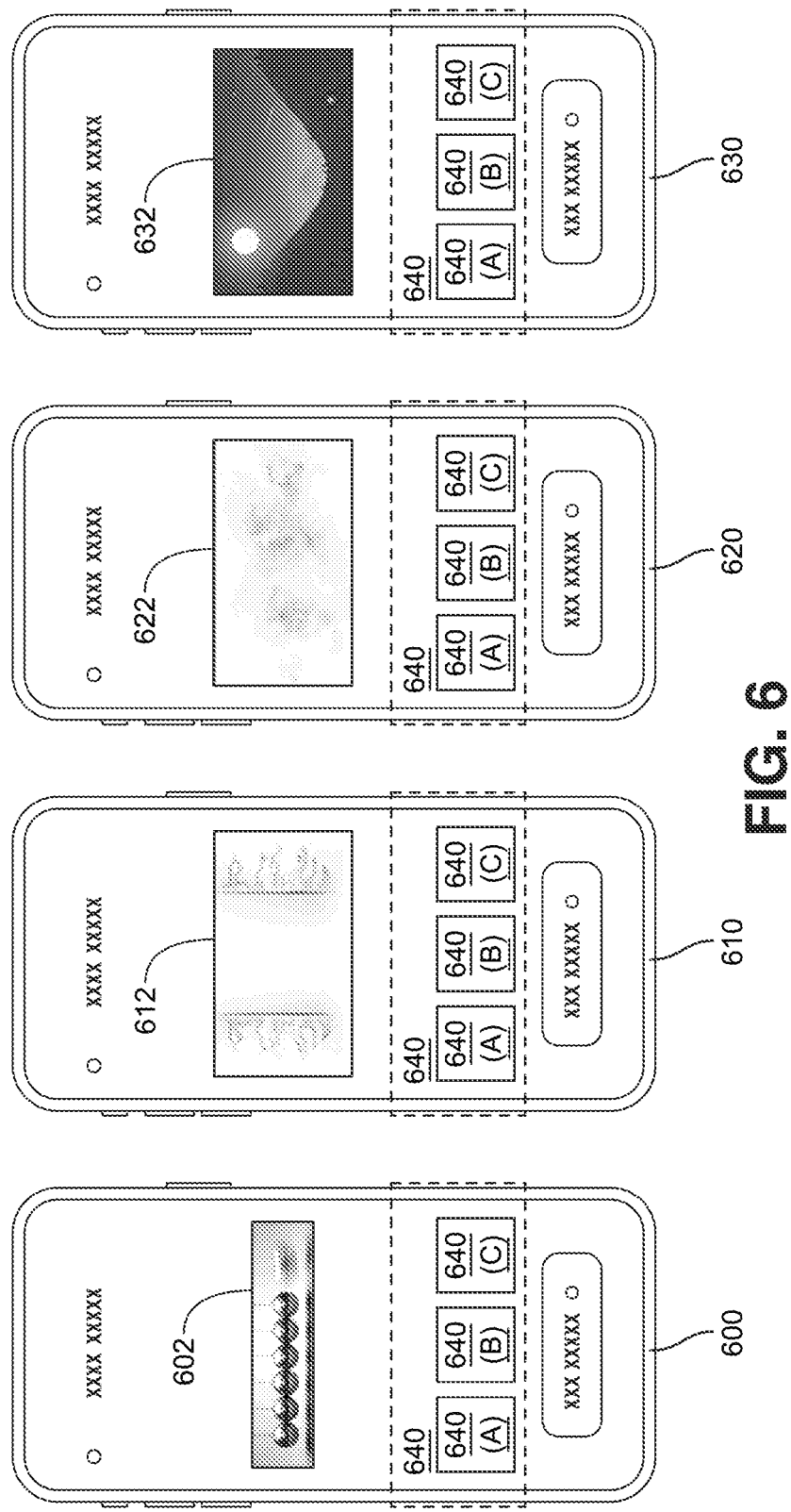
FIG. 6 illustrates various graphical user interfaces and electronic representations generated in an electronic representation system, according to an example described herein.

In some examples, the model may also output a background image to be used as an electronic representation of a user profile, such as for a profile picture or a background on a mobile application or a social networking page. FIG. 6 illustrates various graphical user interfaces and electronic representations generated in an electronic representation system, according to an example described herein. As depicted in FIG. 6, electronic representations 602, 612, 622, and 632 illustrate different electronic representations generated by the model. Each electronic representation 602-632 may correspond to the user's particular interaction data and previous activity. In one example, the model may determine that the user is interested in science because the user has purchased multiple scientific books and listened to podcasts related to physics. As a result, the model may generate the electronic representation 602 for the user that includes an image depicting a science experiment. In another example, the model may determine that the user is placed in a cluster of users that prefers an electronic image that includes landscape. As a result, the model outputs the electronic representation 632. The service provider server(s) 102 may similarly generate the electronic representations 612 depicting an integrated circuit (because the user has been identified as interested in electrical engineering because the user has purchased related books) and the electronic representation 622 depicting neural networks (because the user has been identified as interested in computer science and AI/ML, because the user has listened to various computer-related podcasts).

The electronic representations 602-632 can either be used in conjunction with other images or may be used themselves as electronic representations. For instance, the GUIs 600-630 where each GUI depicts a particular electronic representation that does not include an item or a person that resembles the user. The GUIs 600-630 may also include user interface elements 640(A)-(C) (collectively user interface elements 640). The user may use the user interface elements 640(A) to revise the electronic representations 602-632 (such as described in FIG. 5). For instance, using the user interface element 640(A), the user may view different iterations/versions of the displayed electronic representation or change one or more attributes of the displayed electronic representation. Additionally, the user may use the user interface element 640(B) to assign the electronic representation to one or more user profiles (e.g., use as a profile picture of a social networking user profile).

Additionally, the user may use the user interface element 640(C) to use the electronic representation as a background of another electronic representation. For instance, when the user interacts with the user interface element 640(C) (in the GUI 630), the user may be directed towards a new GUI where the user can upload an image to be used in conjunction with the electronic representation 632.

As discussed herein, in some configurations, the electronic representation may be a dynamic representation where one or more attribute of the representation changes as the user's interaction data changes. For instance, as the user continues to interact with different service providers, the user's interaction data may change. Consequently, the user's electronic representation might also change. For instance, a user's electronic representation may change if the user's spending habits and patterns are identified to have changed. In some examples, the electronic representation may be changed as a result of a specific user interaction satisfying a threshold or a specific action performed by the user.

Figure 7:
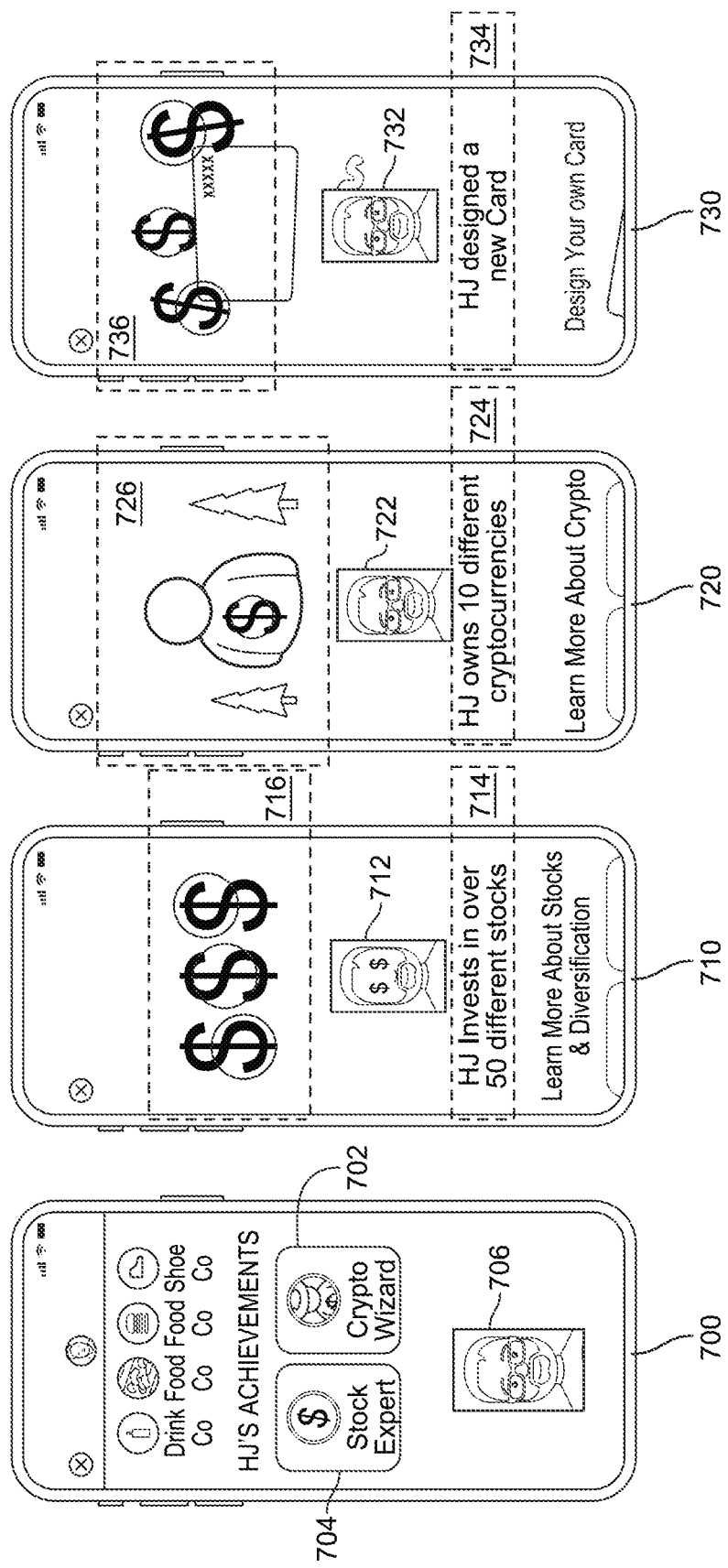
FIG. 7 illustrates various graphical user interfaces and electronic representations generated in an electronic representation system, according to an example described herein.

FIG. 7 illustrates various graphical user interfaces and electronic representations generated in an electronic representation system, according to an example described herein. As depicted in FIG. 7, GUIs 700-730 illustrate how a user's electronic representations may change overtime and as the user's interaction data changes. The GUI 700 represents electronic representation of a user (HJ) at a first time. The GUI 700 may include graphical indicators 702 and 704 that represent different services availed by the service provider.

For example, graphical indicator 702 can represent an investment service (e.g., for purchasing stocks) and graphical indicator 704 can represent a cryptocurrency service (e.g., for purchasing, selling, sending, receiving, etc. cryptocurrency). In some examples, the graphical indicators presented via the GUI 700 can be personalized or customized for the user. For example, if the user is a new user, the graphical indicators can be presented to prompt the user to interact with the services represented by the graphical indicators. In such an example, the graphical indicators, when selected or otherwise interacted with, can enable the user to learn more about each of the services. In some examples, as illustrated in FIG. 7, the graphical indicators can represent "badges" or other awards earned by the user (e.g., based on the user's interaction data, such as purchase and/or transaction history). For instance, the graphical indicator 702 indicates that the user has traded enough crypto currency (more than a defined threshold) or satisfied some other condition to qualify for a "crypto wizard" badge. The graphical indicator 704 indicates that the user has traded enough stock (more than a defined amount) or satisfied some other condition to qualify for a "stock expert" badge. Using the user's interaction data, the service provider server(s) 102 may generate and display the electronic representation 706.

As the user continues to interact with services of the service provider and/or third-party service providers, the service provider server(s) 102 can generate new electronic representations and/or update the electronic representation of the user. The service provider server(s) 102 may also customize the user interfaces viewed by the user. For example, as the user continues to trade stocks and cryptocurrency, the service provider server(s) 102 can generate new electronic representations and/or update the electronic representation of the user. In some examples, that can cause the user experience of the user interacting with the application to be personalized or customized. In some examples, aspects of GUIs presented via the application may change. For instance, the GUI 710 indicates that the user has invested in over 50 different stocks (textual indicator 714). As a result, the user's electronic representation may change (e.g., the electronic representation 714 includes special "Dollar Sign" glasses not included within the electronic representation 706). In an example, the rules evaluation component 102(F) may determine that users who have invested in over 50 different stocks qualify to have these special glasses included in their electronic representation. The GUI 710 may also include the graphical indicator 716 that corresponds to the user's recent stock activity.

As the user continues to generate new interaction data (e.g., buying new stocks, listening to new music, and purchasing new products), the service provider server(s) 102 may re-execute the model and/or analyze rule(s) to determine a new electronic representation for the user. As a result, when the user accesses the GUI 720, the graphical indicator 726 is displayed, which is customized for the user and corresponds to their updated interaction data. In the example shown in FIG. 7, the GUI 720 indicates that the user own 10 different cryptocurrencies (textual indicator 724). As a result, the user's electronic representation may change. For instance, the GUI 720 may also include the graphical indicator 726 that corresponds to the user's cryptocurrency purchases.

As another example, the GUI 730 indicates that the user has purchased or otherwise acquired a payment instrument having a particular characteristic (textual indicator 734). As a result, the user's electronic representation may change.

The GUI 730 may also include the graphical indicator 736 that corresponds to the user's recent activity.

As described above, the service provider server(s) 102 may analyze interaction data in real-time or near-real-time and generate or update the electronic representation 732 accordingly. In some examples, such generating or updating can be done in real-time or near-real-time. In some examples, such generating or updating can be done without user input. While updates in FIG. 7 relate to the application of rules, in some examples, the service provider server(s) 102 can utilize model(s) as described herein. In some examples, the service provider server(s) 102 may allow the user to add, delete, or otherwise revise one or more features/elements of an electronic representation of a user profile.

The customizations discussed with respect to FIG. 7 describe how the methods discussed herein, unlike conventional methods, can provide an up-to-date customization that dynamically changes as the user interacts with various platforms (e.g., listens to music or purchases stocks). Therefore, unlike conventional methods that provide the same interface for all users, the service provider server(s) 102 may customize the interfaces for each user.

Figure 8:
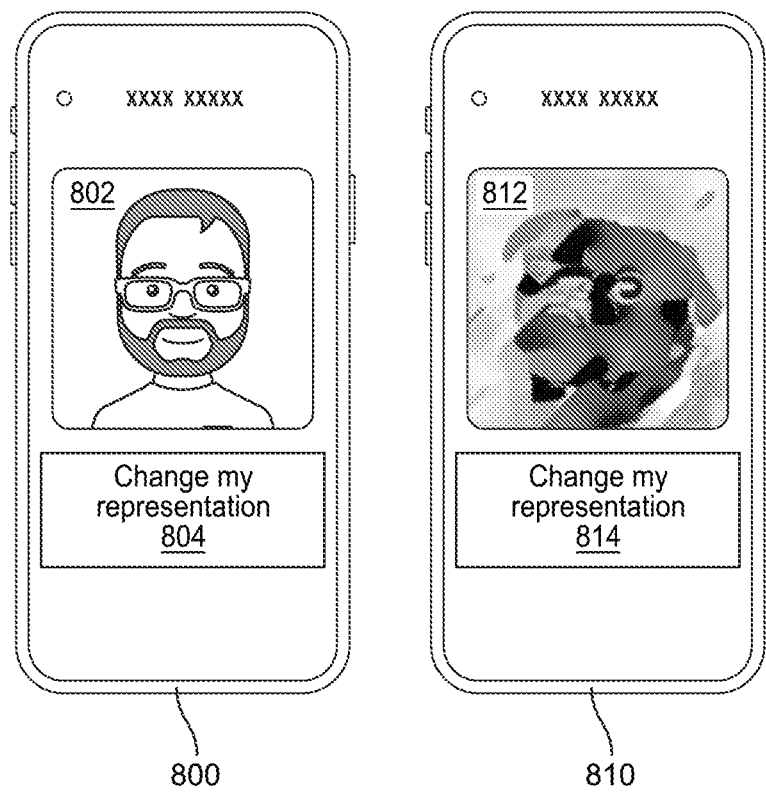
FIG. 8 illustrates various graphical user interfaces and electronic representations generated in an electronic representation system, according to an example described herein.

FIG. 8 illustrates various graphical user interfaces and electronic representations generated in an electronic representation system, according to an example described herein. In an example shown in FIG. 8, the user may review multiple electronic representations before selecting one to be used. As depicted, the GUI 800 displays the electronic representation 802 that is generated based on the user's unique interaction data. If the user is not satisfied, the user may interact with the user interface element 804. As a result, the user is directed towards the GUI 810 where the electronic representation 812 is a different electronic representation of the user. The new electronic representation 812 may also correspond to the user's interaction data. As discussed herein, the model may prioritize certain attributes of the user's interaction data over others based on their recency, frequency, and the like. For instance, a user may listen to a particular song every day. As a result, the user's electronic representation may prioritize certain elements (visual, textual, or auditory) that correspond to the song. However, the user may not desire to use an electronic representation that corresponds to that song. As a result, the user may request to view a different electronic representation. The user may browse through various electronic representations until the desired electronic representation is identified.

Figure 9:
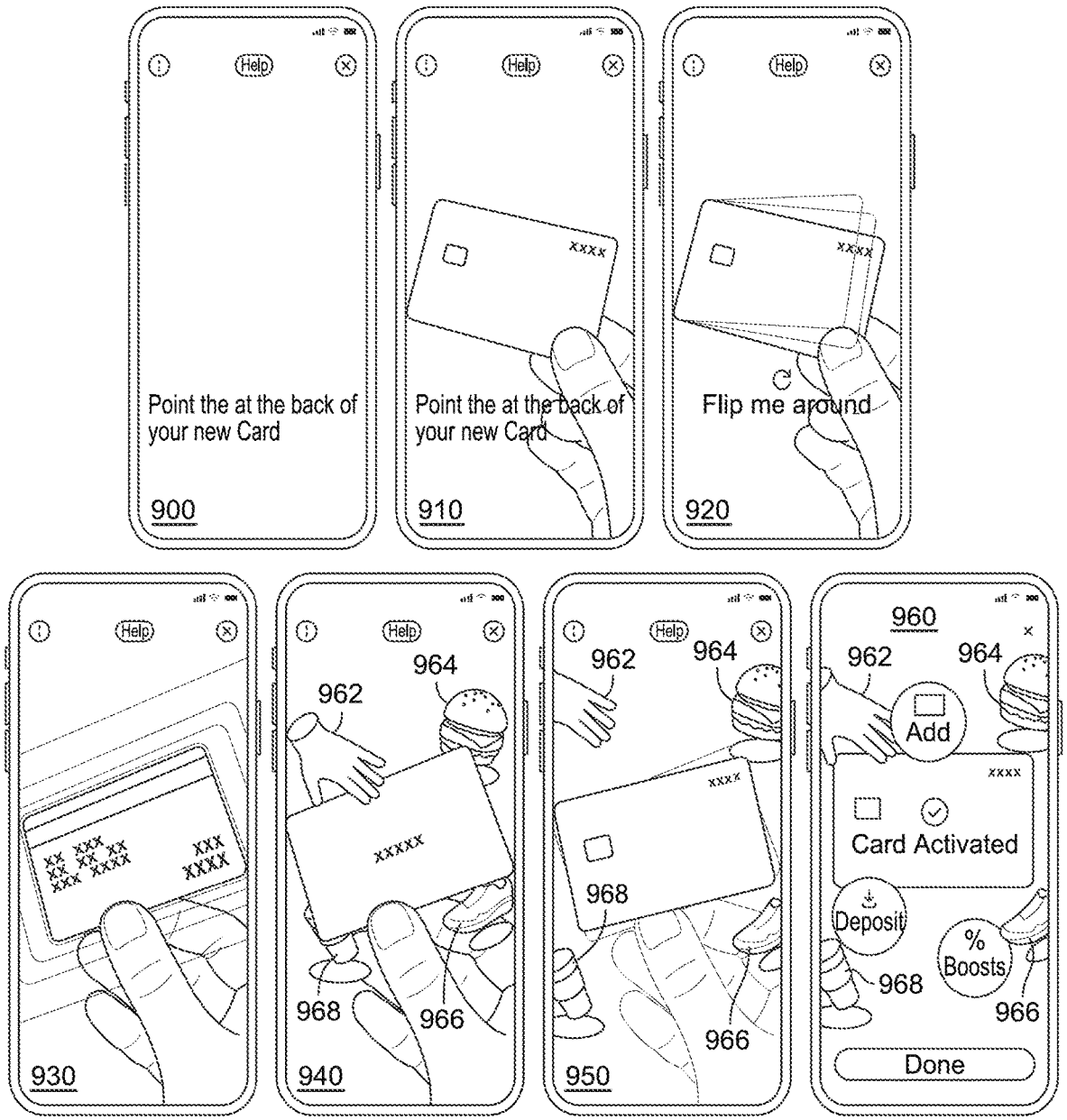
FIG. 9 illustrates various graphical user interfaces and electronic representations generated in an electronic representation system, according to an example described herein.

In some examples, the electronic representation can be used to customize a user experience for a user. That is, in some examples, the service provider server(s) 102 can generate one or more electronic representations and/or modify a user experience so that it is customized and/or personalized for the user. FIG. 9 illustrates various graphical user interfaces and electronic representations generated in an electronic representation system, according to an example described herein. As depicted in FIG. 9, the user may access an application to activate a payment card, such as a credit card or debit card. In an example, to activate the payment card, the user may access a camera of a user device executing the application and point the camera at the back of the new payment card as instructed in the GUI 900. As depicted in GUI 910, after the user points the camera to the front the payment card, the user is instructed to point the camera to the back of the payment card or flip the payment card, as instructed in GUI 920. When the application determines that the camera is pointed towards the back of the payment card, the service provider server(s) 102 may scan the numbers and activate the payment card as depicted. In at least one example, identifier(s) associated with the application and/or payment card can be used to access data associated with the user, such as interaction data. As the payment card is being activated, the service provider server(s) 102 can personalize and/or customize the user interface(s) presented based on the interaction data. That is, the service provider server(s) 102 can cause the user interface of the application to be updated and/or a new user interface to be presented via the application. Examples of such updated or new user interfaces are illustrated in GUIs 940, 950, and 960. These GUIs may include various graphical indicators that may be customized for the user as described here. For instance, the graphical indicators 962-968 may be uniquely generated by the service provider server(s) 102 (e.g., using model(s) or otherwise) for the user based on the user's interaction data. For instance, based on a user's purchases of burgers and shoes (as determined from the interaction data), the GUIs are adorned with images or objects representing those purchases, such as burger 964 and shoes 966.

In addition to, or as alternatives of, examples of electronic representations described above, in some examples, an electronic representation generated using techniques described herein to customize a payment card (e.g., the design thereof or data presented thereby). For example, a user can opt to associate an electronic representation with a design of a payment card (virtual or physical). In some examples, a payment card can include a display or other output device that can present the electronic representation.

Referring back to FIG. 2A, in step 240, the service provider server(s) 102 (e.g., via the displaying component 102(E)) may receive a request associated with the electronic representation. The request received may be to associate the electronic representation with one or more user profiles of the user or otherwise use the electronic representation in association with one or more user profiles. In some examples, when the user is satisfied with the electronic representation provided by the service provider server(s) 102 (e.g., after the user has had the opportunity to customize and/or approve the electronic representation), the service provider server(s) 102 may receive an indication that the user has requested to use the electronic representation in association with one or more user profiles. For instance, the user may request that the electronic representation to be associated with the user profile as a user profile image or other representation of the user profile. In some examples, the user may instruct the service provider server(s) 102 to present the electronic representation each time a particular application is initiated. For instance, the user may instruct the service provider server(s) 102 to customize one or more GUIs of a payment application each time the user initiates the payment application, as depicted in FIG. 3.

In some examples, the request may be directed towards a particular user profile. For instance, a user may have a payment account that incudes multiple user profiles (e.g., a main user profile for the user and three additional profiles for the user's children). In those examples, the user may instruct the service provider server(s) 102 to assign the electronic representation to a particular user profile, such that each time the particular user associated with the particular user profile logs in, the electronic representation is presented (but not when other users log in).

In some examples, the electronic representation can be associated with the user profile of the user automatically, without receiving a request. That is, the method 200 can proceed from step 230 to 250 directly as shown by arrow 232.

At step 250, the service provider server(s) 102 (e.g., via the representation generation component 102(A)) may assign the electronic representation to one or more user profiles of the user. The service provider server(s) 102 may associate the electronic representation with one or more user profiles. The service provider server(s) 102 may revise one or more data records of the user's user profile to include the electronic representation. For instance, the service provider server(s) 102 may link the electronic representation to the user's user profile. The electronic representation may be used in association with an existing user profile or may be used in association with a new user profile. Moreover, the electronic representation may be used conditionally. For instance, service provider server(s) 102 may link the electronic representation to a user profile if the user profile meets certain conditions (e.g., had more than pre-defined number of transactions per month on a credit card).

The electronic representation can be configurable for use on social networking platforms, professional networking platforms, content streaming platforms, online marketplaces, gaming platforms, VR and/or AR platforms, or the like, the service provider server(s) 102 may allow the user to use the electronic representation in association of various other (sometimes third-party platforms). For instance, in some examples, the service provider server(s) 102 may instruct a third-party server to use/assign the electronic representation to one or more user profiles of the user. For instance, the user may indicate an interest of using the electronic representation as a profile picture for their social network user profile or a professional networking platform. As a result, the service provider server(s) 102 may identify one or more servers associated with the user's social network user profile and transmit a request to the identified server(s) that includes the electronic representation, an instruction to use the electronic representation, and user credentials (e.g., user login information).

In another example, the service provider server(s) 102 may instruct a third-party professional networking platform to customize one or more GUIs (or workflows) in accordance with the electronic representation generated by the service provider server(s) 102. For instance, the service provider server(s) 102 may instruct a third-party server to change its user interface, such that it resembles the interface depicted in FIG. 3.

In another example, the service provider server(s) 102 may receive an indication that the user has requested generation of an AR and/or VR representation of the electronic representation. As a result, the service provider server(s) 102 may generate the AR and/or VR representation corresponding to the electronic representation. The service provider server(s) 102 may then transmit a machine-readable file to an AR and/or VR platform allowing the new AR and/or VR represented (generated by the service provider server(s) 102) to be used by the user.

In some examples, the electronic representations can be minted on a blockchain as a non-fungible token (NFT). For instance, the service provider server(s) 102 may (either automatically or upon receiving a request from the user) instruct one or more blockchain nodes to mint the electronic representation as an NFT to ensure that the electronic representation remains unique to the user.

In some examples, the service provider server(s) 102 can modify aspects or attributes of the electronic representation to ensure interoperability across various platforms. First, the service provider server(s) 102 may ensure that the electronic representation transmitted to different platforms and/or third-party servers discussed herein comply with various formatting rules and requirements of the platforms and/or third-party servers. Second, the service provider server(s) 102 may ensure that the electronic representation itself may comply with pre-defined criteria set by different platforms and/or third-party servers. For instance, while a particular platform may allow text elements to be included in an avatar, other platforms may not allow text elements. In another example, a certain platform may not allow auditory electronic representations to be used by users. For instance, a social networking platform may only allow users to upload graphical representations of themselves. In those examples, the service provider server(s) 102 may ensure that the electronic representation conforms to the social networking platform's guidelines (e.g., for interoperability with the social networking platform).

In steps 260-264, the service provider server(s) 102 (e.g., via the retrieving component 102(B)) may continuously or periodically monitor interactions that are associated with the user and may revise or update the electronic representation accordingly. For instance, as users have more interactions with the service provider and/or third-party service providers, their respective interaction data may provide a different dataset for the model to analyze and use to generate electronic representations. Therefore, an electronic representation for a user may be dynamically revised as the user continues their interactions with the service provider (or third-party service providers). For instance, a user's electronic representation shortly after creating a user profile may be different than the user's electronic representation after six months of interacting with the service provider, the service provider's various platforms and services, and/or third-party service providers. Accordingly, the electronic representation is a dynamic concept that can be periodically revised. In some instances, the electronic representation may be revised in real-time or near real-time, such that a particular transaction or activity (e.g., listening to a particular artist) may cause an update to the user's electronic representation. In some examples, an update can comprise a modification to an existing electronic representation. In some examples, an update can comprise the generation of a new electronic representation.

Using these steps, the service provider server(s) 102 can ensure that the electronic representation dynamically evolves as the user continues to interact. As a result, the user may no longer need to update their electronic representation. For instance, the user may assign a dynamic profile picture to their music streaming account, and the service provider server(s) 102 may continuously/periodically change the profile picture in accordance with the user's latest music streaming attributes. Therefore, unlike conventional methods that provide static representation, the service provider server(s) 102 can ensure that the electronic representations are not outdated or easily replicated (because they are dynamic and even successful replications may be outdated periodically).

In a non-limiting example, a user may request an electronic representation to be generated. The user accepts the electronic representation and uses the electronic representation as a user profile picture. The service provider server(s) 102 may continuously monitor the user's interactions and, in an example, may determine that the user has been listening to techno music more frequently than other types of music. As a result, the service provider server(s) 102 may automatically re-execute the model and generates a new electronic representation for the user. The service provider server(s) 102 may notify the user and informs the user that a new electronic representation is ready and provides various options to the user to possibly revise the newly generated electronic representation. Upon receiving approval from the user, the may automatically change the user's electronic representation. The service provider server(s) 102 may continue to monitor the user's interactions and transactions. As a result, the service provider server(s) 102 may determine that the user has spent more than $10,000 in a single transaction, which qualifies the user to include a gold chain in their electronic representation. As a result, the service provider server(s) 102 may automatically add the gold chain to the user's electronic representation (e.g., avatar). This modification can be done in real-time or upon receiving approval from the user.

Similarly, the electronic representation may include sponsored elements. For instance, in some examples, if a user's interaction data indicates a preference towards a particular merchant, the user's electronic representation may include an element from that merchant (e.g., a logo or a shopping bag from the merchant). The element from the merchant may be placed for a limited amount of time to serve as advertising for that merchant.

Moreover, the electronic representation may include one or more elements that are purchased by the user. For instance, the service provider server(s) 102 may offer certain elements to be included in users' electronic representations if they perform an action, such as purchasing a graphical element to be included in the electronic representation, signing up for a user profile, or indicating an affinity towards a certain cause. In this way, users can be incentivized to donate money to a particular charity in order to customize their electronic representations. This also allows merchants to provide their promotional material in electronic representations. For instance, a merchant may request an element to be included in certain electronic representations that can also act as an advertisement for the merchant. Although some examples herein recite the use of an electronic representation for a customer, it is intended that the same method may be utilized to generate an electronic representation for a merchant, and it can be based on interactions such as popular items sold, items on sale, flash sale items, trending items, commonly-searched items, and the like.

At step 260, the service provider server(s) 102 (e.g., via the retrieving component 102(B)) may monitor interaction data associated with at least the user. The service provider server(s) 102 may monitor the interaction data of the user in real-time or in near real-time. Alternatively, the monitoring may be performed in accordance with pre-defined time intervals (e.g., every day or every week) where new interaction data is collected and analyzed in batches. The service provider server(s) 102 may determine whether new interaction data has been identified (from an internal database or a third-party service provider). In some examples, the service provider server(s) 102 may determine whether the new interaction data is different (beyond a threshold) than the interaction data with which the original electronic representation was created. That is, the service provider server(s) 102 may determine whether the user's interaction data indicates a new attribute or insight. For instance, if the user who has never purchased sports-related items, recently purchased a season pass for a baseball team and purchased multiple items from a sporting goods store, the service provider server(s) 102 may determine that the interaction data associated with the user has changed, thereby the electronic representation of the user may also need to be changed.

If the service provider server(s) 102 determines that the user's interaction has changed, the method 200 moves to the step 262 and the service provider server(s) 102 repeats the method 200 to dynamically update the electronic representation of the user profile (or generate a new one) based on the new interaction data detected (arrow 266). For instance, the service provider server(s) 102 may execute the model using the new interaction data detected and may present the user an option to change their electronic representation because a new/updated representation has been generated. In some examples, users may opt-in to allow the service provider server(s) 102 to automatically and dynamically update the electronic representation. In those examples, the service provider server(s) 102 may not notify the user and automatically change electronic representation when new interaction data is detected.

If the service provider server(s) 102 do not detect new interaction data, method 200 moves to the step 264 where the server(s) continue instructing their electronic devices to present the same electronic representation because the electronic representation has not changed.

In addition to instructing an electronic device to present the electronic representation, the service provider server(s) 102 may use the electronic representation in various other ways that could be useful to the user. The service provider server(s) 102 may ensure that the electronic representation is unique to the user and the user profile by initiating generation of an NFT. The NFT can be used internally or externally, for example, with third-party service providers (e.g., gaming platforms, social media platforms, etc.).

In one example, the electronic representation can be used to direct other users to any electronic content predefined by the service provider server(s) 102 and/or the user. Effectively, the electronic representation may be used as a machine-readable optical label that can contain information designated by the service provider server(s) 102 and/or the user or can be used to direct other users to particular electronic content, such as a website or a web document. In operation, a user may display their electronic representation on a user device (e.g., their mobile device). Once the service provider server(s) 102 identify a second user having a second user device who has scanned the electronic representation (e.g., a second user has faced their camera towards the electronic representation displayed on the user's mobile device), the service provider server(s) 102 can direct the second user device to a predefined electronic content, such as a website pre-defined by the user.

Similarly, electronic representations can be used to initiate various actions. For example, electronic representations can be used as unique identifiers that can work in conjunction with other platforms. For instance, a user may use their electronic representation and allow others to scan the electronic representation in order to pay or request payment through a payment platform, which may be provided by the service provider server(s) 102 and/or by a third-party service provider. Other examples of a unique identifier can be an alphanumeric code, an image, a barcode, a QR code, or the like. That is, an electronic representation may be used to uniquely identify a user and thus can be used in lieu of payment data (e.g., payment card number) for facilitating payments.

As described above, electronic representations discussed herein can be dynamically generated and can be updated in real-time or near real-time in accordance with each user's unique interaction data. As described with reference to the method 200, that is, as the service provider server(s) 102 monitor transactions and/or other interactions in real-time or near real-time, the service provider server(s) can generate dynamic representations that are not easily replicated or falsified. Further, the computing device(s) can personalize and/or customize the electronic representations for individual users. In some examples, the electronic representations can have features embedded therein that are or represent personal data (e.g., such as personally identifying information or information usable for verifying or authenticating an identity of users) and/or payment data. In some examples, as described above, this personal data and/or payment data can be generated or determined from interaction data. As the computing device(s) monitor transactions and/or other interactions, the computing device(s) can cause previously generated electronic representations to be updated or replaced to reflect updated transactions and/or interactions. This can ensure that such electronic representations are personalized and/or customized for individual users and accurately represent current or recent interaction trends, patterns, or behaviors. The use of such personal data and/or payment data in real-time or near-real-time can make replicating or falsifying such electronic representations more difficult for fraudsters. Further, this can therefore enable use of electronic representations for real-time or near real-time verification or authentication. Moreover, due to personalization and/or customization, such electronic representations can be used for uniquely identifying individual users, for example, for payments, as described above. In some examples, embedded personal data and/or payment data can be updated based on interaction data (e.g., based on payment types, locations of purchases, etc.) such that the electronic representations are dynamic and can be used for creating network connections with payment entities. Therefore, techniques described herein offer improvements to conventional techniques, such as electronic authentication techniques, by making them more secure and mitigating fraud.

Figure 10:
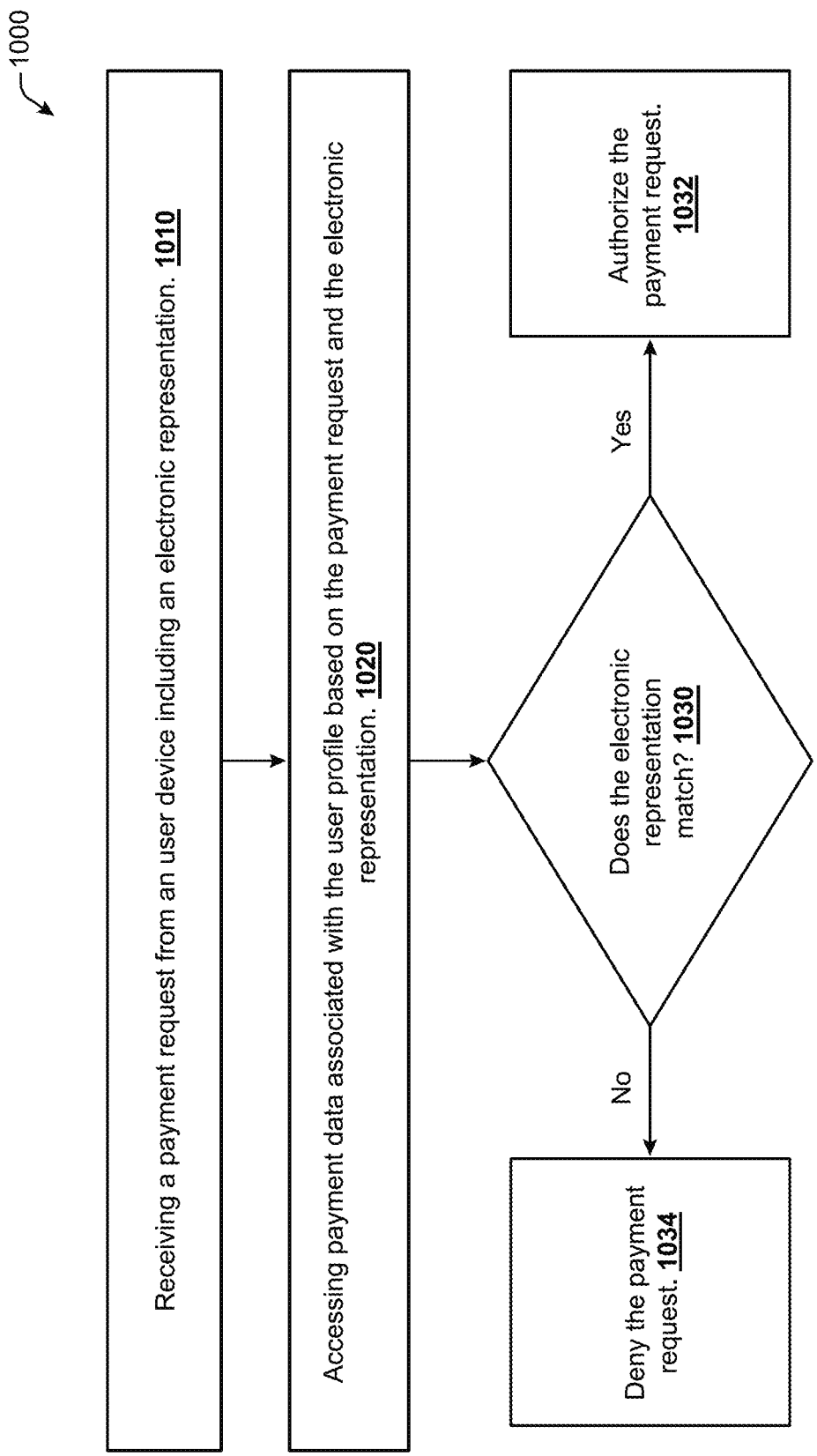
FIG. 10 illustrates a flowchart depicting operational steps for an electronic representation generation system, according to an example described herein.

FIG. 10 illustrates a flowchart depicting operational steps for an electronic representation generation system, according to an example described herein. The method 1000 and other methods described herein are illustrated as collections of steps (depicted as blocks) in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the method, or alternative methods, and not all of the blocks need be executed. For discussion purposes, the methods are described with reference to the environments, architectures and systems described in the examples herein, although the methods may be implemented in a wide variety of other environments, architectures and systems.

In a non-limiting example of the method 1000, a user may have a unique electronic representation that may be used for payment or authorization to conduct a transaction. The method 1000 includes steps 1010-1034. However, other examples may include additional or alternative execution steps or may omit one or more steps altogether. The method 1000 is described as being executed by the service provider server(s) 102 in FIG. 1 (and/or the server 1202 or 1302 depicted in FIGS. 12-13). However, one or more steps of method 1000 may also be executed by any number of electronic devices operating in the distributed computing system described hereon. For instance, one or more computing devices (e.g., user devices, such as a mobile device operated by the user) may locally perform part or all the steps of the method 1000.

At step 1010, the service provider server(s) 102 (e.g., via the retrieving component 102(B)) may receive a payment request from a user device. The payment request may include data associated with the payment, such as transaction amount, recipient information, and the like. The payment request may also include sender (payor) information, such as a sender's account number or other identifiers associated with the sender. A non-limiting example of an identifier of the sender may be their electronic representation. That is, in some examples, the electronic representation can be associated with a payment request via selection of a user profile with which the electronic representation is associated, via an image or other capture of the electronic representation, via an interaction with an electronic representation, or the like. In some examples, the electronic representation can be presented within a display or other user interface of a physical payment instrument, such as a payment card. In some examples, the electronic representation can be presented in association with or in lieu of a QR code, barcode, or other interactive element encoded with the identifier. As used herein, a sender is a person or entity who desires to pay another party. In one configuration, the electronic representation is generated by the service provider server(s) 102 for the sender, but is not made publicly available until after use by the sender.

At step 1020, the service provider server(s) 102 (e.g., via the retrieving component 102(B)) may access the payment data associated with the user profile based on the payment request and the electronic representation.

The payment data may be identifiable based on an association between the electronic representation and the user profile. In an example, based at least in part on receiving the payment request, the service provider server(s) 102 may parse or otherwise perform data analyses (e.g., image processing, optical character recognition, etc.) on the payment request to identify an identifier of the sender. In one example, such an identifier can be an electronic representation thereof. Using the electronic representation included within the payment request and/or other identifiers associated with the sender, the service provider server(s) 102 may query and identify the user profile associated with the sender. The service provider server(s) 102 may then identify whether the user profile includes the electronic representation and retrieve the electronic representation accordingly. Therefore, the service provider server(s) 102 may match the electronic representation received to a corresponding user profile or existing payment information and retrieve the payment data that is associated with the identified user profile. In some examples, the service provider server(s) 102 can access the payment data by comparing the electronic representation (received within the payment request) with stored electronic representations (belonging to existing users) to determine a similarity metric between the electronic representation and the stored electronic representations. Based on the similarity metric satisfying a threshold, the service provider server(s) 102 can access a user profile associated with the individual stored electronic representation to access the payment data. For instance, if an avatar received matches an avatar of an existing user, the service provider server 102 may query that user's payment data (e.g., payment card number and expiration date) to facilitate the transaction.

In some examples, the service provider server(s) 102 can receive the payment request that is associated with the electronic representation and can access personal data or payment data embedded therein.

In some examples, the payment data may be embedded in the electronic representation itself. For instance, the electronic representation may include an element (e.g., textual, visual, and/or auditory element) that indicates payment data associated with the user. For instance, an avatar associated with a user may include a visual element that may indicate the user's payment data. The visual element may be encrypted, such that the user's payment data is protected from bad actors. In some embodiments, the visual element may be watermarked and transparent to human eyes.

At step 1030, the service provider server(s) 102 (e.g., via the retrieving component 102(B)) may compare the electronic representation received from the user device in step 1010 with user profile data to determine a match. In some examples, the service provider server(s) 102 can retrieve the electronic representation from the user profile, e.g., from an internal database, and compare it with the electronic representation received in association with the payment request. In some examples, if the retrieved electronic representation and the electronic representation associated with the payment request match or are sufficiently similar (e.g., a similarity metric is within a threshold), the service provider server(s) 102 can determine a "match." In some examples, the service provider server(s) 102 can analyze the electronic representation in real-time or near-real-time in view of stored interaction data (e.g., associated with the user profile) to determine whether the electronic representation has attributes representative of the interaction data. In some examples, such attributes and/or interaction data may only be known to the user and/or the service provider. This can provide security and authenticity, as described above. If the electronic representation has attributes representative of the interaction data, the service provider server(s) 102 can determine a "match." In some examples, the service provider server(s) 102 can generate a new electronic representation at a time of authentication or verification (e.g., on-the-fly) to determine if the generated electronic representation is similar (as represented by a similarity metric) to or otherwise corresponds to the electronic representation 102 submitted. If the electronic representations are sufficiently similar (e.g., satisfy a similarity metric), the service provider server(s) 102 can determine a "match." In some examples, if the electronic representations are sufficiently similar (e.g., satisfy a similarity metric) or otherwise match, the service provider server(s) 102 can authenticate or verify the user and authorize the payment request and process the payment using payment data associated with the user profile (e.g., the method 1000 may move to the step 1032). If not, the service provider server(s) may deny the payment request (e.g., the method 1000 may move to the step 1034).

In a non-limiting example, a user who has previously requested and received an electronic representation may display the electronic profile on their user device at a point-of-sale terminal to purchase a product. The point-of-sale terminal may include a camera that can capture an image of the electronic representation displayed on the user device. The point-of-sale terminal then transmits a payment request to the service provider server(s) 102. Upon receiving the payment request, the service provider server(s) 102 may retrieve an electronic representation of the user. If the retrieved electronic representation matches the electronic representation received from the point-of-sale terminal, the service provider server(s) 102 authorizes the payment.

The method 1000 can also be used in various social networking platforms. For instance, a user may publish a social networking post having enough information to facilitate a payment to a second user (e.g., recipient's name and transaction amount) or a merchant. For example, a user may post "pay second user $10." The social networking post may include the user's electronic representation, which is unique to the user, and the electronic representation may already be presented in a profile picture. Upon receiving a notification associated with the social networking post (e.g., the service provider server(s) 102 may actively monitor the user's social networking posts or may instruct a third-party service to notify the service provider server(s) 102 when certain social networking posts have been published), the service provider server(s) 102 may facilitate the payment using the method 1000 if the electronic representation within the social networking post matches an existing electronic representation.

Users who use their electronic representations to facilitate transactions may also be incentivized to update their electronic representations. For instance, a user who would like to purchase limited edition sneakers using their avatar may be prompted to change their avatar (e.g., by adding a certain text element or a particular graphical element, such as a graphical representation of the sneakers). In such an example, the service provider server(s) 102 may receive a request to facilitate a transaction for an item. When the item satisfies a threshold (e.g., is on a pre-defined list), the service provider server(s) 102 may examine the user's avatar and determine that the avatar does not include certain words that are needed before the transaction can be authorized. As a result, the service provider server(s) 102 may notify the user to the needed textual element (or authorize the inclusion). For example, the user may be required to add "live, love, laugh" to the avatar to use the electronic representation as an authentication mechanism in a transaction.

Figure 11:
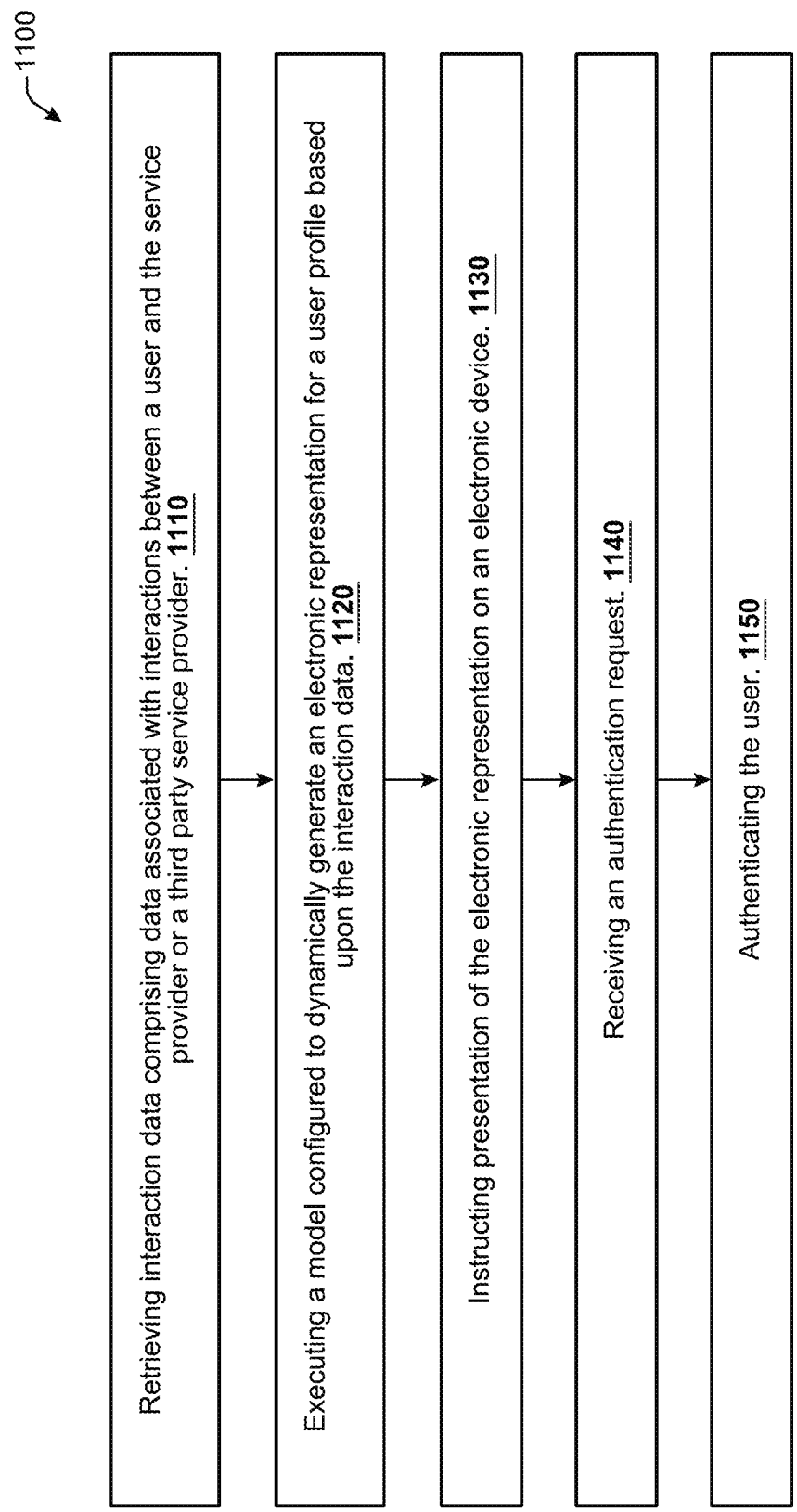
FIG. 11 illustrates a flowchart depicting operational steps for an electronic representation generation system, according to an example described herein.

FIG. 11 illustrates a flowchart depicting operational steps for an electronic representation generation system, according to an example described herein. The method 1100, and other methods described herein, are illustrated as collections of steps (depicted as blocks) in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the method, or alternative methods, and not all of the blocks need be executed. For discussion purposes, the methods are described with reference to the environments, architectures and systems described in the examples herein, although the methods may be implemented in a wide variety of other environments, architectures and systems.

The method 1100 includes steps 1110-1150. However, other examples may include additional or alternative execution steps or may omit one or more steps altogether. The method 1100 is described as being executed by the service provider server(s) 102 in FIG. 1 (and/or the server 1202 or 1302 depicted in FIGS. 12-13). However, one or more steps of method 1100 may also be executed by any number of electronic devices operating in the distributed computing system described hereon. For instance, one or more computing devices (e.g., user devices, such as a mobile device operated by the user) may locally perform part or all the steps of the method 1100.

At step 1110, the service provider server(s) 102 (e.g., via the retrieving component 102(B)) may retrieve interaction data associated with the user. The interaction data may include data associated with interactions between a user and a service provider that is associated with the service provider server(s) 102 and/or third-party service providers. The service provider server(s) 102 may query one or more internal and/or external databases to retrieve interaction data associated with a user. The service provider server(s) 102 may also retrieve demographic data and other existing data (e.g., user preferences) associated with the user. In some examples, the interaction data may correspond to transaction data, merchant data, music data, and/or third-party data, as discussed herein. In some examples, the service provider server(s) 102 may periodically repeat (or iterate) step 1110 in order to update a user's electronic representation. Therefore, unlike conventional methods that provide static electronic representations, the method 1100 can produce electronic representation that are dynamically updated based on the latest data and are customized/personalized or each user.

The service provider server(s) 102 may actively monitor user's interaction data (e.g., transaction conducted and interactions with various platforms), such that the data is retrieved in real-time or near-real-time. In this way, the electronic representation is generated and/or updated via the user's latest data. Therefore, the electronic representation may not be easily replicated or falsified because a bad actor may be prohibited from retrieving the user's latest interaction data on periodic basis. Because the model uses a comprehensive approach and analyzes all the user's interaction data, a falsified or replicated electronic representation (generated via data that is not complete or not updated) may be easily identifiable by the user. This allows the user to use the electronic representation knowing that their electronic representation has not been tampered. For instance, a user can determine that their electronic representation has been tampered if the user has not purchased any new items and the user notices that their electronic representation has changed.

At step 1120, the service provider server(s) 102 (e.g., via the representation generation component 102(A)) may use the data retrieved to generate an electronic representation for the user. In some examples, the service provider server(s) 102 (e.g., via the execution component 102(D)) may execute the trained model in the step 1120. The model may be a generative model that has been trained using generative AI methodologies to analyze interaction data associated with the user and generate an electronic representation of the user's interaction data, as discussed in FIG. 2B. The model may be configured to dynamically generate electronic content that is configured to correspond to the user's interactions and activities.

The model, as discussed herein, may be trained, using various digital content, to identify how different content can be represented via visual, textual, and/or auditory attributes. For instance, during training, the model may learn how to represent interaction data via different visual attributes, such as color, design element, text element, font, and/or the like. The model may be trained using data associated with existing users, such as existing user profiles, demographic data associated with the set of existing user profiles, content corresponding to one or more music media accessed by the set of existing user profiles, social media activity associated with the set of existing users, or advertisements associated with merchants associated with the interaction data.

The method 1100 uses a specifically tailored and trained AI model that allows for generation of an electronic representation that is not possible using conventional human-implemented and/or computer-implemented methods. The model used by the service provider server(s) 102 can transform raw data (e.g., digital content) into machine-readable signals and compare raw data regardless of their original format or source. Moreover, as a result of this customized training method (described in relation to FIG. 2B), the model can provide a comprehensive analysis of the user's interaction data and generate an electronic representation that represents various aspects of the user. In contrast, many generic or conventional models limit their analysis to particular formats of data. For instance, some models can only analyze user transactions, and some other models can only analyze images and not videos. However, the model described herein uses a comprehensive approach that can analyze all interaction data, including multiple formats.

The electronic representation may include machine-ingestible elements that can be used to authenticate a user and/or facilitate a transaction. For instance, the electronic representation may include a visual element (and sometimes auditory and/or textual elements) that when scanned can direct a computer to the user's data or identity. Therefore, the electronic representation can be used to authenticate a user. Unlike conventional electronic authentication methods where the user's representation is generic and not customized, the service provider server(s) 102 may generate an electronic representation that corresponds to the user's interaction data. Therefore, any tampering with the user's electronic representation may be easily identified.

In another example, the service provider server(s) 102 (e.g., via the representation generation component 102(A)) may utilize the rules evaluation component 102(F) to generate the electronic representation using a rule-based approach, as discussed herein. For instance, the service provider server(s) 102 may analyze the interaction data using various pre-defined rules to determine one or more attributes (e.g., visual, textual, and/or auditory elements) associated with the user's electronic representation.

At step 1130, the service provider server(s) 102 (e.g., via the displaying component 102(B)) may instruct presentation of the electronic representation on an electronic device. For instance, the electronic representation may be used to customize one or more GUIs (e.g., FIG. 3). In another example, the electronic representation may be displayed on the user device and may be assigned to the user's different profiles. The electronic representation may be integrated into other content. For instance, the electronic representation may refer to a customization of graphical user interfaces, such as customizing an applications interface(s) as discussed with relation to FIGS. 3 and 7. Therefore, unlike one-size-fits all approaches by conventional methods, the methods discussed herein provide personalized GUIs. In another example, workflows, such as on boarding processes can be customized for a particular user, as discussed with relation to FIG. 9. Therefore, computing resources can be efficiently allocated because they are no longer wasted on repeating the same workflow for all users. In some other examples, the electronic representation may be outputted on a separate device, such as a customized payment card. In yet another example, the electronic representation may be used in generation of a non-fungible token.

The displayed electronic representation may be used for various purposes. For instance, as discussed with respect to FIG. 10, the electronic representation may be used to authenticate a user, identify the user's payment data, and/or facilitate a transaction. The method 1100 allows users to use electronic representation that actually correspond to the user's interaction data. Therefore, unlike conventional methods where the users receives an encrypted visual image (e.g., QR code) that is unrecognizable to the user, the method 1100 generates an electronic representation (e.g., an avatar or a specific sound) that is customized for and represents the user.

At step 1140, the service provider server(s) 102 may receive an authentication request using the electronic representation. The service provider server(s) 102 may be requested to use the electronic representation generated (or in some embodiments received from a different device) to verify/authenticate a user. For instance, as described with respect to FIG. 10, the authentication/verification may be used to facilitate a payment request. In another example, the authentication/verification request may associated with accessing data, accessing a service, submitting a form, approving a transaction (e.g., of another user), etc. For instance, a user may attempt to login an account using their electronic representation. In that example, the user may submit an electronic representation for authentication purposes (e.g., instead of conventional static login credentials, such as login and passwords, that can be easily tampered with). In this way, instead of a static password, the user can rely on their interactions to authenticate them, thereby decreasing the chance of incorrect verification.

At step 1150, the service provider server(s) 102 may authenticate the user using the electronic representation. The service provider server(s) 102 may use a variety of analytical protocols to authenticate the user using the electronic representation. In some examples, the service provider server(s) 102 can retrieve the electronic representation from the user profile, e.g., from an internal database, and compare it with the electronic representation received in association with the authentication request. In some examples, if the retrieved electronic representation and the electronic representation associated with the authentication request match or are sufficiently similar (e.g., a similarity metric is within a threshold), the service provider server(s) 102 can determine a "match." In some examples, the service provider server(s) 102 can analyze the electronic representation in real-time or near-real-time in view of stored interaction data (e.g., associated with the user profile) to determine whether the electronic representation has attributes representative of the interaction data. In some examples, such attributes and/or interaction data may only be known to the user and/or the service provider. This can provide security and authenticity, as described above. If the electronic representation has attributes representative of the interaction data, the service provider server(s) 102 can determine a "match." In some examples, the service provider server(s) 102 can generate a new electronic representation at a time of authentication or verification (e.g., on-the-fly) to determine if the generated electronic representation is similar (as represented by a similarity metric) to or otherwise corresponds to the electronic representation 102 submitted. If the electronic representations are sufficiently similar (e.g., satisfy a similarity metric), the service provider server(s) 102 can determine a "match." In some examples, if the electronic representations are sufficiently similar (e.g., satisfy a similarity metric) or otherwise match, the service provider server(s) 102 can authenticate the user. If the electronic representation does not match or is not sufficiently similar to another electronic representation, the service provider server(s) 102 may not authenticate the user.

Figure 12:
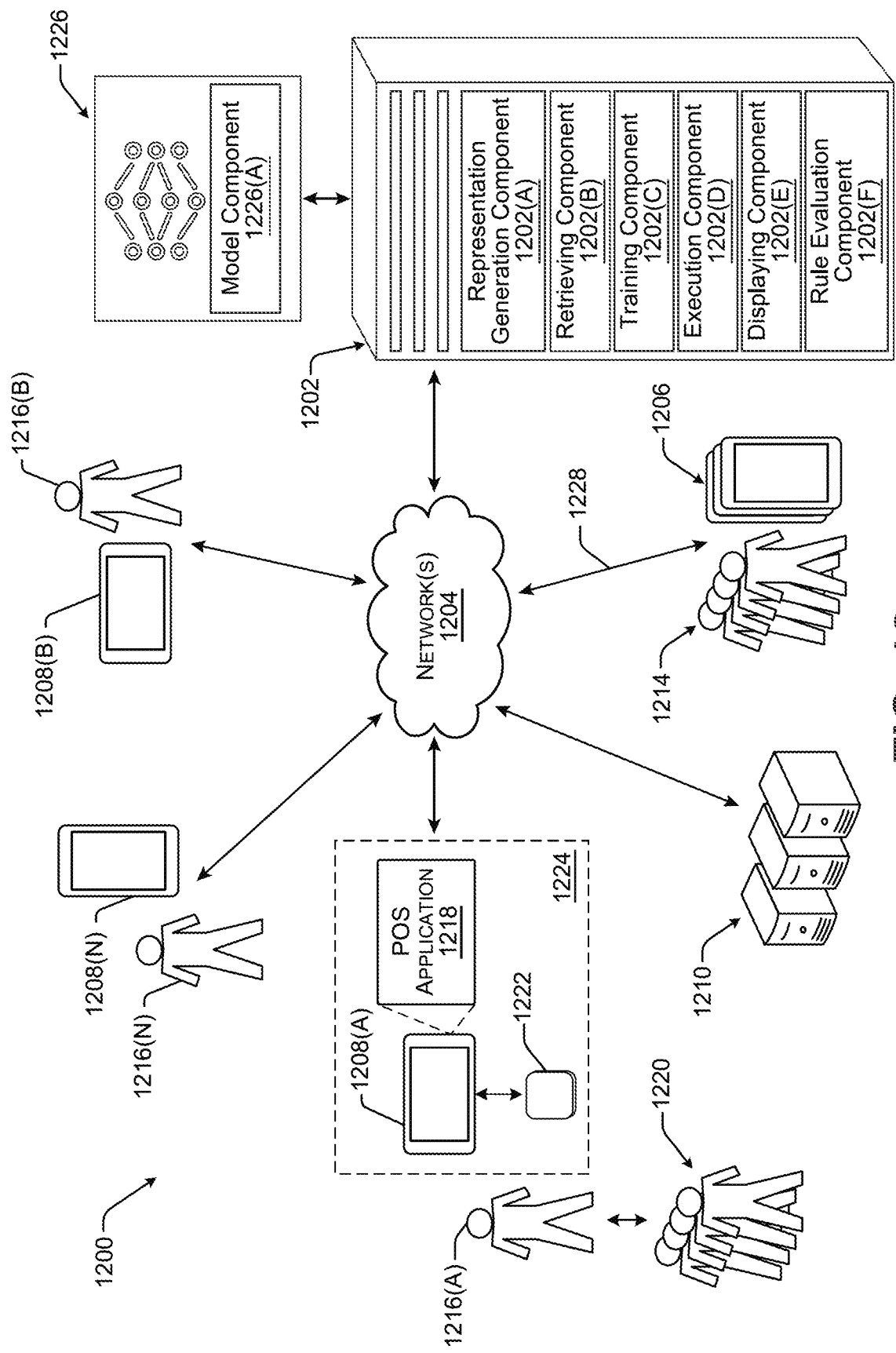
FIG. 12 illustrates an environment for an electronic representation generation system, according to an example.

FIG. 12 illustrates an example environment 1200. The environment 1200 includes server(s) 1202 that can communicate over a network 1204 with user devices 1206 (which, in some examples can be merchant devices 1208 (individually, 1208(A)-1208(N))) and/or server(s) 1210 associated with third-party service provider(s). The server(s) 1202 can be associated with a service provider that can provide one or more services for the benefit of users 1214, as described below. Actions attributed to the service provider can be performed by the server(s) 1202. The servers(s) 1202 may also be in communication with a model 1226. The model 1226 may be similar to the model 116 (depicted in FIG. 1) and may provide the same functionality described in relation to the model 116.

In a non-limiting example, the server(s) 1202 may receive a request from the users 1214 (operating user devices 1206) to generate one or more electronic representations associated with their user profiles. The server(s) 1202 may retrieve interaction data associated with the users 1214 (interaction data 1228) from various internal and external data sources (e.g., server 1210) and may generate an electronic representation accordingly. Specifically, the server(s) 1202 may execute the model 1226 using the interaction data to generate the electronic representation. The server(s) 1202 may then display the electronic representation on the user devices 1206. Moreover, the server(s) 1202 may continuously monitor interaction data associated with the users 1214 and may revise the electronic representation accordingly. For instance, when the users 1214 conduct a new transaction (e.g., via the POS application 1218), the server(s) 1202 may dynamically revise the electronic representation accordingly.

The environment 1200 may include more or fewer features than depicted in FIG. 1. However, the environment 1200 corresponds to the features depicted and described in FIG. 1. For instance, the environment 1200 may include the server 1202 that may provide the same functionality as the service provider server(s) 102 via various components (e.g., representation generation component 102(A) or its corresponding component 1202(A), retrieving component 102(B) or its corresponding component 1202(B), training component 102(C) or its corresponding component 1202(C), execution component 102(D) or its corresponding component 1202(D), the displaying component 102(E) or its corresponding component 1202(E), and rules evaluation component 102(F) or its corresponding component 1202(F)). The server 1202 may use interaction data associated with the users 1214 (similar to the user 108 in FIG. 1) to generate an electronic representation and display on user devices 1206 (similar to the user device 106) by executing the model 1226 having a representation generation component 1226(A), which is similar to the model 116 and its model component 116(A).

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include merchants 1216 (individually, 1216(A)-1216(N)). In an example, the merchants 1216 can operate respective merchant devices 1208, which can be user devices 1206 configured for use by merchants 1216. For the purpose of this discussion, a "merchant" can be any entity that offers items (e.g., goods or services) for purchase or other means of acquisition (e.g., rent, borrow, barter, etc.). The merchants 1216 can offer items for purchase or other means of acquisition via brick-and-mortar stores, mobile stores (e.g., pop-up shops, food trucks, etc.), online stores, combinations of the foregoing, and so forth. In some examples, at least some of the merchants 1216 can be associated with a same entity but can have different merchant locations and/or can have franchise/franchisee relationships. In additional or alternative examples, the merchants 1216 can be different merchants. That is, in at least one example, the merchant 1216(A) is a different merchant than the merchant 1216(B) and/or the merchant 1216(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1208 can have an instance of a POS application 1218 stored thereon. The POS application 1218 can configure the merchant device 1208 as a POS terminal, which enables the merchant 1216(A) to interact with one or more customers 1220. As described above, the users 1214 can include customers, such as the customers 1220 shown as interacting with the merchant 1216(A). For the purpose of this discussion, a "customer" can be any entity that acquires items from merchants. While only two customers 1220 are illustrated in FIG. 12, any number of customers 1220 can interact with the merchants 1216. Further, while FIG. 12 illustrates the customers 1220 interacting with the merchant 1216(A), the customers 1220 can interact with any of the merchants 1216.

In at least one example, interactions between the customers 1220 and the merchants 1216 that involve the exchange of funds (from the customers 1220) for items (from the merchants 1216) can be referred to as "transactions." In at least one example, the POS application 1218 can determine transaction data associated with the POS transactions. Transaction data can include payment information, which can be obtained from a reader device 1222 associated with the merchant device 1208(A), user authentication data, purchase amount information, point-of-purchase information (e.g., item(s) purchased, date of purchase, time of purchase, etc.), etc. The POS application 1218 can send transaction data to the server(s) 1202 such that the server(s) 1202 can track transactions of the customers 1220, merchants 1216, and/or any of the users 1214 over time. Furthermore, the POS application 1218 can present a UI to enable the merchant 1216(A) to interact with the POS application 1218 and/or the service provider via the POS application 1218.

In at least one example, the merchant device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the merchant device 1208(A), such as a microphone port, a headphone port, an audio-jack, a data port, or other suitable port. In additional or alternative examples, the reader device 1222 can be coupled to the merchant device 1208(A) via another wired or wireless connection, such as via a Bluetooth®, BLE, and so on. Additional details are described below with reference to FIG. 15. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1222, and communicate with the server(s) 1202, which can provide, among other services, a payment processing service. The server(s) 1202 associated with the service provider can communicate with server(s) 1210, as described below. In this manner, the POS terminal and reader device 1222 may collectively method transaction(s) between the merchants 1216 and customers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the customers 1220. In additional or alternative examples, the POS terminal can have a display integrated therein for presenting information to the customers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a customer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a customer 1220 slides a card, or other payment instrument, having a magnetic strip through a reader device 1222 that captures payment data contained in the magnetic strip. A dip is a card-present transaction where a customer 1220 inserts a payment instrument having an embedded microchip (i.e., chip) into a reader device 1222 first. The dipped payment instrument remains in the payment reader until the reader device 1222 prompts the customer 1220 to remove the card, or other payment instrument. While the payment instrument is in the reader device 1222, the microchip can create a one-time code which is sent from the POS system 1224 to the server(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data may be manually keyed in (e.g., by a merchant, customer, etc.), or payment data may be recalled from a card-on-file data store, to complete the transaction.

The POS system 1224, the server(s) 1202, and/or the server(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1210. As described above, in at least one example, the server(s) 1210 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1210 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1210 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1210 associated therewith), and a payment authorization message is communicated from the issuer to the POS device via a path opposite of that described above, or via an alternate path.

As described above, the server(s) 1210, which can be associated with payment service provider(s), may determine whether the transaction is authorized based on the transaction data, as well as information relating to parties to the transaction (e.g., the customer 1220 and/or the merchant 1216(A)). The server(s) 1210 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1210 to authorize or decline transactions.

Based on the authentication notification that is received by the POS system 1224 from server(s) 1202, the merchant 1216(A) may indicate to the customer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1214 can access all of the services of the service provider. In other examples, the users 1214 can have gradated access to the services, which can be based on risk tolerance, IDV outputs, subscriptions, and so on. In at least one example, access to such services can be availed to the merchants 1216 via the POS application 1218. In additional or alternative examples, each service can be associated with its own access point (e.g., application, web browser, etc.).

The service provider can offer payment processing services for processing payments on behalf of the merchants 1216, as described above. For example, the service provider can provision payment processing software, payment processing hardware and/or payment processing services to merchants 1216, as described above, to enable the merchants 1216 to receive payments from the customers 1220 when conducting POS transactions with the customers 1220. For instance, the service provider can enable the merchants 1216 to receive cash payments, payment card payments, and/or electronic payments from customers 1220 for POS transactions and the service provider can process transactions on behalf of the merchants 1216.

As the service provider processes transactions on behalf of the merchants 1216, the service provider can maintain accounts or balances for the merchants 1216 in one or more ledgers. For example, the service provider can analyze transaction data received for a transaction to determine an amount of funds owed to a merchant 1216(A) for the transaction. In at least one example, such an amount can be a total purchase price less fees charged by the service provider for providing the payment processing services. Based on determining the amount of funds owed to the merchant 1216(A), the service provider can deposit funds into an account of the merchant 1216(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1216(A) to a bank account of the merchant 1216(A) that is held at a bank or other financial institution (e.g., associated with the server(s) 1210). Scheduled deposits can occur at a prearranged time after a POS transaction is funded, which can be a business day after the POS transaction occurred, or sooner or later. In some examples, the merchant 1216(A) can access funds prior to a scheduled deposit. For instance, the merchant 1216(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request).

Further, in at least one example, the merchant 1216(A) can have a payment instrument that is linked to the stored balance that enables the merchant to access the funds without first transferring the funds from the account managed by the service provider to the bank account of the merchant 1216(A).

In at least one example, the service provider may provide inventory management services. That is, the service provider may provide inventory tracking and reporting. Inventory management services may enable the merchant 1216(A) to access and manage a database storing data associated with a quantity of each item that the merchant 1216(A) has available (i.e., an inventory). Furthermore, in at least one example, the service provider can provide catalog management services to enable the merchant 1216(A) to maintain a catalog, which can be a database storing data associated with items that the merchant 1216(A) has available for acquisition (i.e., catalog management services). In at least one example, the catalog may include a plurality of data items and a data item of the plurality of data items may represent an item that the merchant 1216(A) has available for acquisition. The service provider can offer recommendations related to pricing of the items, placement of items on the catalog, and multi-party fulfillment of the inventory.

In at least one example, the service provider can provide business banking services, which allow the merchant 1216(A) to track deposits (from payment processing and/or other sources of funds) into an account of the merchant 1216(A), payroll payments from the account (e.g., payments to employees of the merchant 1216(A)), payments to other merchants (e.g., business-to-business) directly from the account or from a linked debit card, withdrawals made via scheduled deposit and/or instant deposit, etc. Furthermore, the business banking services can enable the merchant 1216(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1216 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1216. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one example, the server provider 1212 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1214 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1216. In at least one example, the service provider can recommend and/or generate content items to supplement omni-channel presences of the merchants 1216. That is, if a merchant of the merchants 1216 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1214 to set schedules for scheduling appointments and/or users 1214 to schedule appointments.

In some examples, the service provider can provide restaurant management services to enable users 1214 to make and/or manage reservations, to monitor front-of-house and/or back-of-house operations, and so on. In such examples, the merchant device(s) 1208 and/or server(s) 1202 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1206.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1214 may be new to the service provider such that the user 1214 that has not registered (e.g., subscribed to receive access to one or more services offered by the service provider) with the service provider. The service provider can offer onboarding services for registering a potential user 1214 with the service provider. In some examples, onboarding can involve presenting various questions, prompts, and the like to a potential user 1214 to obtain information that can be used to generate a profile for the potential user 1214. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1214 providing all necessary information, the potential user 1214 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1210). That is, the service provider can offer IDV services to verify the identity of users 1214 seeking to use or using their services. Identity verification requests a customer (or potential customer) to provide information that is used by compliance departments to prove that the information is associated with an identity of a real person or entity. In at least one example, the service provider can perform services for determining whether identifying information provided by a user 1214 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1210 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1202) and/or the server(s) 1210 via the network(s) 1204. In some examples, the merchant device(s) 1208 are not capable of connecting with the service provider (e.g., the server(s) 1202) and/or the server(s) 1210, due to a network connectivity issue, for example. In additional or alternative examples, the server(s) 1202 are not capable of communicating with the server(s) 1210 due to network connectivity issue, for example. In such examples, devices may operate in "offline" mode where at least some payment data is stored (e.g., on the merchant device(s) 1208) and/or the server(s) 1202 until connectivity is restored and the payment data can be transmitted to the server(s) 1202 and/or the server(s) 1210 for processing.

In at least one example, the service provider can be associated with a hub, such as an order hub, an inventory hub, a fulfillment hub and so on, which can enable integration with one or more additional service providers (e.g., associated with the additional server(s) 1210). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1206 that are in communication with server(s) 1202 of the service provider. That is, techniques described herein are directed to a specific example—or, a practical application—of utilizing a distributed system of user devices 1206 that are in communication with server(s) 1202 of the service provider to perform a variety of services, as described above. The unconventional configuration of the distributed system described herein enables the server(s) 1202 that are remotely-located from end-users (e.g., users 1214) to intelligently offer services based on aggregated data associated with the end-users, such as the users 1214 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some examples, the distributed system is capable of applying the intelligence derived from an existing user base to a new user, thereby making the onboarding experience for the new user personalized and frictionless when compared to traditional onboarding methods. Thus, techniques described herein improve existing technological methods.

As described above, various graphical user interfaces (GUIs) can be presented to facilitate techniques described herein. Some of the techniques described herein are directed to user interface features presented via GUIs to improve interaction between users 1214 and user devices 1206. Furthermore, such features are changed dynamically based on the profiles of the users involved interacting with the GUIs. As such, techniques described herein are directed to improvements to computing systems.

In a non-limiting example, the users 1214 (or customers 1220) may use the methods and systems described herein to facilitate a transaction with the merchants 1216. For instance, the users 1214 may use the methods discussed herein to generate/receive an electronic representation via the servers 1202. To facilitate the payment (e.g., pay a merchant or conduct a peer-to-per payment), the users 1214 may display the electronic representation in a manner that is visible to the merchant 1216(A). The merchant 1216(A) may then use the merchant device 1208(A) to scan the electronic representation of the users 1214. For instance, the merchant 1208(A) may initiate the POS application 1218 to scan the electronic representation displayed on the user device 1206 and transmit the electronic representation to the servers 1202. Using the methods described herein (e.g., method 1000 in FIG. 10), the servers 1202 may authenticate the electronic representation received via the POS application 1218. For instance, the servers 1202 may retrieve an electronic representation of the users 1214 from a local repository and match the retrieved electronic representation with the electronic representation received via the POS application 1218. If the electronic representations match, the servers 1202 may authorize payment from an account of the user to the merchant. In this way, the users 1214 may not need to use a payment card to pay the merchant 1216(A).

Figure 13:
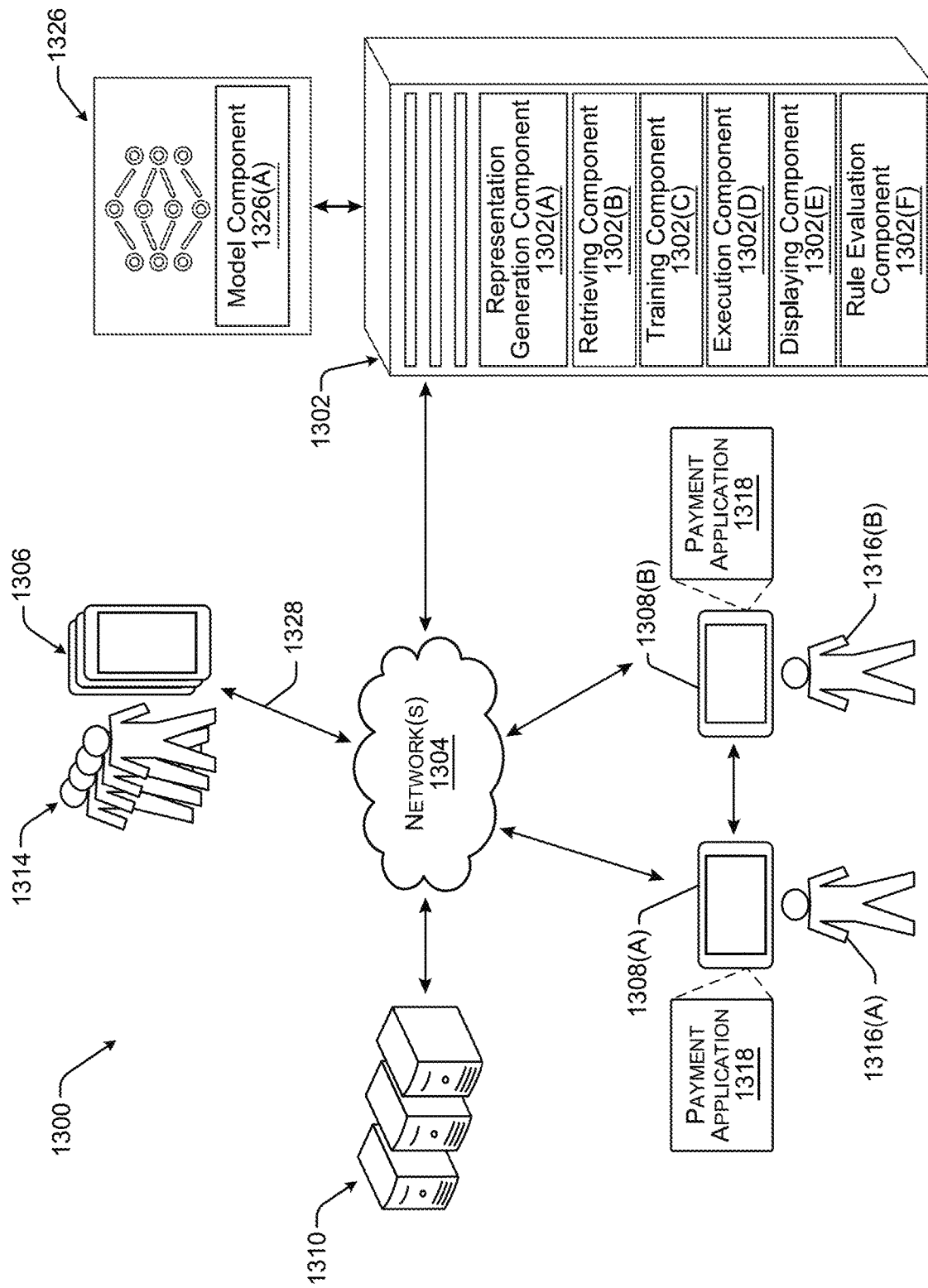
FIG. 13 illustrates an environment for an electronic representation generation system, according to an example described herein.

FIG. 13 illustrates an example environment 1300. The environment 1300 includes server(s) 1302 that can communicate over a network 1304 with user devices 1306 (which, in some examples can be user devices 1308 (individually, 1308(A), 1308(B)) and/or server(s) 1310 associated with third-party service provider(s). The server(s) 1302 can be associated with a service provider that can provide one or more services for the benefit of users 1314, as described below. Actions attributed to the service provider can be performed by the server(s) 1302. In some examples, the service provider referenced in FIG. 12 can be the same or different than the service provider referenced in FIG. 13.

In a non-limiting example, the servers 1302 may use the payment application 1318 in conjunction with the electronic representation to conduct a transaction. For instance, the user 1316A (sender) may display an electronic representation on the device 1308A and the user 1308B (recipient) may scan the image displayed on the device 1308A. Using various methods discussed herein, such as the method 1100, the servers 1302 may facilitate a peer-to-peer payment using the electronic representation that is unique to the user 1316A.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as customers, buyers, merchants, sellers, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

In at least one example, the service provider can provide a peer-to-peer payment service that enables peer-to-peer payments between two or more users 1314. Two users, user 1316(A) and user 1316(B) are illustrated in FIG. 13 as "peers" in a peer-to-peer payment. In at least one example, the service provider can communicate with instances of a payment application 1318 (or other access point) installed on devices 1306 configured for operation by users 1314. In an example, an instance of the payment application 1318 executing on a first device 1308(A) operated by a payor (e.g., user 1316(A)) can send a request to the service provider to transfer an asset (e.g., fiat currency, non-fiat currency, digital assets, cryptocurrency, securities, gift cards, and/or related assets) from the payor to a payee (e.g., user 1316(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 14:
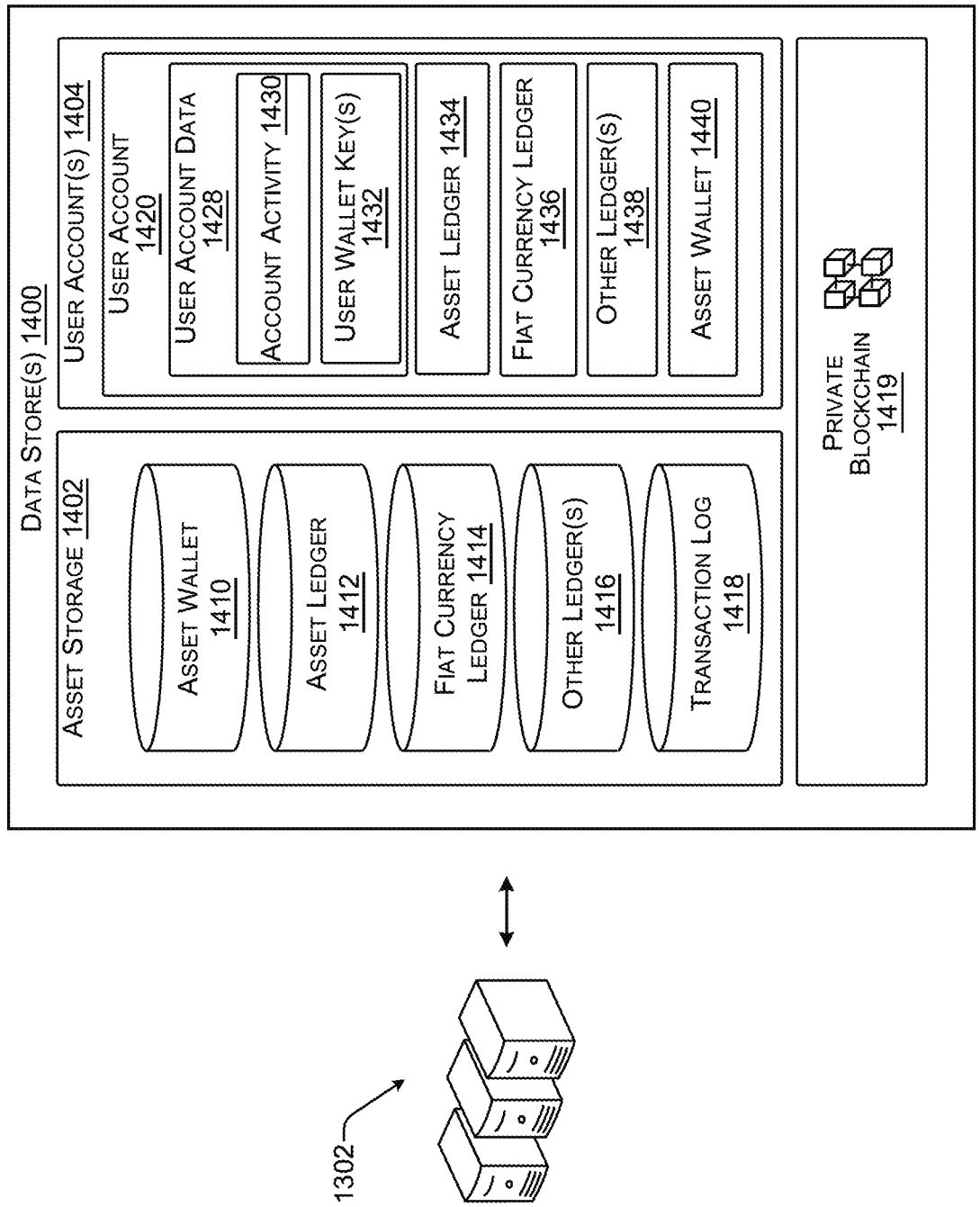
FIG. 14 illustrates data store(s) that can be used in an electronic representation generation system, according to an example described herein.

In some examples, the service provider can utilize a ledger system to track transfers of assets between users 1314. FIG. 14, below, provides additional details associated with such a ledger system. The ledger system can enable users 1314 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1318 executing on user device(s) of payee(s). As an example, the service provider can transfer assets from an account of user 1316(A) to an account of the user 1316(B) and can send a notification to the user device 1308(B) of the user 1316(B) for presentation via a user interface. The notification can indicate that a transfer is in process, a transfer is complete, or the like. In some examples, the service provider can send additional or alternative information to the instances of the payment application 1318 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some examples, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1302 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1318 executing on the user devices 1306. In at least some examples, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 13 or a third-party service provider associated with the server(s) 1310. In examples where the content provider is a third-party service provider, the server(s) 1310 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some examples, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 13. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server(s) 1302 (which, in such an example can be called a "messaging server"). In some instances, the messaging application can include a payment application with messaging capability that enables users of the payment application to communicate with one another. In such instances, the payment application can be executed on a user device 1306 based on instructions transmitted to and from the server(s) 1302 (e.g., the payment service discussed in this description or another payment service that supports payment transactions). In some examples, the messaging application can be provided by a third-party service provider associated with the server(s) 1310. In examples where the messaging application is a third-party service provider, the server(s) 1310 can be accessible via one or more APIs or other integrations.

As described above, the service provider can facilitate peer-to-peer transactions, which can enable users 1314 to transfer fiat currency, non-fiat currency, cryptocurrency, securities, or other assets, or portions thereof, to other users 1314. In at least one example, individual users can be associated with user accounts. Additional details associated with user accounts and the transfer of assets between users 1314 are described below with reference to FIG. 14.

Furthermore, the service provider of FIG. 13 can enable users 1314 to perform banking transactions via instances of the payment application 1318. For example, users can configure direct deposits or other deposits for adding assets to their various ledgers/balances. Further, users 1314 can configure bill pay, recurring payments, and/or the like using assets associated with their accounts. In addition to sending and/or receiving assets via peer-to-peer transactions, users 1314 buy and/or sell assets via asset networks such as cryptocurrency networks, securities networks, and/or the like.

The environment 1300 may include more or fewer features than depicted in FIG. 1. However, the environment 1300 corresponds to the features depicted and described in FIG. 1. For instance, the environment 1300 may include the server 1302 that may provide the same functionality as the service provider server(s) 102 via various components (e.g., representation generation component 102(A) or its corresponding component 1302(A), retrieving component 102(B) or its corresponding component 1302(B), training component 102(C) or its corresponding component 1302(C), execution component 102(D) or its corresponding component 1302(D), the displaying component 102(E) or its corresponding component 1302(E), and rules evaluation component 102(F) or its corresponding component 1302(F)). The server 1302 may use interaction data associated with the users 1314 (similar to the user 108 in FIG. 1) to generate an electronic representation and display on user devices 1306 (similar to the user device 106) by executing the model 1226 having a representation generation component 1326(A), which is similar to the model 116 and its model component 116(A).

FIG. 14 illustrates example data store(s) 1400 that can be associated with the server(s) 1302.

In at least one example, the data store(s) 1400 can store assets in an asset storage 1402, as well as data in user account(s) 1404. In some examples, user account(s) 1404 can include merchant account(s) 1406, and/or customer account(s) 1408. In at least one example, the asset storage 1402 can be used to store assets managed by the service provider of FIG. 13. In at least one example, the asset storage 1402 can be used to record whether individual of the assets are registered to users. For example, the asset storage 1402 can include an asset wallet 1410 for storing records of assets owned by the service provider of FIG. 13, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1310 can be associated therewith. In some examples, the asset wallet 1410 can communicate with the asset network via one or more components associated with the server(s) 1302.

The asset wallet 1410 can be associated with one or more addresses and can vary addresses used to acquire assets (e.g., from the asset network(s)) so that its holdings are represented under a variety of addresses on the asset network. In examples where the service provider of FIG. 13 has its own holdings of cryptocurrency (e.g., in the asset wallet 1410), a user can acquire cryptocurrency directly from the service provider of FIG. 13. In some examples, the service provider of FIG. 13 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1402 may contain ledgers that store records of assignments of assets to users 1314. Specifically, the asset storage 1402 may include asset ledger 1410, fiat currency ledger 1414, and other ledger(s) 1416, which can be used to record transfers of assets between users 1314 of the service provider and/or one or more third-parties (e.g., merchant network(s), payment card network(s), ACH network(s), equities network(s), the asset network, securities networks, etc.). In doing so, the asset storage 1402 can maintain a running balance of assets managed by the service provider of FIG. 13. The ledger(s) of the asset storage 1402 can further indicate some of the running balance for each of the ledger(s) stored in the asset storage 1402 is assigned or registered to one or more user account(s) 1404.

In at least one example, the asset storage 1402 can include transaction logs 1418, which can include records of past transactions involving the service provider of FIG. 13. In at least one example, transaction data, as described herein, can be stored in association with the transaction logs 1418.

In some examples, the data store(s) 1400 can store a private blockchain 1419. A private blockchain 1419 can function to record sender addresses, recipient addresses, public keys, values of cryptocurrency transferred, and/or can be used to verify ownership of cryptocurrency tokens to be transferred. In some examples, the service provider of FIG. 13 can record transactions taking place within the service provider of FIG. 13 involving cryptocurrency until the number of transactions has exceeded a determined limit (e.g., number of transactions, storage space allocation, etc.). Based at least in part on determining that the limit has been reached, the service provider of FIG. 13 can publish the transactions in the private blockchain 1419 to a public blockchain (e.g., associated with the asset network), where miners can verify the transactions and record the transactions to blocks on the public blockchain. In at least one example, the service provider of FIG. 13 can participate as miner(s) at least for its transactions to be posted to the public blockchain.

In at least one example, the data store(s) 1400 can store and/or manage accounts, such as user account(s) 1404, merchant account(s) 1406, and/or customer account(s) 1408. In at least one example, the user account(s) 1404 may store records of user accounts associated with the users 1314. In at least one example, the user account(s) 1404 can include a user account 1420, which can be associated with a user (of the users 1314). Other user accounts of the user account(s) 1404 can be similarly structured to the user account 1420, according to some examples. In other examples, other user accounts may include more or less data and/or account information than that provided by the user account 1420. In at least one example, the user account 1420 can include user account data 1428, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1428 can include account activity 1430 and user wallet key(s) 1432. The account activity 1430 may include a transaction log for recording transactions associated with the user account 1420. In some examples, the user wallet key(s) 1432 can include a public-private key-pair and a respective address associated with the asset network or other asset networks. In some examples, the user wallet key(s) 1432 may include one or more key pairs, which can be unique to the asset network or other asset networks.

In addition to the user account data 1428, the user account 1420 can include ledger(s) for account(s) managed by the service provider of FIG. 13, for the user. For example, the user account 1420 may include an asset ledger 1434, a fiat currency ledger 1436, and/or one or more other ledgers 1438. The ledger(s) can indicate that a corresponding user utilizes the service provider of FIG. 13 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 13.

In some examples, the asset ledger 1434 can store a balance for each of one or more cryptocurrencies (e.g., Bitcoin, Ethereum, Litecoin, etc.) registered to the user account 1420. In at least one example, the asset ledger 1434 can further record transactions of cryptocurrency assets associated with the user account 1420. For example, the user account 1420 can receive cryptocurrency from the asset network using the user wallet key(s) 1432. In some examples, the user wallet key(s) 1432 may be generated for the user upon request. User wallet key(s) 1432 can be requested by the user in order to send, exchange, or otherwise control the balance of cryptocurrency held by the service provider of FIG. 13 (e.g., in the asset wallet 1410) and registered to the user. In some examples, the user wallet key(s) 1432 may not be generated until a user submits a request. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 13 and the value is credited as a balance in asset ledger 1434), by purchasing currency in the form associated with the account using currency in a different form (e.g., buying a value of cryptocurrency from the service provider of FIG. 13 using a value of fiat currency reflected in fiat currency ledger 1436, and crediting the value of cryptocurrency in asset ledger 1434), or by conducting a transaction with another user (customer or merchant) of the service provider of FIG. 13 wherein the account receives incoming currency (which can be in the form associated with the account or a different form, in which the incoming currency may be converted to the form associated with the account). In some examples, the user account data 1428 can include preferences for maintaining balances of individual of the ledgers. For example, the service provider of FIG. 13 can automatically debit the fiat currency ledger 1436 to increase the asset ledger 1434, or another account associated with the user whenever the cryptocurrency balance (e.g., of the asset ledger 1434) falls below a stated level (e.g., a threshold). Conversely, in some examples, the service provider of FIG. 13 can automatically credit the fiat currency ledger 1436 to decrease the asset ledger 1434 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 13 (i.e., an external account). In at least one example, the user can transfer all or a portion of a balance of the cryptocurrency stored in the third-party cryptocurrency wallet to the service provider of FIG. 13. Such a transaction may allow the user to transfer an amount of the cryptocurrency in a message signed by user's private key to an address provided by the service provider of FIG. 13. In at least one example, the transaction can be sent to miners to bundle the transaction into a block of transactions and to verify the authenticity of the transactions in the block. Once a miner has verified the block, the block is written to a public, distributed blockchain where the service provider of FIG. 13 can then verify that the transaction has been confirmed and can credit the user's asset ledger 1434 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 13. As described above, in some examples, the service provider of FIG. 13 can acquire cryptocurrency from a third-party source. In such examples, the asset wallet 1410 can be associated with different addresses and can vary addresses used to acquire cryptocurrency so that its holdings are represented under a variety of addresses on a blockchain. When the service provider of FIG. 13 has their own holdings of cryptocurrency, users can acquire cryptocurrency directly from the service provider of FIG. 13. In some examples, the service provider of FIG. 13 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 13 has its own cryptocurrency assets, cryptocurrency transferred in a transaction (e.g., data with address provided for receipt of transaction and a balance of cryptocurrency transferred in the transaction) can be stored in the asset wallet 1410. In at least one example, the service provider of FIG. 13 can credit the asset ledger 1434 of the user. Additionally, while the service provider of FIG. 13 recognizes that the user retains the value of the transferred cryptocurrency through crediting the asset ledger 1434, any person that inspects the blockchain will see the cryptocurrency as having been transferred to the service provider of FIG. 13. In some examples, the asset wallet 1410 can be associated with many different addresses. In such examples, any person that inspects the blockchain may not easily associate all cryptocurrency stored in asset wallet 1410 as belonging to the same entity. It is this presence of a private ledger that is used for real-time transactions and maintained by the service provider of FIG. 13, combined with updates to the public ledger at other times, which allows for extremely fast transactions using cryptocurrency to be achieved. In some examples, the "private ledger" can refer to the asset ledger 1410, which in some examples, can utilize the private blockchain 1419, as described herein. The "public ledger" can correspond to a public blockchain associated with the asset network.

In at least one example, a user's asset ledger 1434, fiat currency ledger 1436, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1434. In some examples, a user can receive fiat currency or another currency in the form of payment for a transaction with another user. In at least one example, at least a portion of such funds can be converted into cryptocurrency by the service provider of FIG. 13 and used to fund the asset ledger 1434 of the user.

As addressed above, in some examples, users can also have other accounts maintained by the service provider of FIG. 13. For example, a user can also have an account in U.S. dollars, which can be tracked, for example, via the fiat currency ledger 1436. Such an account can be funded by transferring money from a bank account at a third-party bank to an account maintained by the service provider of FIG. 13 as is conventionally known. In some examples, a user can receive fiat currency in the form of payment for a transaction with another user. In such examples, at least a portion of such funds can be used to fund the fiat currency ledger 1436.

In some examples, a user can have one or more internal payment cards registered with the service provider of FIG. 13. Internal payment cards can be linked to one or more of the accounts associated with the user account 1420. In some examples, options with respect to internal payment cards can be adjusted and managed using an application (e.g., the payment application 1318).

In at least one example, as described above, each ledger can correspond to an account of the user that is managed by the service provider of FIG. 13. In at least one example, individual of the accounts can be associated with a wallet or a stored balance for use in payment transactions, peer-to-peer transactions, payroll payments, etc.

In at least one example, the user account 1420 can be associated with an asset wallet 1440. The asset wallet 1440 of the user can be associated with account information that can be stored in the user account data 1428 and, in some examples, can be associated with the user wallet key(s) 1432. In at least one example, the asset wallet 1440 can store data indicating an address provided for receipt of a cryptocurrency transaction. In at least one example, the balance of the asset wallet 1440 can be based at least in part on a balance of the asset ledger 1434. In at least one example, funds availed via the asset wallet 1440 can be stored in the asset wallet 1440 or the asset wallet 1410. Funds availed via the asset wallet 1410 can be tracked via the asset ledger 1434. The asset wallet 1440, however, can be associated with additional cryptocurrency funds.

In at least one example, when the service provider of FIG. 13 includes a private blockchain 1419 for recording and validating cryptocurrency transactions, the asset wallet 1440 can be used instead of, or in addition to, the asset ledger 1434. For example, at least one example, a merchant can provide the address of the asset wallet 1440 for receiving payments. In an example where a customer is paying in cryptocurrency and the customer has their own cryptocurrency wallet account associated with the service provider of FIG. 13, the customer can send a message signed by its private key including its wallet address (i.e., of the customer) and identifying the cryptocurrency and value to be transferred to the merchant's asset wallet 1440. The service provider of FIG. 13 can complete the transaction by reducing the cryptocurrency balance in the customer's cryptocurrency wallet and increasing the cryptocurrency balance in the merchant's asset wallet 1440. In addition to recording the transaction in the respective cryptocurrency wallets, the transaction can be recorded in the private blockchain 1419 and the transaction can be confirmed. A user can perform a similar transaction with cryptocurrency in a peer-to-peer transaction as described above. In at least one example, the cryptocurrency wallet account 1430 can be funded by a balance transfer from a third-party cryptocurrency wallet, as described above. Such a transaction can require a user to transfer an amount of cryptocurrency in a message signed by the user's private key to an address of the cryptocurrency wallet account 1430. The transferred amount of cryptocurrency can then be within the cryptocurrency wallet account 1430 for use in later transactions.

While the asset ledger 1434 and/or asset wallet 1440 are each described above with reference to cryptocurrency, the asset ledger 1434 and/or asset wallet 1440 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 13 is an aspect of the technology disclosed that enables technical advantages of increased processing speed and improved security.

Figure 15:
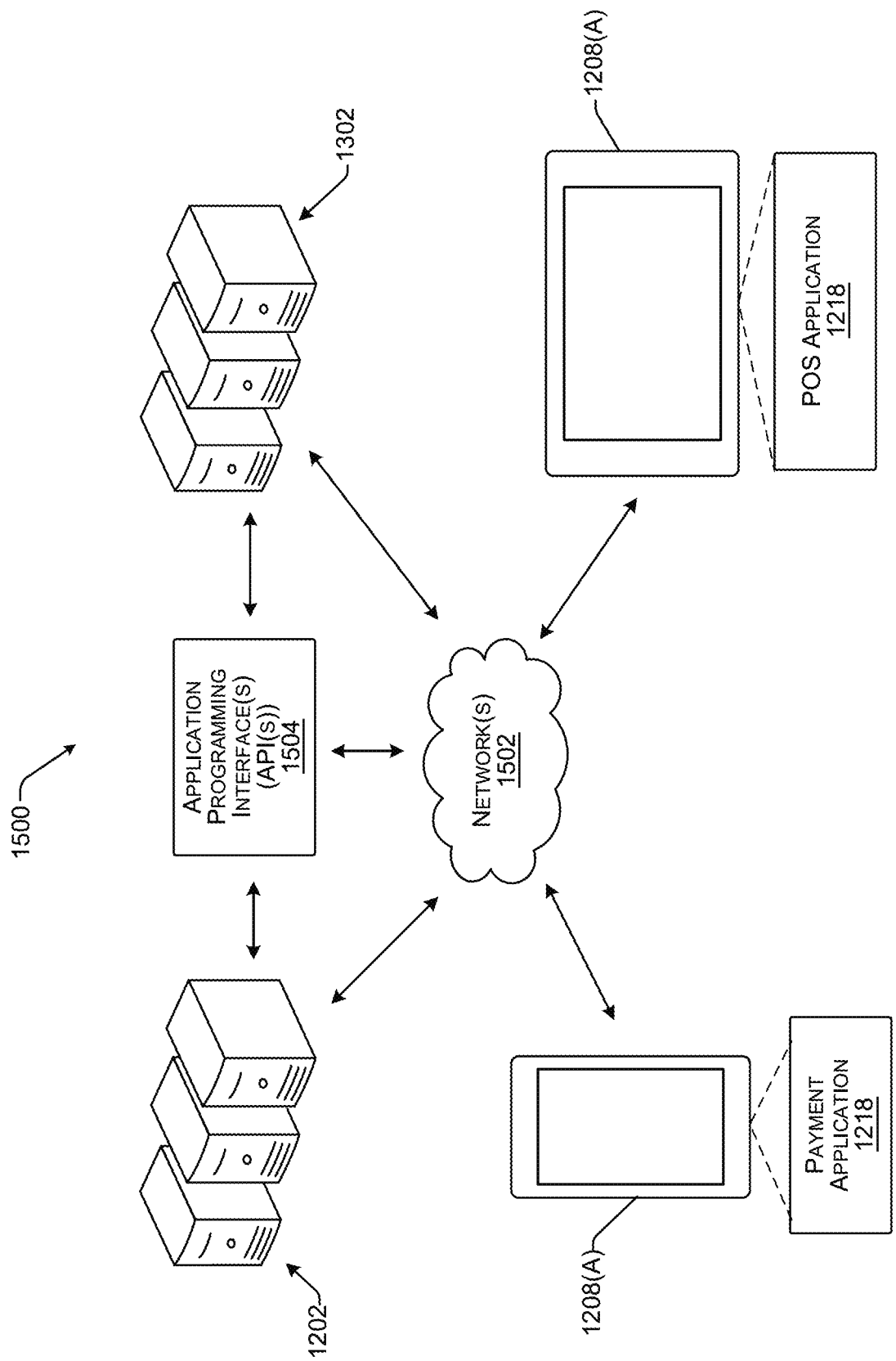
FIG. 15 illustrates an environment for an electronic representation generation system, according to an example described herein.

FIG. 15 illustrates an example environment 1500 wherein the environment 1200 and the environment 1300 can be integrated to enable payments at the point-of-sale using assets associated with user accounts in the peer-to-peer environment of FIG. 13. As illustrated, each of the components can communicate with one another via one or more networks 1502. In some examples, one or more APIs 1504 or other functional components can be used to facilitate such communication.

In at least one example, the example environment 1500 can enable contactless payments, via integration of peer-to-peer payment, or other payment making, platform(s) and payment processing platform(s), are described herein. For the purpose of FIG. 15, the environment 1200 can refer to a payment processing platform and the environment 1300 can refer to a peer-to-peer payment, or payment making, platform. In an example, such an integration can enable a customer to participate in a transaction via their own computing device instead of interacting with a merchant device of a merchant, such as the merchant device 1208(A). In such an example, the POS application 1218, associated with a payment processing platform and executable by the merchant device 1208(A) of the merchant, can present a Quick Response (QR) code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize their own computing device, such as the user device 1308(A), to capture the QR code, or the other transaction code, and to provide an indication of the captured QR code, or other transaction code, to server(s) 1202 and/or server(s) 1302.

Based at least in part on the integration of the peer-to-peer payment platform and the payment processing platform (e.g., via the API), the server(s) 1202 and/or 1302 associated with each can exchange communications with each other— and with a payment application 1318 associated with the peer-to-peer payment platform and/or the POS application 1218—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1308(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1318, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1308(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a text message with a resource locator (e.g., uniform resource locator (URL)) that can be associated with a peer-to-peer payment platform to be sent to the user device 1308(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1308 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1318 of a user device 1308(A) of a customer to enable the customer to participate in a transaction via their own computing device. For instance, in a "scan to pay" example as described above, based at least in part on capturing the QR code, or other transaction code, via the user device 1308(A), the payment processing platform can provide transaction data to the peer-to-peer payment platform for presentation via the payment application 1318 on the user device 1308(A). In some examples, the customer can watch items being added to their cart (e.g., via a user interface presented via the payment application). As an item is added to a virtual cart by the merchant—via the POS application 1218 on the merchant device 1208(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1318 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1308(A) during or after payment of the transaction.

In some examples, based at least in part on capturing the QR code, or other transaction code, the payment processing platform can provide transaction data to the peer-to-peer payment platform for presentation via the payment application 1318 on the computing device of the customer, such as the user device 1308(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1318 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions may be utilized and thus techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1318 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

In a non-limiting example, a user may use features discussed in FIG. 15 to facilitate a secure payment (e.g., purchasing of a product). For instance, a user may initiate the payment application 1218 using the device 1208 to display an electronic representation generated by the server(s) 1202. A merchant may initiate a POS application 1218 on a merchant device (e.g., mobile device and/or a point-of-sale terminal). The merchant may then capture an image of the electronic representation displayed on the payment application 1218 (or record a sound file if the electronic representation is auditory). The server(s) 1202 may use the methods discussed herein, such as the method 1000 in FIG. 10, to facilitate a payment from the user to the merchant.

Figure 16:
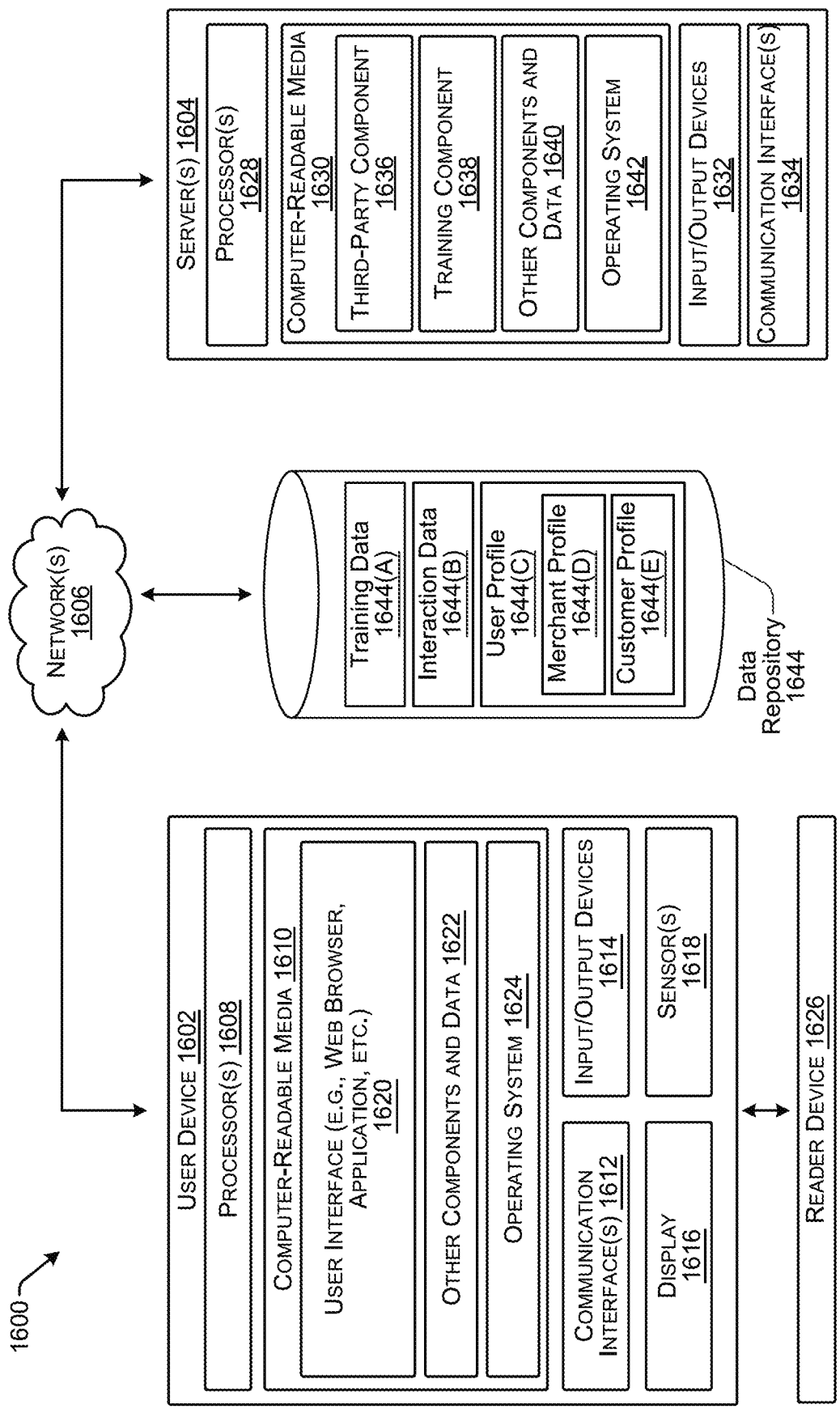
FIG. 16 illustrates a block diagram depicting an electronic representation generation system, according to an example described herein.

FIG. 16 depicts an illustrative block diagram illustrating a system 1600 for performing techniques described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 16.

The data store 1644 may be a similar data repository as the service provider database 112 where the servers 1604 (similar to the service providers server(s) 102 or 1202) store various interaction data executed via the user device 1602 (similar to the user device 106). The data store 1644 may include the training data 1614 (similar to the training data 114) and interaction data 1615 (similar the interaction data 115).

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, components or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some examples, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider associated with the server(s) 1604, or which can be an otherwise dedicated application. In some examples, the user interface 1620 can be any of GUIs illustrated in FIGS. 3-10 In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other components and data 1622, which can include programs, drivers, etc., and the data used or generated by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Examples of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, examples herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware example, such as slots, magnetic tracks, and rails with one or more sensors or electrical contacts to facilitate detection and acceptance of a payment instrument. That is, the reader device 1626 may include hardware examples to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process them as payment instruments, given that such biometric characteristics are registered with the payment service and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more components and/or methods to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one component for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program components, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many examples, these functional components comprise instructions or programs that are executable by the processors 1628 and that, when executed, specifically configure the one or more processors 1628 to perform the actions attributed above to the service provider and/or payment processing service. Functional components stored in the computer-readable media 1630 can optionally include a third-party component 1636, a training component 1638 (similar to the training component 102(C) in FIG. 1), and one or more other components and data 1640 that may include components 102(A) and 102(C)-(F), depicted in FIG. 1.

The third-party component 1636 can be configured to receive interaction data from any third-party service provided that may or may not be integrated within the service provider associated with the server 1604. For instance, the third-party component 1638 may receive transaction data from POS systems, such as the POS system 1224 described above with reference to FIG. 12. The third-party component 1636 can transmit requests (e.g., authorization, capture, settlement, etc.) to payment service server computing device(s) to facilitate POS transactions between merchants and customers. The third-party component 1636 can communicate the successes or failures of the POS transactions to the POS systems.

The training component 1638 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1602 and/or the server(s) 1604 for use at a time after the data models have been trained (e.g., at runtime).

The one or more other components and data 1640 can include data associated with the model configured to generate the electronic representations, the functionality of which is described, at least partially, above. Specifically, the other components and data may include the training data that is updated and used by the training component 1638 to train the model. Further, the one or more other components and data 1640 can include programs, drivers, etc., and the data used or generated by the functional components. Further, the server(s) 1604 can include many other logical, programmatic and physical components, of which those described above are merely examples that are related to the discussion herein.

The one or more "components" referenced herein may be implemented as more components or as fewer components, and functions described for the components may be redistributed depending on the details of the example. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a data repository 1644 that can be configured to store data that is accessible, manageable, and updatable. In some examples, the data repository 1644 can be integrated with the user device 1602 and/or the server(s) 1604. In other examples, as shown in FIG. 16, the data repository 1644 can be located remotely from the server(s) 1604 and can be accessible to the server(s) 1604. The data repository 1644 can comprise multiple databases and/or servers connected locally and/or remotely via the network(s) 1606.

In at least one example, the data repository 1644 can store user profiles 1644(C), which can include merchant profiles 1644(D), customer profiles 1644(E), and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the data repository 1644 can store inventory database(s) and/or catalog data base(s). As described above, an inventory can store data associated with a quantity of each item that a merchant has available to the merchant. Furthermore, a catalog can store data associated with items that a merchant has available for acquisition. The data repository 1644 can store additional or alternative types of data as described herein, such as training data 1614, which can correspond with the training data 114 in FIG. 1, and interaction data 1615, which can correspond with the interaction data 115 of FIG. 1.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the methods. In some examples, one or more blocks of the method can be omitted entirely. Moreover, the methods can be combined in whole or in part with each other or with other methods.

In one example, a method, implemented in part by a processor of a payment service, comprises retrieving, by the processor, interaction data comprising attributes of one or more interactions between a user and at least one of the payment service or one or more third-party services integrated with the payment service; executing, by the processor, a model configured to dynamically generate a graphical representation for a user profile based upon the interaction data, wherein the model is trained using attributes associated with a set of existing user profiles associated with the payment service and corresponding interaction data indicative of interactions with existing users of the payment service and at least one of the payment service or the one or more third-party services, and wherein the graphical representation is generated without input from the user; instructing, by the processor, at least one electronic device to present the graphical representation for the user profile receiving, by the processor, an authentication request comprising the graphical representation; and authenticating by the processor, the user using the graphical representation.

The interaction data may correspond to at least one of transaction data, merchant data, music data, or third-party data.

The model may be further configured to generate a visual attribute of the graphical representation for the user profile, the visual attribute comprising at least one of color, design element, text element, or font.

The model may be further trained using at least one of graphical representations corresponding to the set of existing user profiles, demographic data associated with the set of existing user profiles, content corresponding to one or more music media accessed by the set of existing user profiles, social media activity associated with the set of existing users, or communications associated with merchants associated with the interaction data.

In another example, a method, implemented in part by a processor of a service provider, comprises retrieving, by the processor, interaction data comprising attributes of one or more interactions between a user and the service provider or one or more third-party services integrated with the service provider; executing, by the processor, a model configured to dynamically generate an electronic representation for a user profile based upon the interaction data, wherein the model is trained using attributes associated with a set of existing user profiles associated with the service provider and corresponding interaction data indicative of interaction data of the set of existing user profiles, and wherein the electronic representation is generated without input from the user; and instructing, by the processor, presentation of the electronic representation on an electronic device.

The interaction data may correspond to at least one of transaction data, merchant data, music data, or third-party data, and wherein the model is further trained using at least one of graphical representations corresponding to the set of existing user profiles, demographic data associated with the set of existing user profiles, content corresponding to one or more music media accessed by the set of existing user profiles, social media activity associated with the set of existing users, or advertisements associated with merchants associated with the interaction data.

The electronic representation of the user profile may be at least one of a graphical element, textual element, video element, or auditory element, wherein when the model generates a graphical element, the model is further configured to generate a visual attribute of the electronic representation for the user profile, the visual attribute comprising at least one of color, design element, text, or font.

Instructing presentation of the electronic representation may comprise instructing an output of a user interface displayed on the electronic device customized based on the electronic representation, an onboarding method for the user where the onboarding method is customized based on the electronic representation, or the electronic representation on a payment card.

The electronic representation for the user profile may be useable as a payment instrument, the methods and/or systems described herein may further comprise receiving, from a second electronic device, a payment request, wherein the payment request is associated with the electronic representation; accessing payment data associated with the user profile based on the payment request being associated with the electronic representation, wherein the payment data is embedded in the electronic representation or identifiable based on an association between the electronic representation and the user profile; and authorizing the payment request using the payment data.

The methods and/or systems described herein may further comprise initiating, by the processor, generation of a non-fungible token based on the electronic representation of the user profile.

The methods and/or systems described herein may further comprise periodically monitoring, by the processor, new interaction data associated with the user; and updating, by the processor, the electronic representation in accordance with executing the model using the new interaction data.

The interaction data may satisfy a threshold or is determined to be associated with a particular characteristic, the electronic representation comprises an attribute indicating satisfaction of the threshold or association with the particular characteristic.

In another example, a computer system comprises one or more processors; and one or more computer-executable instructions that, when executed by the one or more processors, cause the one or more processors to perform operations comprising: retrieving interaction data comprising attributes of one or more interactions between a user and the service provider or one or more third-party services integrated with the service provider; executing a model configured to dynamically generate an electronic representation for a user profile based upon the interaction data, wherein the model is trained using attributes associated with a set of existing user profiles associated with the service provider and corresponding interaction data indicative of interaction data of the set of existing user profiles, and wherein the electronic representation is generated without input from the user; and instructing presentation of the electronic representation on an electronic device.

The interaction data may correspond to at least one of transaction data, merchant data, music data, or third-party data, and wherein the model is further trained using at least one of graphical representations corresponding to the set of existing user profiles, demographic data associated with the set of existing user profiles, content corresponding to one or more music media accessed by the set of existing user profiles, social media activity associated with the set of existing users, or advertisement associated with merchants associated with the interaction data.

The electronic representation of the user profile may be at least one of a graphical element, textual element, video element, or auditory element, wherein when the model generates a graphical element, the model is further configured to generate a visual attribute of the electronic representation for the user profile, the visual attribute comprising at least one of color, item category, album cover attribute, design element, text, or font.

Instructing presentation of the electronic representation may comprise instructing an output of a user interface displayed on the electronic device customized based on the electronic representation, an onboarding method for the user where the onboarding method is customized based on the electronic representation, or the electronic representation on a payment card.

The electronic representation for the user profile may be useable as a payment instrument, the one or more computer-executable instructions may further cause the one or more processors to perform operations comprising: receiving, from a second electronic device, a payment request, wherein the payment request is associated with the electronic representation; accessing payment data associated with the user profile based on the payment request being associated with the electronic representation, wherein the payment data is embedded in the electronic representation or identifiable based on an association between the electronic representation and the user profile; and authorizing the payment request using the payment data.

The one or more computer-executable instructions may further cause the one or more processors to perform operations comprising initiating generation of a non-fungible token based on the electronic representation of the user profile.

The one or more computer-executable instructions may further cause the one or more processors to perform operations comprising periodically monitoring new interaction data associated with the user; and updating the electronic representation in accordance with executing the model using the new interaction data.

What we claim is:

1. A method, implemented in part by at least one server computing device of a music-streaming platform, the method comprising:

retrieving, by the at least one server computing device, first interaction data of a user, wherein the first interaction data is associated with one or more first interactions between the user and at least one of the music-streaming platform or a payment processing platform associated with the music-streaming platform;

retrieving, by the at least one server computing device, second interaction data associated with second interactions of a plurality of other users with at least one of the music-streaming platform or with the payment processing platform;

training, by the at least one server computing device, a data model using training data comprising graphical representations of the plurality of other users and the second interaction data;

generating, by the at least one server computing device and based at least in part on the trained data model, a first graphical representation of the user for display, wherein at least the first interaction data of the user is used as input to the trained data model;

receiving, by the at least one server computing device, third interaction data of the user, wherein the third interaction data is associated with one or more third interactions between the user and at least one of the music-streaming platform or the payment processing platform, wherein the one or more third interactions comprise conducting a financial transaction or accessing a music file;

generating, by the at least one server computing device and based at least in part on the trained data model, a second graphical representation of the user, wherein at least the third interaction data is used as input to the trained data model, and wherein the second graphical representation comprises an update to the first graphical representation;

receiving, by the at least one server computing device, a request for access to electronic content by the user, wherein the request includes a third graphical representation;

determining, by the at least one server computing device, a similarity metric between the third graphical representation and the second graphical representation, wherein determining the similarity metric is based at least in part on visual attributes of the third graphical representation and the second graphical representation;

authenticating, by the at least one server computing device, the user based at least in part on determining that the similarity metric satisfies a threshold; and based at least in part on authenticating the user, granting, by the at least one server computing device, the user access to the electronic content.

2. The method of claim 1, wherein at least one of the first interaction data or the third interaction data corresponds to at least one of transaction data, music streaming data, music downloading data, artist data associated with the music streaming data, artist data associated with the music downloading data, album data associated with the music streaming data, album data associated with the music downloading data, song data associated with the music streaming data, or song data associated with the music downloading data.

3. The method of claim 1, wherein at least one of the first graphical representation, the second graphical representation, or the third graphical representation comprises at least one of color, design element, text element, or font.

4. The method of claim 1, wherein the access to the electronic content corresponds to at least one of discounted access, prioritized access, or customized access to the electronic content.

5. The method of claim 1, wherein the second interactions are with the music-streaming platform, and wherein the second interaction data is weighted in the data model according to at least one of frequency of the second interactions with the music-streaming platform, recency of the second interactions with the music-streaming platform, or number of the second interactions with the music-streaming platform.

6. One or more non-transitory computer-readable media storing instructions executable by one or more processors that, when executed by the one or more processors, cause the one or more processors to perform operations comprising:

retrieving, by at least one server computing device of a service provider, first interaction data of a user, wherein the first interaction data is associated with one or more first interactions between the user and at least one of the service provider or one or more third-party services associated with the service provider;

retrieving, by the at least one server computing device, second interaction data associated with second interactions of a plurality of other users with at least one of the service provider or with the one or more third-party services;

training, by the at least one server computing device, a data model using training data comprising electronic representations of the plurality of other users and the second interaction data;

generating, by the at least one server computing device and based at least in part on the trained data model, a first electronic representation of the user for display, wherein at least the first interaction data of the user is used as input to the trained data model;

receiving, by the at least one server computing device, third interaction data of the user, wherein the third interaction data is associated with one or more third interactions between the user and at least one of the service provider or at least one of the one or more third-party services, wherein the one or more third interactions comprise conducting a financial transaction or accessing a music file;

generating, by the at least one server computing device and based at least in part on the trained data model, a second electronic representation of the user, wherein at least the third interaction data is used as input to the trained data model, and wherein the second electronic representation comprises an update to the first electronic representation;

receiving, by the at least one server computing device, a request for access to electronic content by the user, wherein the request includes a third electronic representation;

determining, by the at least one server computing device, a similarity metric between the third electronic representation and the second electronic representation, wherein determining the similarity metric is based at least in part on visual attributes of the third electronic representation and the second electronic representation;

authenticating, by the at least one server computing device, the user based at least in part on determining that the similarity metric satisfies a threshold; and based at least in part on authenticating the user, providing, by the at least one server computing device, the user with access to the electronic content.

7. The one or more non-transitory computer-readable media of claim 6, wherein the first interaction data, the second interaction data, and the third interaction data correspond to at least one of transaction data, music streaming data, music downloading data, artist data associated with the music streaming data, artist data associated with the music downloading data, album data associated with the music streaming data, album data associated with the music downloading data, song data associated with the music streaming data, or song data associated with the music downloading data.

8. The one or more non-transitory computer-readable media of claim 6, wherein at least one of the first electronic representation, the second electronic representation, or the third electronic representation comprises at least one of a graphical element, textual element, video element, or auditory element.

9. The one or more non-transitory computer-readable media of claim 6, wherein the access corresponds to at least one of discounted access, prioritized access, or customized access to the electronic content.

10. The one or more non-transitory computer-readable media of claim 6, wherein receiving the third interaction data of the user is at least partly responsive to periodically monitoring for new interaction data.

11. The one or more non-transitory computer-readable media of claim 6, the operations further comprising:

receiving, by the at least one server computing device, an input of at least one of an image, an audio file, or a text file, wherein the first electronic representation is based at least on part on the input.

12. The one or more non-transitory computer-readable media of claim 6, wherein the at least one attribute of the first electronic representation is revised via an input received from the user.

13. The one or more non-transitory computer-readable media of claim 6, wherein the second interactions are of at least one of the plurality of other users with a music-streaming platform, and wherein the second interaction data is weighted in the data model according to at least one of frequency of the second interactions with the music-streaming platform, recency of the second interactions with the music-streaming platform, or number of the second interactions with the music-streaming platform.

14. A computer system comprising:
one or more processors of a service provider; and
one or more non-transitory computer-readable media storing one or more computer-executable instructions that, when executed by the one or more processors, cause the one or more processors to perform operations comprising:

retrieve first interaction data of a user of a plurality of users, wherein the first interaction data is associated with one or more first interactions between the user and at least one of the service provider or one or more third-party services associated with the service provider;

retrieve second interaction data associated with second interactions of the plurality of users with at least one of the service provider or with the one or more third-party services;

train a data model using training data comprising electronic representations of the plurality of users and the second interaction data;

generate, based at least in part on the trained data model, a first electronic representation of the user for display, wherein at least the first interaction data of the user is used as input to the trained data model;

receive third interaction data of the user, wherein the third interaction data is associated with one or more third interactions between the user and at least one of service provider or at least one of the one or more third-party services, wherein the one or more third interactions comprise conducting a financial transaction or accessing a music file;

generate, based at least in part on the trained data model, a second electronic representation of the user, wherein at least the third interaction data is used as input to the trained data model, and wherein the second electronic representation comprises an update to the first electronic representation;

receive a request for electronic content by the user, wherein the request includes a third electronic representation;

determine a similarity metric between the third electronic representation and the second electronic representation, wherein determining the similarity metric is based at least in part on visual attributes of the third electronic representation and the second electronic representation;

authenticate the user based at least in part on determining that the similarity metric satisfies a threshold; and based at least in part on authenticating the user, grant the user access to the electronic content.

15. The computer system of claim 14, wherein the first interaction data, the second interaction data, and the third interaction data correspond to at least one of transaction data, music streaming data, music downloading data, artist data associated with the music streaming data, artist data associated with the music downloading data, album data associated with the music streaming data, album data associated with the music downloading data, song data associated with the music streaming data, or song data associated with the music downloading data.

16. The computer system of claim 14, wherein at least one of the first electronic representation, the second electronic representation, or the third electronic representation comprises at least one of a graphical element, textual element, video element, or auditory element.

17. The computer system of claim 14, wherein the access corresponds to at least one of discounted access, prioritized access, or customized access to the electronic content.

18. The computer system of claim 14, wherein receiving the third interaction data of the user is at least partly responsive to periodically monitoring for new interaction data.

19. The computer system of claim 14, wherein the one or more computer-executable instructions further cause the one or more processors to:

receive an input of at least one of an image, an audio file, or a text file, wherein the first electronic representation is based at least in part on the input.

20. The computer system of claim 14, wherein at least one of the first interaction data or the second interaction data comprises music downloading data, artist data associated with music streaming data, artist data associated with the music downloading data, album data associated with the music streaming data, album data associated with the music downloading data, song data associated with the music streaming data, or song data associated with the music downloading data.

* * * * *